United States Patent
Breed

(10) Patent No.: US 6,738,697 B2
(45) Date of Patent: May 18, 2004

(54) TELEMATICS SYSTEM FOR VEHICLE DIAGNOSTICS

(75) Inventor: David S. Breed, Boonton Township, Morris County, NJ (US)

(73) Assignee: Automotive Technologies International Inc., Denville, NJ (US)

(*) Notice: Subject to any disclaimer, the term of this patent is extended or adjusted under 35 U.S.C. 154(b) by 27 days.

(21) Appl. No.: 10/188,673

(22) Filed: Jul. 3, 2002

(65) Prior Publication Data

US 2003/0009270 A1 Jan. 9, 2003

Related U.S. Application Data

(63) Continuation-in-part of application No. 09/753,186, filed on Jan. 2, 2001, now Pat. No. 6,484,080, which is a continuation-in-part of application No. 09/137,918, filed on Aug. 20, 1998, now Pat. No. 6,175,787, which is a continuation-in-part of application No. 08/476,077, filed on Jun. 7, 1995, now Pat. No. 5,809,437, application No. 10/188,673, application No. 10/079,065, filed on Feb. 19, 2002, which is a continuation-in-part of application No. 09/765,558, filed on Jan. 19, 2001, application No. 10/188,673, which is a continuation-in-part of application No. 10/174,709, filed on Jun. 19, 2002.

(60) Provisional application No. 60/304,013, filed on Jul. 9, 2001, provisional application No. 60/291,511, filed on May 16, 2001, provisional application No. 60/269,415, filed on Feb. 16, 2001, and provisional application No. 60/231,378, filed on Sep. 8, 2000.

(51) Int. Cl.$^7$ .......................... G01N 17/00; G06F 7/00

(52) U.S. Cl. .......................... 701/29; 701/34

(58) Field of Search .......................... 701/29, 33, 34, 701/36; 340/438, 439

(56) References Cited

U.S. PATENT DOCUMENTS

| 4,128,005 A | 12/1978 | Arnston et al. ............ 73/117.3 |
| 4,418,388 A | 11/1983 | Allgor et al. ........... 364/431.01 |
| 4,817,418 A | 4/1989 | Asami et al. ............... 73/118.1 |
| 4,989,146 A | 1/1991 | Imajo .......................... 701/29 |

(List continued on next page.)

FOREIGN PATENT DOCUMENTS

| DE | 3839959 | 11/1988 |
| WO | 00/29257 | 5/2000 |

OTHER PUBLICATIONS

Liubakka et al., "Failure Detection Algorithms Applied To Control System Design For Improved Diagnostics and Reliability", SAE Technical Paper Series, 02–29 To 04–04, 1988, pp. 1–7.

(List continued on next page.)

Primary Examiner—Yonel Beaulieu
(74) Attorney, Agent, or Firm—Brian Roffe

(57) ABSTRACT

Vehicle diagnostic system which diagnoses the state of the vehicle or the state of a component of the vehicle and generates an output indicative or representative thereof. A communications device transmits the output of the diagnostic system to a remote location, possibly via a satellite or the Internet. The diagnostic system can include sensors mounted on the vehicle, each providing a measurement related to a state of the sensor or a measurement related to a state of the mounting location, and a processor coupled to the sensors and arranged to receive data from the sensors and process the data to generate the output indicative or representative of the state of the vehicle or its component. The processor may embody a pattern recognition algorithm trained to generate the output from the data received from the sensors and be arranged to control parts of the vehicle based on the output.

62 Claims, 38 Drawing Sheets

U.S. PATENT DOCUMENTS

| | | | |
|---|---|---|---|
| 5,041,976 A | 8/1991 | Marko et al. | 364/424.03 |
| 5,056,023 A * | 10/1991 | Abe | 701/32 |
| 5,123,017 A | 6/1992 | Simpkins et al. | 714/26 |
| 5,164,901 A | 11/1992 | Blackburn et al. | 701/47 |
| 5,313,407 A | 5/1994 | Tiernan et al. | 364/508 |
| 5,325,082 A | 6/1994 | Rodriguez | 340/438 |
| 5,333,240 A | 7/1994 | Matsumoto et al. | 706/20 |
| 5,400,018 A | 3/1995 | Scholl et al. | 340/825.54 |
| 5,406,502 A | 4/1995 | Haramaty et al. | 364/551.01 |
| 5,420,794 A | 5/1995 | James | 701/117 |
| 5,442,553 A | 8/1995 | Parrillo | 364/424.04 |
| 5,481,906 A | 1/1996 | Nagayoshi et al. | 73/116 |
| 5,581,464 A * | 12/1996 | Woll et al. | 701/35 |
| 5,594,740 A | 1/1997 | LaDue | 379/59 |
| 5,754,965 A | 5/1998 | Hagenbuch | 701/35 |
| 5,809,437 A | 9/1998 | Breed | 701/29 |
| 5,829,782 A | 11/1998 | Breed et al. | 280/735 |
| 5,955,942 A | 9/1999 | Slifkin et al. | 340/436 |
| 6,028,537 A | 2/2000 | Suman et al. | 340/988 |
| 6,144,859 A | 11/2000 | LaDue | 455/511 |
| 6,175,787 B1 | 1/2001 | Breed | 701/29 |
| 6,263,268 B1 | 7/2001 | Nathanson | 701/29 |
| 6,295,492 B1 | 9/2001 | Lang et al. | 701/33 |
| 6,339,736 B1 | 1/2002 | Moskowitz et al. | 701/29 |
| 6,356,822 B1 | 3/2002 | Diaz et al. | 701/33 |
| 2002/0103622 A1 * | 8/2002 | Burge | 702/183 |

OTHER PUBLICATIONS

James et al., "Microprocessor Based Data Acquisition For Analysis Of Engine Performance", SAE Technical Paper Series, Feb. 23–27, 1987, pp. 1–9.

Engine Monitoring Based on Normalized Vibration Spectra, NASA Tech Briefs, MFS–26529, 1994.

V.K. Varadan et al., "Conformal MEMS–IDT Gyroscopes and Their Comparison with Fiber Optic Gyro, Smart Structures and Materials 2000", Smart Electronics and MEMS, Proceedings of SPIE vol. 3990 (2000), pp. 335–344.

H.K. Tonshoff et al., "Using Acoustic Emission Signals for Monitoring of Production Processes", Ultrasonics 37 (2000), pp. 681–686, 2000.

Design and Development of a MEMS–IDT Gyroscope, V.K. Varadan et al., Smart Mater. Struct. vol. 9, Jul. 21, 2000, pp. 898–905.

Microsensors, Microelectromechenical Systems (MEMS), and Electronics for Smart Structures and Systems, V.K. Varadan et al., Smart Mater. Struct., vol. 9, Feb., 1999, pp. 953–972.

Abstract of Wireless Remote Accelerometer, V.K. Varadan et al., in Physics of Semiconductor Devices, vol. 1: Proceedings of the $9^{th}$ International Workshop on Physics of Semiconductor Devices (IWPSD), Delhi, India, Dec. 6–20, 1997.

Using Remote Diagnostics and Prognostics in the R&D Environment, Maggy Blagrove, no earlier than Jan., 2002.

Vetronix Corporation, WirelessRoad System Description, no earlier than Jan. 1, 2002.

Wingcast to Market Remote Vehicle Diagnostic and Prognostic Solutions with HP, Press Release dated May 15, 2002.

ATX Unveils Direct Telematics Link from Vehicle to Car Dealer, Press Release, Jan. 23, 2002.

Cosworth Technology, Inc. and North American Bus Industries (NABI) to Unveil the CompoBus ™ Suited with the Revolutionary i3000 {R} Predictive Diagnostic System at APTA Conference in Ft. Worth, Texas, Oct. 28–31, 2001., Press Release, Oct. 28, 2001.

Telematics Integrated with Tire Pressure Monitoring, Press Release, Oct. 3, 2001.

* cited by examiner

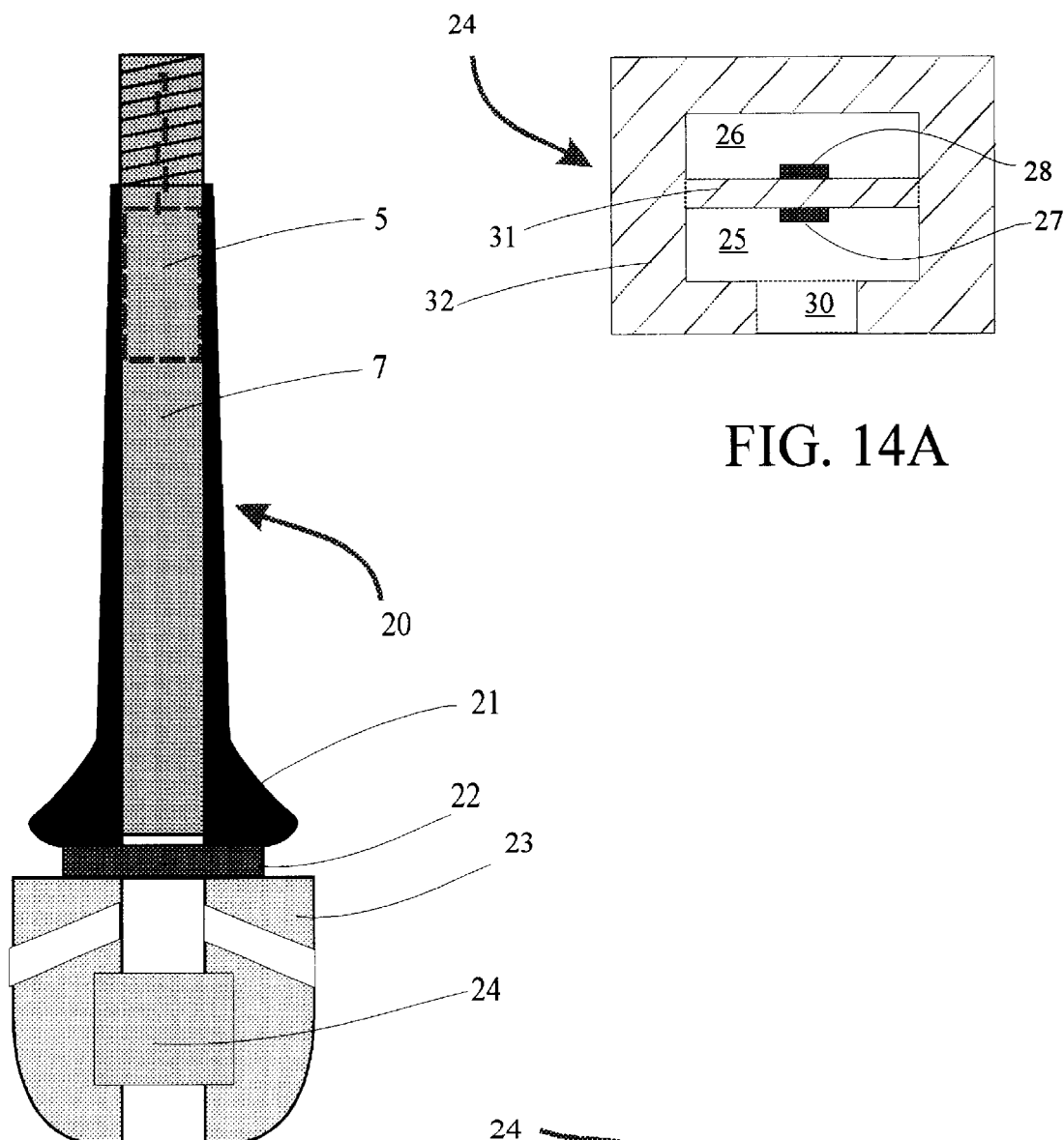
FIG. 14A
FIG. 14
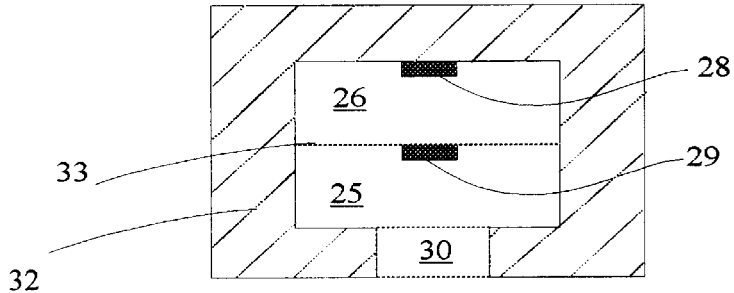
FIG. 14B

Prior Art

Prior Art

TELEMATICS SYSTEM FOR VEHICLE DIAGNOSTICS

CROSS REFERENCE TO RELATED APPLICATIONS

This application is a continuation-in-part of U.S. patent application Ser. No. 09/753,186 filed Jan. 2, 2001, now U.S. Pat. No. 6,484,080, which in turn is a continuation-in-part of U.S. patent application Ser. No. 09/137,918 filed Aug. 20, 1998, now U.S. Pat. No. 6,175,787, which in turn is a continuation-in-part of U.S. patent application Ser. No. 08/476,077 filed Jun. 7, 1995, now U.S. Pat. No. 5,809,437.

This application is a continuation-in-part of U.S. patent application Ser. No. 10/079,065 filed Feb. 19, 2002 which in turn is a continuation-in-part of U.S. patent application Ser. No. 09/765,558 filed Jan. 19, 2001, which claims priority under 35 U.S.C. § 119(e) of U.S. provisional patent application Ser. No. 60/231,378 filed Sep. 8, 2000.

This application claims priority under 35 U.S.C. § 119(e) of U.S. provisional patent application Ser. No. 60/269,415 filed Feb. 16, 2001, U.S. provisional patent application Ser. No. 60/291,511 filed May 16, 2001 and U.S. provisional patent application Ser. No. 60/304,013 filed Jul. 9, 2001 through U.S. patent application Ser. No. 10/079,065 filed Feb. 19, 2002.

This application is a continuation-in-part of U.S. patent application Ser. No. 10/174,709 filed Jun. 19, 2002 and claims benefit of provisional application Ser. No. 60/269,415 filed Feb. 16, 2001.

All of the above-mentioned patents and applications are incorporated by reference herein in their entirety as if they had each been set forth herein in full.

FIELD OF THE INVENTION

The present invention relates to methods and apparatus for diagnosing components in a vehicle and transmitting data relating to the diagnosis of the components in the vehicle and other information relating to the operating conditions of the vehicle to one or more remote locations distant from the vehicle, i.e., via a telematics link.

The present invention also relates to systems and method for diagnosing the state or condition of a vehicle, e.g., whether the vehicle is about to rollover or is experiencing a crash and whether the vehicle has a component which is operating abnormally and could possibly fail resulting in a crash or severe handicap for the operator, and transmitting data relating to the diagnosis of the components in the vehicle and optionally other information relating to the operating conditions of the vehicle to one or more remote locations, i.e., via a telematics link.

The present invention further relates to methods and apparatus for diagnosing components in a vehicle and determining the status of occupants in a vehicle and transmitting data relating to the diagnosis of the components in the vehicle, and optionally other information relating to the operating conditions of the vehicle, and data relating to the occupants to one or more remote facilities such as a repair facility and an emergency response station.

BACKGROUND OF THE INVENTION

It is now generally recognized that it is important to monitor the occupancy of a passenger compartment of a vehicle. For example, U.S. Pat. No. 5,829,782 (Breed et al.) describes a vehicle interior monitoring system that utilizes pattern recognition techniques and wave-receiving sensors to obtain information about the occupancy of the passenger compartment and uses this information to affect the operation of one or more systems in the vehicle, including an occupant restraint device, an entertainment system, a heating and air-conditioning system, a vehicle communication system, a distress notification system, a light filtering system and a security system.

Of particular interest, Breed et al. mentions that the presence of a child in a rear facing child seat placed on the right front passenger seat may be detected as this has become an industry-wide concern to prevent deployment of an occupant restraint device in these situations. The U.S. automobile industry is continually searching for an easy, economical solution, which will prevent the deployment of the passenger side airbag if a rear facing child seat is present.

Another important aspect disclosed in Breed et al. relates to the operation of the cellular communications system in conjunction with the vehicle interior monitoring system. Vehicles can be provided with a standard cellular phone as well as the Global Positioning System (GPS), an automobile navigation or location system with an optional connection to a manned assistance facility. In the event of an accident, the phone may automatically call 911 for emergency assistance and report the exact position of the vehicle. If the vehicle also has a system as described below for monitoring each seat location, the number and perhaps the condition of the occupants could also be reported. In that way, the emergency service (EMS) would know what equipment and how many ambulances to send to the accident site. Moreover, a communication channel can be opened between the vehicle and a monitoring facility/emergency response facility or personnel to determine how badly people are injured, the number of occupants in the vehicle, and to enable directions to be provided to the occupant(s) of the vehicle to assist in any necessary first aid prior to arrival of the emergency assistance personnel.

Communications between a vehicle and a remote assistance facility are also important for the purpose of diagnosing problems with the vehicle and forecasting problems with the vehicle, called prognostics. Motor vehicles contain complex mechanical systems that are monitored and regulated by computer systems such as electronic control units (ECUs) and the like. Such ECUs monitor various components of the vehicle including engine performance, carburation, speed/acceleration control, transmission, exhaust gas recirculation (EGR), braking systems, etc. However, vehicles perform such monitoring typically only for the vehicle driver and without communication of any impending results, problems and/or vehicle malfunction to a remote site for troubleshooting, diagnosis or tracking for data mining.

In the past, systems that provide for remote monitoring did not provide for automated analysis and communication of problems or potential problems and recommendations to the driver. As a result, the vehicle driver or user is often left stranded, or irreparable damage occurs to the vehicle as a result of neglect or driving the vehicle without the user knowing the vehicle is malfunctioning until it is too late, such as low oil level and a malfunctioning warning light, fan belt about to fail, failing radiator hose etc.

In this regard, U.S. Pat. No. 5,400,018 (Scholl et al.) describes a system for relaying raw sensor output from an off road work site relating to the status of a vehicle to a remote location over a communications data link. The information consists of fault codes generated by sensors and electronic control modules indicating that a failure has occurred rather than forecasting a failure. The vehicle does not include a system for performing diagnosis. Rather, the raw sensor data is processed at an off-vehicle location in order to arrive at a diagnosis of the vehicle's operating condition. Bi-directional communications are described in that a request for additional information can be sent to the vehicle from the remote location with the vehicle responding and providing the requested information but no such communication takes place with the vehicle operator and not of an operator of a vehicle traveling on a road. Also, Scholl et al. does not teach the diagnostics of the problem or potential problem on the vehicle itself nor does it teach the automatic diagnostics or any prognostics. In Scholl et al. the determination of the problem occurs at the remote site by human technicians.

U.S. Pat. No. 5,754,965 (Hagenbuch) describes an apparatus for diagnosing the state of health of a vehicle and providing the operator of the vehicle with a substantially real-time indication of the efficiency of the vehicle in performing as assigned task with respect to a predetermined goal. A processor in the vehicle monitors sensors that provide information regarding the state of health of the vehicle and the amount of work the vehicle has done. The processor records information that describes events leading up to the occurrence of an anomaly for later analysis. The sensors are also used to prompt the operator to operate the vehicle at optimum efficiency.

U.S. Pat. No. 5,955,942 (Slifkin et al.) describes a method for monitoring events in vehicles in which electrical outputs representative of events in the vehicle are produced, the characteristics of one event are compared with the characteristics of other events accumulated over a given period of time and departures or variations of a given extent from the other characteristics are determined as an indication of a significant event. A warning is sent in response to the indication, including the position of the vehicle as determined by a global positioning system on the vehicle. For example, for use with a railroad car, a microprocessor responds to outputs of an accelerometer by comparing acceleration characteristics of one impact with accumulated acceleration characteristics of other impacts and determines departures of a given magnitude from the other characteristics as a failure indication which gives rise of a warning.

Every automobile driver fears that his or her vehicle will breakdown at some unfortunate time, e.g., when he or she is traveling at night, during rush hour, or on a long trip away from home. To help alleviate that fear, certain luxury automobile manufacturers provide roadside service in the event of a breakdown. Nevertheless, unless the vehicle is equipped with OnStar® or an equivalent service, the vehicle driver must still be able to get to a telephone to call for service. It is also a fact that many people purchase a new automobile out of fear of a breakdown with their current vehicle. This invention is primarily concerned with preventing breakdowns and with minimizing maintenance costs by predicting component failure that would lead to such a breakdown before it occurs.

When a vehicle component begins to fail, the repair cost is frequently minimal if the impending failure of the component is caught early, but increases as the repair is delayed. Sometimes if a component in need of repair is not caught in a timely manner, the component, and particularly the impending failure thereof, can cause other components of the vehicle to deteriorate. One example is where the water pump fails gradually until the vehicle overheats and blows a head gasket. It is desirable, therefore, to determine that a vehicle component is about to fail as early as possible so as to minimize the probability of a breakdown and the resulting repair costs.

There are various gages on an automobile which alert the driver to various vehicle problems. For example, if the oil pressure drops below some predetermined level, the driver is warned to stop his vehicle immediately. Similarly, if the coolant temperature exceeds some predetermined value, the driver is also warned to take immediate corrective action. In these cases, the warning often comes too late as most vehicle gages alert the driver after he or she can conveniently solve the problem. Thus, what is needed is a component failure warning system that alerts the driver to the impending failure of a component sufficiently in advance of the time when the problem gets to a catastrophic point.

Some astute drivers can sense changes in the performance of their vehicle and correctly diagnose that a problem with a component is about to occur. Other drivers can sense that their vehicle is performing differently but they don't know why or when a component will fail or how serious that failure will be, or possibly even what specific component is the cause of the difference in performance. The invention disclosed herein will, in most cases, solve this problem by predicting component failures in time to permit maintenance and thus prevent vehicle breakdowns.

Presently, automobile sensors in use are based on specific predetermined or set levels, such as the coolant temperature or oil pressure, whereby an increase above the set level or a decrease below the set level will activate the sensor, rather than being based on changes in this level over time. The rate at which coolant heats up, for example, can be an important clue that some component in the cooling system is about to fail. There are no systems currently on automobiles to monitor the numerous vehicle components over time and to compare component performance with normal performance. Nowhere in the vehicle is the vibration signal of a normally operating front wheel stored, for example, or for that matter, any normal signal from any other vehicle component. Additionally, there is no system currently existing on a vehicle to look for erratic behavior of a vehicle component and to warn the driver or the dealer that a component is misbehaving and is therefore likely to fail in the very near future.

Sometimes, when a component fails, a catastrophic accident results. In the Firestone tire case, for example, over 100 people were killed when a tire of a Ford Explorer blew out which caused the Ford Explorer to rollover. Similarly, other component failures can lead to loss of control of the vehicle and a subsequent accident. It is thus very important to accurately forecast that such an event will take place but furthermore, for those cases where the event takes place suddenly without warning, it is also important to diagnose the state of the entire vehicle, which in some cases can lead to automatic corrective action to prevent unstable vehicle motion or rollovers resulting in an accident. Finally, an accurate diagnostic system for the entire vehicle can determine much more accurately the severity of an automobile crash once it has begun by knowing where the accident is taking place on the vehicle (e.g., the part of or location on the vehicle which is being impacted by an object) and what is colliding with the vehicle based on a knowledge of the force deflection characteristics of the vehicle at that location. Therefore, in addition to a component diagnostic, the teachings of this invention also provide a diagnostic system for the entire vehicle prior to and during accidents. In particular, this invention is concerned with the simultaneous monitoring of multiple sensors on the vehicle so that the best possible determination of the state of the vehicle can be determined. Current crash sensors operate independently or at most one sensor may influence the threshold at which another sensor triggers a deployable restraint. In the teachings of this invention, two or more sensors, frequently accelerometers, are monitored simultaneously and the combination of the outputs of these multiple sensors are combined continuously in making the crash severity analysis.

Marko et al. (U.S. Pat. No. 5,041,976) is directed to a diagnostic system using pattern recognition for electronic automotive control systems and particularly for diagnosing faults in the engine of a motor vehicle after they have occurred. For example, Marko et al. is interested in determining cylinder specific faults after the cylinder is operating abnormally. More specifically, Marko et al. is directed to detecting a fault in a vehicular electromechanical system indirectly, i.e., by means of the measurement of parameters of sensors which are affected by that system, and after that fault has already manifested itself in the system. In order to form the fault detecting system, the parameters from these sensors are input to a pattern recognition system for training thereof Then known faults are introduced and the parameters from the sensors are inputted into the pattern recognition system with an indicia of the known fault. Thus, during subsequent operation, the pattern recognition system can determine the fault of the electromechanical system based on the parameters of the sensors, assuming that the fault was "trained" into the pattern recognition system and has already occurred.

When the electromechanical system is an engine, the parameters input into the pattern recognition system for training thereof, and used for fault detection during operation, all relate to the engine. (If the electromechanical system is other than the engine, then the parameters input into the pattern recognition system would relate to that system.) In other words, each parameter will be affected by the operation of the engine and depend thereon and changes in the operation of the engine will alter the parameter, e.g., the manifold absolute pressure is an indication of the airflow into the engine. In this case, the signal from the manifold absolute pressure sensor may be indicative of a fault in the intake of air into the engine, e.g., the engine is drawing in too much or too little air, and is thus affected by the operation of the engine. Similarly, the mass air flow is the airflow into the engine and is an alternative to the manifold absolute pressure. It is thus a parameter that is directly associated with, related to and dependent on the engine. The exhaust gas oxygen sensor is also affected by the operation of the engine, and thus directly associated therewith, since during normal operation, the mixture of the exhaust gas is neither rich or lean whereas during abnormal engine operation, the sensor will detect an abrupt change indicative of the mixture being too rich or too lean.

Thus, the system of Marko et al. is based on the measurement of sensors which affect or are affected by, i.e., are directly associated with, the operation of the electromechanical system for which faults are to be detected. However, the system of Marko et al. does not detect faults in the sensors that are conducting the measurements, e.g., a fault in the exhaust gas oxygen sensor, or faults that are only developing but have not yet manifested themselves or faults in other systems. Rather, the sensors are used to detect a fault in the system after it has occurred.

Asami et al. (U.S. Pat. No. 4,817,418) is directed to a failure diagnosis system for a vehicle including a failure display means for displaying failure information to a driver. This system only reports failures after they have occurred and does not predict them.

Tiernan et al. (U.S. Pat. No. 5,313,407) is directed, inter alia, to a system for providing an exhaust active noise control system, i.e., an electronic muffler system, including an input microphone 60 which senses exhaust noise at a first location 61 in an exhaust duct 58. An engine has exhaust manifolds 56,57 feeding exhaust air to the exhaust duct 58. The exhaust noise sensed by the microphone 60 is processed to obtain an output from an output speaker 65 arranged downstream of the input microphone 61 in the exhaust path in order to cancel the noise in the exhaust duct 58.

Haramaty et al. (U.S. Pat. No. 5,406,502) describes a system that monitors a machine in a factory and notifies maintenance personnel remote from the machine (not the machine operator) that maintenance should be scheduled at a time when the machine is not in use. Haramaty et al. does not expressly relate to vehicular applications.

NASA Technical Support Package MFS-26529 "Engine Monitoring Based on Normalized Vibration Spectra", describes a technique for diagnosing engine health using a neural network based system and is incorporated by reference herein in its entirety.

A paper "Using acoustic emission signals for monitoring of production processes" by H. K. Tonshoff et al. also provides a good description of how acoustic signals can be used to predict the state of machine tools and is incorporated by reference herein in its entirety.

Based on the monitoring of vehicular components, systems and subsystems as well as to the measurement of physical and chemical characteristics relating to the vehicle or its components, systems and subsystems, it becomes possible to control and/or affect one or more vehicular system.

An important component or system which is monitored is the tires as failure of one or more of the tires can often lead to a fatal accident. Indeed, tire monitoring is extremely important since NHTSA (National Highway Traffic Safety Administration) has recently linked 148 deaths and more than 525 injuries in the United States to separations, blowouts and other tread problems in Firestone's ATX, ATX II and Wilderness AT tires, 5 million of which were recalled in 2000. Many of the tires were standard equipment on the Ford Explorer. Ford recommends that the Firestone tires on the Explorer sport utility vehicle be inflated to 26 psi, while Firestone recommends 30 psi. It is surprising that a tire can go from a safe condition to an unsafe condition based on an under inflation of 4 psi.

Recent studies in the United States conducted by the Society of Automotive Engineers show that low tire pressure causes about 260,000 accidents annually. Another finding is that about 75% of tire failures each year are preceded by slow air leaks or inadequate tire inflation. Nissan, for example, warns that incorrect tire pressures can compromise the stability and overall handling of a vehicle and can contribute to an accident. Additionally, most non-crash auto fatalities occur while drivers are changing flat tires. Thus, tire failures are clearly a serious automobile safety problem that requires a solution.

About 16% of all car accidents are a result of incorrect tire pressure. Thus, effective pressure and wear monitoring is extremely important. Motor Trend magazine stated that one of the most overlooked maintenance areas on a car is tire pressure. An estimated 40 to 80 percent of all vehicles on the road are operating with under-inflated tires. When under-inflated, a tire tends to flex its sidewall more, increasing its rolling resistance which decreases fuel economy. The extra flex also creates excessive heat in the tire that can shorten its service life.

The Society of Automotive Engineers reports that about 87 percent of all flat tires have a history of under-inflation.

About 85% of pressure loss incidents are slow punctures caused either by small-diameter objects trapped in the tire or by larger diameter nails. The leak will be minor as long as the nail is trapped. If the nail comes out, pressure can decrease rapidly. Incidents of sudden pressure loss are potentially the most dangerous for drivers and account for about 15% of all cases.

A properly inflated tire loses approximately 1 psi per month. A defective time can lose pressure at a more rapid rate. About 35 percent of the recalled Bridgestone tires had improper repairs.

Research from a variety of sources suggests that under-inflation can be significant to both fuel economy and tire life. Industry experts have determined that tires under-inflated by a mere 10% wear out about 15% faster. An average driver with an average set of tires can drive an extra 5,000 to 7,000 miles before buying new tires by keeping the tire properly inflated.

The American Automobile Association has determined that under inflated tires cut a vehicle's fuel economy by as much as 2% per psi below the recommended level. If each of a car's tires is supposed to have a pressure of 30 psi and instead has a pressure of 25 psi, the car's fuel efficiency drops by about 10%. Depending on the vehicle and miles driven that could cost from $100 to $500 a year.

The ability to control a vehicle is strongly influenced by tire pressure. When the tire pressure is kept at proper levels, optimum vehicle braking, steering, handling and stability are accomplished. Low tire pressure can also lead to damage to both the tires and wheels.

A Michelin study revealed that the average driver doesn't recognize a low tire until it's 14 psi too low. One of the reasons is that today's radial tire is hard to judge visually because the sidewall flexes even when properly inflated.

Despite all the recent press about keeping tires properly inflated, new research shows that most drivers do not know the correct inflation pressure. In a recent survey, only 45 percent of respondents knew where to look to find the correct pressure, even though 78 percent thought they knew. Twenty-seven percent incorrectly believed the sidewall of the tire carries the correct information and did not know that the sidewall only indicates the maximum pressure for the tire, not the optimum pressure for the vehicle. In another survey, about 60% of the respondents reported that they check tire pressure but only before going on a long trip. The National Highway Traffic Safety Administration estimates that at least one out of every five tires is not properly inflated.

The problem is exacerbated with the new run-flat tires where a driver may not be aware that a tire is flat until it is destroyed. Run-flat tires can be operated at air pressures below normal for a limited distance and at a restricted speed (125 miles at a maximum of 55 mph). The driver must therefore be warned of changes in the condition of the tires so that she can adapt her driving to the changed conditions.

One solution to this problem is to continuously monitor the pressure and perhaps the temperature in the tire. Pressure loss can be automatically detected in two ways: by directly measuring air pressure within the tire or by indirect tire rotation methods. Various indirect methods are based on the number of revolutions each tire makes over an extended period of time through the ABS system and others are based on monitoring the frequency changes in the sound emitted by the tire. In the direct detection case, a sensor is mounted into each wheel or tire assembly, each with its own identity. An on-board computer collects the signals, processes and displays the data and triggers a warning signal in the case of pressure loss.

Under-inflation isn't the only cause of sudden tire failure. A variety of mechanical problems including a bad wheel bearing or a "dragging" brake can cause the tire to heat up and fail. In addition, as may have been a contributing factor in the Firestone case, substandard materials can lead to intra-tire friction and a buildup of heat. The use of re-capped truck tires is another example of heat caused failure as a result by intra-tire friction. An overheated tire can fail suddenly without warning.

As discussed in more detail below, tire monitors, such as those disclosed below, permit the driver to check the vehicle tire pressures from inside the vehicle.

The *Transportation Recall Enhancement Accountability and Documentation Act*, (H.R. 5164, or Public Law No. 106-414) known as the TREAD Act, was signed by President Clinton on Nov. 1, 2000. Section 12, TIRE PRESSURE WARNING, states that: "Not later than one year after the date of enactment of this Act, the Secretary of Transportation, acting through the National Highway Traffic Safety Administration, shall complete a rulemaking for a regulation to require a warning system in a motor vehicle to indicate to the operator when a tire is significantly under-inflated. Such requirement shall become effective not later than 2 years after the date of the completion of such rulemaking." Thus, it is expected that a rule requiring continuous tire monitoring will take effect for the 2004 model year.

This law will dominate the first generation of such systems as automobile manufacturers move to satisfy the requirement. In subsequent years, more sophisticated systems that in addition to pressure will monitor temperature, tire footprint, wear, vibration, etc. Although the Act requires that the tire pressure be monitored, it is believed by the inventors that other parameters are as important as the tire pressure or even more important than the tire pressure as described in more detail below.

Consumers are also in favor of tire monitors. Johnson Controls' market research showed that about 80 percent of consumers believe a low tire pressure warning system is an important or extremely important vehicle feature. Thus, as with other safety products such as airbags, competition to meet customer demands will soon drive this market.

Although, as with most other safety products, the initial introductions will be in the United States, speed limits in the United States and Canada are sufficiently low that tire pressure is not as critical an issue as in Europe, for example, where the drivers often drive much faster.

The advent of microelectromechanical (MEMS) pressure sensors, especially those based on surface acoustical wave (SAW) technology, has now made the wireless and powerless monitoring of tire pressure feasible. This is the basis of the tire pressure monitors described below. According to a Frost and Sullivan report on the U.S. Micromechanical Systems (MEMS) market (June 1997): "A MEMS tire pressure sensor represents one of the most profound opportunities for MEMS in the automotive sector."

There are many wireless tire temperature and pressure monitoring systems disclosed in the prior art patents such as for example, U.S. Pat. Nos. 4,295,102, 4,296,347, 4,317,372, 4,534,223, 5,289,160, 5,612,671, 5,661,651, 5,853,020 and 5,987,980 and International Publication No. WO 01/07271(A1), all of which are illustrative of the state of the art of tire monitoring and are incorporated by reference herein.

Devices for measuring the pressure and/or temperature within a vehicle tire directly can be categorized as those containing electronic circuits and a power supply within the tire, those which contain electronic circuits and derive the power to operate these circuits either inductively, from a generator or through radio frequency radiation, and those that do not contain electronic circuits and receive their operating power only from received radio frequency radiation. For the reasons discussed above, the discussion herein is mainly concerned with the latter category. This category contains devices that operate on the principles of surface acoustic waves (SAW) and the disclosure below is concerned primarily with such SAW devices.

International Publication No. WO 01/07271 describes a tire pressure sensor that replaces the valve and valve stem in a tire.

U.S. Pat. No. 5,231,827 contains a good description and background of the tire-monitoring problem. The device disclosed, however, contains a battery and electronics and is not a SAW device. Similarly, the device described in U.S. Pat. No. 5,285,189 contains a battery as do the devices described in U.S. Pat. Nos. 5,335,540 and 5,559,484. U.S. Pat. No. 5,945,908 applies to a stationary tire monitoring system and does not use SAW devices.

One of the first significant SAW sensor patents is U.S. Pat. No. 4,534,223. This patent describes the use of SAW devices for measuring pressure and also a variety of methods for temperature compensation but does not mention wireless transmission.

U.S. Pat. No. 5,987,980 describes a tire valve assembly using a SAW pressure transducer in conjunction with a sealed cavity. This patent does disclose wireless transmission. The assembly includes a power supply and thus this also distinguishes it from a preferred system of this invention. It is not a SAW system and thus the antenna for interrogating the device in this design must be within one meter, which is closer than needed for a preferred device of this invention.

U.S. Pat. No. 5,698,786 relates to the sensors and is primarily concerned with the design of electronic circuits in an interrogator. U.S. Pat. No. 5,700,952 also describes circuitry for use in the interrogator to be used with SAW devices. In neither of these patents is the concept of using a SAW device in a wireless tire pressure monitoring system described. These patents also do not describe including an identification code with the temperature and/or pressure measurements in the sensors and devices.

U.S. Pat. No. 5,804,729 describes circuitry for use with an interrogator in order to obtain more precise measurements of the changes in the delay caused by the physical or chemical property being measured by the SAW device. Similar comments apply to U.S. Pat. No. 5,831,167. Other related prior art includes U.S. Pat. No. 4,895,017.

Other patents disclose the placement of an electronic device in the sidewall or opposite the tread of a tire but they do not disclose either an accelerometer or a surface acoustic wave device. In most cases, the disclosed system has a battery and electronic circuits.

One method of measuring pressure that is applicable to this invention is disclosed in V. V. Varadan, Y. R. Roh and V. K. Varadan "Local/Global SAW Sensors for Turbulence", IEEE 1989 Ultrasonics Symposium p. 591–594 makes use of a polyvinylidene fluoride (PVDF) piezoelectric film to measure pressure. Mention is made in this article that other piezoelectric materials can also be used. Experimental results are given where the height of a column of oil is measured based on the pressure measured by the piezoelectric film used as a SAW device. In particular, the speed of the surface acoustic wave is determined by the pressure exerted by the oil on the SAW device. For the purposes of the instant invention, air pressure can also be measured in a similar manner by first placing a thin layer of a rubber material onto the surface of the SAW device which serves as a coupling agent from the air pressure to the SAW surface. In this manner, the absolute pressure of a tire, for example, can be measured without the need for a diaphragm and reference pressure greatly simplifying the pressure measurement. Other examples of the use of PVDF film as a pressure transducer can be found in U.S. Pat. Nos. 4,577,510 and 5,341,687, which are incorporated by reference herein, although they are not used as SAW devices.

The following U.S. patents provide relevant information to this invention, and to the extent necessary, all of them are incorporated by reference herein: U.S. Pat. Nos. 4,361,026, 4,620,191, 4,7033,27, 4,724,443, 4,725,841, 4,734,698, 5,691,698, 5,841,214, 6,060,815, 6,107,910, 6,114,971, 6,144,332.

In recent years, SAW devices have been used as sensors in a broad variety of applications. Compared with sensors utilizing alternative technologies, SAW sensors possess outstanding properties, such as high sensitivity, high resolution, and ease of manufacturing by microelectronic technologies. However, the most attractive feature of SAW sensors is that they can be interrogated wirelessly.

DEFINITIONS

As used herein, a diagnosis of the "state of the vehicle" means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

As used herein, an "occupant restraint device" includes any type of device which is deployable in the event of a crash involving the vehicle for the purpose of protecting an occupant from the effects of the crash and/or minimizing the potential injury to the occupant. Occupant restraint devices thus include frontal airbags, side airbags, seatbelt tensioners, knee bolsters, side curtain airbags, externally deployable airbags and the like.

As used herein, a "part" of the vehicle includes any component, sensor, system or subsystem of the vehicle such as the steering system, braking system, throttle system, navigation system, airbag system, seatbelt retractor, air bag inflation valve, air bag inflation controller and airbag vent valve, as well as those listed below in the definitions of "component" and "sensor".

As used herein, a "sensor system" includes any of the sensors listed below in the definition of "sensor" as well as any type of component or assembly of components which detect, sense or measure something.

The term "gage" as used herein interchangeably with the terms "sensor" and "sensing device".

Preferred embodiments of the invention are described below and unless specifically noted, it is the applicants' intention that the words and phrases in the specification and claims be given the ordinary and accustomed meaning to those of ordinary skill in the applicable art(s). If the applicant intends any other meaning, he will specifically state he is applying a special meaning to a word or phrase.

Likewise, applicants' use of the word "function" here is not intended to indicate that the applicants seek to invoke the special provisions of 35 U.S.C. § 112, sixth paragraph, to define their invention. To the contrary, if applicants wish to invoke the provisions of 35 U.S.C. § 112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. § 112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. § 112, sixth paragraph, it is nonetheless their intention to cover and include any and all structure, materials or acts that perform the claimed function, along with any and all known or later developed equivalent structures, materials or acts for performing the claimed function.

OBJECTS OF THE INVENTION

It is an object of the present invention to provide a new and improved method and system for diagnosing components in a vehicle and the operating status of the vehicle and alerting the vehicle's dealer, or another repair facility, via a telematics link that a component of the vehicle is functioning abnormally and may be in danger of failing.

It is still another object of the present invention to provide a new and improved method and apparatus for obtaining information about a vehicle system and components in the vehicle in conjunction with failure of the component or the vehicle and sending this information to the vehicle manufacturer.

It is an object of the present invention to provide a new and improved method and system for diagnosing components in a vehicle by monitoring the patterns of signals emitted from the vehicle components and, through the use of pattern recognition technology, forecasting component failures before they occur. Vehicle component behavior is thus monitored over time in contrast to systems that wait until a serious condition occurs. The forecast of component failure can be transmitted to a remote location via a telematics link.

It is another object of the present invention to provide a new and improved on-board vehicle diagnostic module utilizing pattern recognition technologies which are trained to differentiate normal from abnormal component behavior. The diagnosis of component behavior can be transmitted to a remote location via a telematics link.

It is yet another object of the present invention to provide a diagnostic module that determines whether a component is operating normally or abnormally based on a time series of data from a single sensor or from multiple sensors that contain a pattern indicative of the operating status of the component. The diagnosis of component operation can be transmitted to a remote location via a telematics link.

It is still another object of the present invention to provide a diagnostic module that determines whether a component is operating normally or abnormally based on data from one or more sensors that are not directly associated with the component, i.e., do not depend on the operation of the component. The diagnosis of component operation can be transmitted to a remote location via a telematics link.

It is an additional object of the present invention to simultaneously monitor several sensors, primarily accelerometers, gyroscopes and strain gages, to determine the state of the vehicle and optionally its occupants and to determine that a vehicle is out of control and possibly headed for an accident, for example. If so, then a signal can be sent to a part of the vehicle control system to attempt to re-establish stability. If this is unsuccessful, then the same system of sensors can monitor the early stages of a crash to make an assessment of the severity of the crash and what occupant protection systems should be deployed and how such occupant protection systems should be deployed.

Another object of the invention to provide new and improved sensors for a vehicle which wirelessly transmits information about a state measured or detected by the sensor.

It is another object of the invention to incorporate surface acoustic wave technology into sensors on a vehicle with the data obtained by the sensors being transmittable via a telematics link to a remote location.

It is another object of the invention to provide new and improved sensors for measuring the pressure, temperature and/or acceleration of tires with the data obtained by the sensors being transmittable via a telematics link to a remote location.

It is yet another object of the invention to provide new and improved weight or load measuring sensors, switches, temperature sensors, acceleration sensors, angular position sensors, angular rate sensors, angular acceleration sensors, proximity sensors, rollover sensors, occupant presence and position sensors, strain sensors and humidity sensors which utilize wireless data transmission, wireless power transmission, and/or surface acoustic wave technology with the data obtained by the sensors being transmittable via a telematics link to a remote location.

It is still another object of the present invention to provide new and improved sensors for detecting the presence of fluids or gases which utilize wireless data transmission, wireless power transmission, and/or surface acoustic wave technology with the data obtained by the sensors being transmittable via a telematics link to a remote location.

Yet another object of the present invention to provide new and improved sensors for detecting the condition or friction of a road surface which utilize wireless data transmission, wireless power transmission, and/or surface acoustic wave technology with the data obtained by the sensors being transmittable via a telematics link to a remote location.

Still another object of the present invention to provide new and improved sensors for detecting chemicals which utilize wireless data transmission, wireless power transmission, and/or surface acoustic wave technology with the data obtained by the sensors being transmittable via a telematics link to a remote location.

It is another object of the invention to utilize any of the foregoing sensors for a vehicular component control system in which a component, system or subsystem in the vehicle is controlled based on the information provided by the sensor. Additionally, the information provided by the sensor can be transmitted via a telematics link to one or more remote facilities for further analysis.

A more general object of the invention is to provide new and improved sensors which obtain and provide information about the vehicle, about individual components, systems, vehicle occupants, subsystems, or about the roadway, ambient atmosphere, travel conditions and external objects with the data obtained by the sensors being transmittable via a telematics link to a remote location.

Accordingly to achieve one or more of the above objects, a vehicle in accordance with the invention comprises a diagnostic system arranged to diagnose the state of the vehicle or the state of a component of the vehicle and generate an output indicative or representative thereof and a communications device coupled to the diagnostic system and arranged to transmit the output of the diagnostic system. The diagnostic system may comprise a plurality of vehicle sensors mounted on the vehicle, each sensor providing a measurement related to a state of the sensor or a measurement related to a state of the mounting location, and a processor coupled to the sensors and arranged to receive data from the sensors and process the data to generate the output indicative or representative of the state of the vehicle or the state of a component of the vehicle. The sensors may be wirelessly coupled to the processor and arranged at different locations on the vehicle. The processor may embody a pattern recognition algorithm trained to generate the output from the data received from the sensors, such as a neural network, fuzzy logic, sensor fusion and the like, and be arranged to control one or more parts of the vehicle based on the output indicative or representative of the state of the vehicle or the state of a component of the vehicle. The state of the vehicle can include angular motion of the vehicle.

A display may be arranged in the vehicle in a position to be visible from the passenger compartment. Such as display is coupled to the diagnostic system and arranged to display the diagnosis of the state of the vehicle or the state of a component of the vehicle.

A warning device may also be coupled to the diagnostic system for relaying a warning to an occupant of the vehicle relating to the state of the vehicle or the state of the component of the vehicle as diagnosed by the diagnostic system.

The communications device may comprise a cellular telephone system including an antenna as well as other similar or different electronic equipment capable of transmitting a signal to a remote location, optionally via a satellite. Transmission via the Internet, i.e., to a web site or host computer associated with the remote location is also a possibility for the invention. If the vehicle is considered it sown site, then the transmission would be a site-to-site transmission via the Internet.

An occupant sensing system can be provided to determine at least one property or characteristic of occupancy of the vehicle. In this case, the communications device is coupled to the occupant sensing system and transmits the determined property or characteristic of occupancy of the vehicle.

In a similar manner, at least one environment sensor can be provided, each sensing a state of the environment around the vehicle. In this case, the communications device is coupled to the environment sensor(s) and transmits the sensed state of the environment around the vehicle.

Moreover, a location determining system, optionally incorporating GPS technology, could be provided on the vehicle to determine the location of the vehicle and transmitted to the remote location along with the diagnosis of the state of the vehicle or its component.

A memory unit may be coupled to the diagnostic system and the communications device. The memory unit receives the diagnosis of the state of the vehicle or the state of a component of the vehicle from the diagnostic system and stores the diagnosis. The communications device then interrogates the memory unit to obtain the stored diagnosis to enable transmission thereof, e.g., at periodic intervals.

The sensors may be any known type of sensor including, but not limited to, a single axis acceleration sensor, a double axis acceleration sensor, a triaxial acceleration sensor and a gyroscope. The sensors may include an RFID response unit and an RFID interrogator device which causes the RFID response units to transmit a signal representative of the measurement of the associated sensor to the processor. In addition to or instead or an RFID-based system, one or more SAW sensors can be arranged on the vehicle, each receiving a signal and returning a signal modified by virtue of the state of the sensor or the state of the mounting location of the sensor. For example, the SAW sensor can measure temperature and/or pressure of a component of the vehicle or in a certain location or space on the vehicle, or the concentration and/or presence of a chemical A method for monitoring a vehicle comprises diagnosing the state of the vehicle or the state of a component of the vehicle by means of a diagnostic system arranged on the vehicle, generating an output indicative or representative of the diagnosed state of the vehicle or the diagnosed state of the component of the vehicle, and transmitting the output to a remote location. Transmission of the output to a remote location may entail arranging a communications device comprising a cellular telephone system including an antenna on the vehicle. The output may be to a satellite for transmission from the satellite to the remote location. The output could also be transmitted via the Internet to a web site or host computer associated with the remote location.

It is important to note that raw sensor data is not transmitted from the vehicle the remote location for analysis and processing by the devices and/or personnel at the remote location. Rather, in accordance with the invention, a diagnosis of the vehicle or the vehicle component is performed on the vehicle itself and this resultant diagnosis is transmitted.

The diagnosis of the state of the vehicle may encompass determining whether the vehicle is stable or is about to rollover or skid and/or determining a location of an impact between the vehicle and another object.

A display may be arranged in the vehicle in a position to be visible from the passenger compartment in which case, the state of the vehicle or the state of a component of the vehicle is displayed thereon. Further, a warning can be relayed to an occupant of the vehicle relating to the state of the vehicle.

In addition to the transmission of vehicle diagnostic information obtained by analysis of data from sensors performed on the vehicle, at least one property or characteristic of occupancy of the vehicle may be determined (such as the number of occupants, the status of the occupants-breathing or not, injured or not, etc.) and transmitted to a remote location, the same or a different remote location to which the diagnostic information is sent. The information can also be sent in a different manner than the information relating to the diagnosis of the vehicle.

Additional information for transmission by the components on the vehicle may include a state of the environment around the vehicle, for example, the temperature, pressure, humidity, etc. in the vicinity of the vehicle, and the location of the vehicle.

A memory unit may be provided in the vehicle, possibly as part of a microprocessor, and arranged to receive the diagnosis of the state of the vehicle or the state of the component of the vehicle and store the diagnosis. As such, this memory unit can be periodically interrogated to obtain the stored diagnosis to enable transmission thereof.

Diagnosis of the state of the vehicle or the state of the component of the vehicle may entail mounting a plurality of sensors on the vehicle, measuring a state of each sensor or a state of the mounting location of each sensor and diagnosing the state of the vehicle or the state of a component of the vehicle based on the measurements of the state of the sensors or the state of the mounting locations of the sensors. These functions can be achieved by a processor which is wirelessly coupled to the sensors.

The sensors can optionally be provided with RFID technology, i.e., an RFID response unit, whereby an RFID interrogator device is mounted on the vehicle and signals transmitted via the RFID interrogator device causes the RFID response units of any properly equipped sensors to transmit a signal representative of the measurements of that sensor to the processor.

SAW sensors can also be used, in addition to or instead of RFID-based sensors.

One embodiment of the diagnostic module in accordance with the invention utilizes information which already exists in signals emanating from various vehicle components along with sensors which sense these signals and, using pattern recognition techniques, compares these signals with patterns characteristic of normal and abnormal component performance to predict component failure, vehicle instability or a crash earlier than would otherwise occur if the diagnostic module was not utilized. If fully implemented, this invention is a total diagnostic system of the vehicle. In most implementations, the module is attached to the vehicle and electrically connected to the vehicle data bus where it analyzes data appearing on the bus to diagnose components of the vehicle. In some implementations, multiple distributed accelerometers and/or microphones are present on the vehicle and, in some cases, some of the sensors will communicate using wireless technology to the vehicle bus or directly to the diagnostic module.

Principal objects and advantages of this invention or other inventions disclosed herein are thus:

1. To prevent vehicle breakdowns.
2. To alert the driver of the vehicle that a component of the vehicle is functioning differently than normal and might be in danger of failing.
3. To alert the dealer, or other repair facility, that a component of the vehicle is functioning differently than normal and is in danger of failing.
4. To provide an early warning of a potential component failure and to thereby minimize the cost of repairing or replacing the component.
5. To provide a device which will capture available information from signals emanating from vehicle components for a variety of uses such as current and future vehicle diagnostic purposes.
6. To provide a device that uses information from existing sensors for new purposes thereby increasing the value of existing sensors and, in some cases, eliminating the need for sensors that provide redundant information.
7. To provide a device which is trained to recognize deterioration in the performance of a vehicle component, or of the entire vehicle, based on information in signals emanating from the component or from vehicle angular and linear accelerations.
8. To provide a device which analyzes vibrations from various vehicle components that are transmitted through the vehicle structure and sensed by existing vibration sensors such as vehicular crash sensors used with airbag systems or by special vibration sensors, accelerometers, or gyroscopes.
9. To provide a device which provides information to the vehicle manufacturer of the events leading to a component failure.
10. To apply pattern recognition techniques based on training to diagnosing potential vehicle component failures.
11. To apply component diagnostic techniques in combination with intelligent or smart highways wherein vehicles may be automatically guided without manual control in order to permit the orderly exiting of the vehicle from a restricted roadway prior to a breakdown of the vehicle.
12. To apply trained pattern recognition techniques using multiple sensors to provide an early prediction of the existence and severity of an accident.
13. To utilize pattern recognition techniques and the output from multiple sensors to determine at an early stage that a vehicle rollover might occur and to take corrective action through control of the vehicle acceleration, brakes and steering to prevent the rollover or if it is preventable, to deploy side head protection airbags to reduce the injuries.
14. To use the output from multiple sensors to determine that the vehicle is skidding or sliding and to send messages to the various vehicle control systems to activate the throttle, brakes and/or steering to correct for the vehicle sliding or skidding motion.

Other objects and advantages of the present invention will become apparent from the following description of the preferred embodiments taken in conjunction with the accompanying drawings.

BRIEF DESCRIPTION OF THE DRAWINGS

The following drawings are illustrative of embodiments of the system developed or adapted using the teachings of this invention and are not meant to limit the scope of the invention as encompassed by the claims.

FIG. 14 is a partial cutaway view of an interior SAW tire temperature and pressure monitor mounted onto and below the valve stem.

FIG. 14A is a sectioned view of the SAW tire pressure and temperature monitor of FIG. 14 incorporating an absolute pressure SAW device.

FIG. 14B is a sectioned view of the SAW tire pressure and temperature monitor of FIG. 14 incorporating a differential pressure SAW device.

DETAILED DESCRIPTION OF THE INVENTION

As noted above, the invention relates generally to telematics and the transmission of information from a vehicle to one or more remote sites which can react to the position or status of the vehicle or occupant(s) therein.

Initially, sensing of the occupancy of the vehicle and the optional transmission of this information, which may include images, to remote locations will be discussed. This entails obtaining information from various sensors about the occupants in the passenger compartment of the vehicle, e.g., the number of occupants, their type and their motion, if any. Thereafter, a discussion of general vehicle diagnostic methods will be discussed with the diagnosis being transmittable via a communications device to the remote locations. Finally, an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations.

Figure 1:
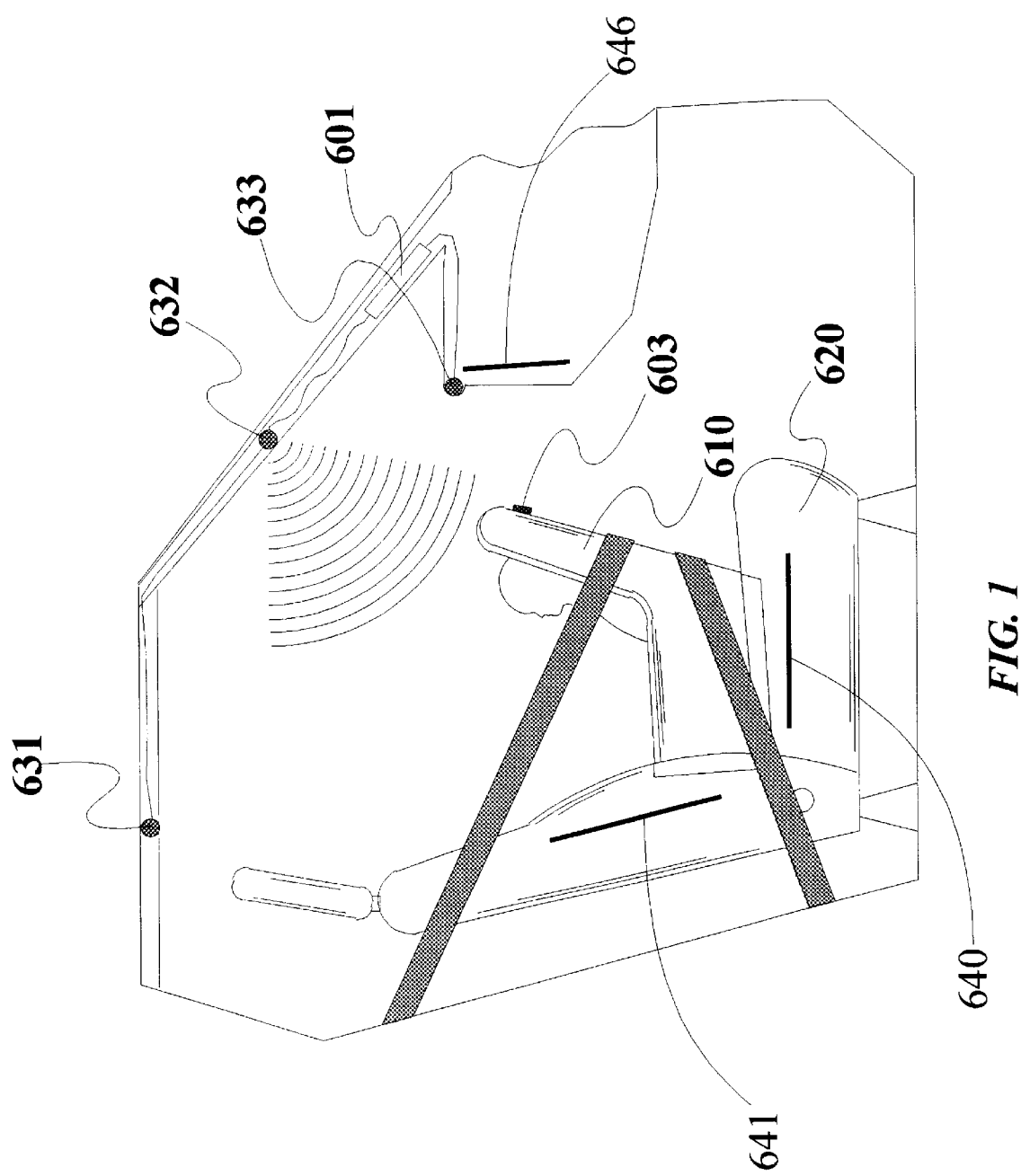
FIG. 1 is a side view with parts cutaway and removed of a vehicle showing the passenger compartment containing a rear facing child seat on the front passenger seat and a preferred mounting location for an occupant and rear facing child seat presence detector.

Referring to the accompanying drawings wherein the same reference numerals refer to the same or similar elements, FIG. 1 is a side view, with parts cutaway and removed of a vehicle showing the passenger compartment containing a rear facing child seat 610 on a front passenger seat 620 and one mounting location for a first embodiment of a vehicle interior monitoring system in accordance with the invention. The interior monitoring system is capable of detecting the presence of an object, determining the type of object, determining the location of the object, and/or determining another property or characteristic of the object. A property of the object could be the orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out of position relative to the airbag.

In this embodiment, six transducers 631, 632, 633, 640, 641 and 646 are used, although any number of transducers may be used. Each transducer 631, 632, 633, 640, 641, 646 may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

Such transducers or receivers may be of the type which emit or receive a continuous signal, a time varying signal (such as a capacitor or electric field sensor) or a spacial varying signal such as in a scanning system. One particular type of radiation-receiving receiver for use in the invention is a receiver capable of receiving electromagnetic waves.

When ultrasonic energy is used, transducer 632 can be used as a transmitter and transducers 631,633 as receivers. Naturally, other combinations can be used such as where all transducers are transceivers (transmitters and receivers). For example, transducer 632 can be constructed to transmit ultrasonic energy toward the front passenger seat, which is modified, in this case by the occupying item of the passenger seat, i.e., the rear facing child seat 610, and the modified waves are received by the transducers 631 and 633, for example. A more common arrangement is where transducers 631, 632 and 633 are all transceivers. Modification of the ultrasonic energy may constitute reflection of the ultrasonic energy as the ultrasonic energy is reflected back by the occupying item of the seat. The waves received by transducers 631 and 633 vary with time depending on the shape of the object occupying the passenger seat, in this case the rear facing child seat 610. Each object will reflect back waves having a different pattern. Also, the pattern of waves received by transducer 631 will differ from the pattern received by transducer 633 in view of its different mounting location. This difference generally permits the determination of location of the reflecting surface (i.e., the rear facing child seat 610) through triangulation. Through the use of two transducers 631,633, a sort of stereographic image is received by the two transducers and recorded for analysis by processor 601, which is coupled to the transducers 631,632, 633. This image will differ for each object that is placed on the vehicle seat and it will also change for each position of a particular object and for each position of the vehicle seat. Elements 631, 632, 633, although described as transducers, are representative of any type of component used in a wave-based analysis technique.

Mention is made above of the use of wave-type sensors as the transducers 631, 632, 633 as well as electric field sensors. Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between/near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus for the purposes of this invention, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Pat. No. 5,702,634.

An electromagnetic field disturbed or emitted by a passenger in the case of an electromagnetic wave sensor, for example, and the electric field sensor of Kithil, for example, are in many ways similar and equivalent for the purposes of this invention. The electromagnetic wave sensor is an actual electromagnetic wave sensor by definition because they sense parameters of a wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5–7): "The proximity sensor 12 each function by creating an electrostatic field between oscillator input loop 54 and detector output loop 56, which is affected by presence of a person near by, as a result of capacitive coupling, ... "). It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/near the plates of the capacitor.

Kithil declares that his capacitance sensor uses a static electric field. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasi-static electric field in the space between the capacitor plates, and a detector to reveal an informative change of the sensor capacitance caused by the presence of an occupant (see FIG. 7 and its description). In this case, the system becomes a "wave sensor" in the sense that it starts generating actual time-varying electric field that certainly originates electromagnetic waves according to the definition above. That is, Kithil's sensor can be treated as a wave sensor regardless of the shape of the electric field that it creates, a beam or a spread shape.

As follows from the Kithil patent, the capacitor sensor is likely a parametric system where the capacitance of the sensor is controlled by influence of the passenger body. This influence is transferred by means of the near electromagnetic field (i.e., the wave-like process) coupling the capacitor electrodes and the body. It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares the coupling is due to a static electric field, such a situation is not realized in his system because an alternating electromagnetic field ("quasi-wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. Physics. A progressive disturbance propagated from point to point in a medium or space without progress or advance of the points themselves, ... ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam-type electromagnetic wave sensor.

For ultrasonic systems, the "image" recorded from each ultrasonic transducer/receiver, is actually a time series of digitized data of the amplitude of the received signal versus time. Since there are two receivers, two time series are obtained which are processed by the processor 601. The processor 601 may include electronic circuitry and associated, embedded software. Processor 601 constitutes one form of generating means in accordance with the invention which generates information about the occupancy of the passenger compartment based on the waves received by the transducers 631,632,633.

When different objects are placed on the front passenger seat, the two images from transducers 631,633, for example, are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see U.S. Pat. No. 5,943,295 to Varga et. al., which is incorporated herein by reference.

The determination of these rules is important to the pattern recognition techniques used in this invention. In general, three approaches have been useful, artificial intelligence, fuzzy logic and artificial neural networks (including cellular and modular or combination neural networks and support vector machines) (although additional types of pattern recognition techniques may also be used, such as sensor fusion). In some implementations of this invention, such as the determination that there is an object in the path of a closing window as described below, the rules are sufficiently obvious that a trained researcher can sometimes look at the returned signals and devise a simple algorithm to make the required determinations. In others, such as the determination of the presence of a rear facing child seat or of an occupant, artificial neural networks are used to determine the rules. One such set of neural network software for determining the pattern recognition rules is available from the NeuralWare Corporation of Pittsburgh, Pa.

The system used in a preferred implementation of this invention for the determination of the presence of a rear facing child seat, of an occupant or of an empty seat is the artificial neural network. In this case, the network operates on the two returned signals as sensed by transducers 631 and 633, for example. Through a training session, the system is taught to differentiate between the three cases. This is done by conducting a large number of experiments where all possible child seats are placed in all possible orientations on the front passenger seat. Similarly, a sufficiently large number of experiments are run with human occupants and with boxes, bags of groceries and other objects (both inanimate and animate). Sometimes as many as 1,000,000 such experiments are run before the neural network is sufficiently trained so that it can differentiate among the three cases and output the correct decision with a very high probability. Of course, it must be realized that a neural network can also be trained to differentiate among additional cases, e.g., a forward facing child seat.

Once the network is determined, it is possible to examine the result using tools supplied by NeuralWare or International Scientific Research, for example, to determine the rules that were finally arrived at by the trial and error techniques. In that case, the rules can then be programmed into a microprocessor resulting in a fuzzy logic or other rule based system. Alternately, a neural computer, or cellular neural network, can be used to implement the net directly. In either case, the implementation can be carried out by those skilled in the art of pattern recognition. If a microprocessor is used, a memory device is also required to store the data from the analog to digital converters that digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

Electromagnetic energy based occupant sensors exist that use many portions of the electromagnetic spectrum. A system based on the ultraviolet, visible or infrared portions of the spectrum generally operate with a transmitter and a receiver of reflected radiation. The receiver may be a camera or a photo detector such as a pin or avalanche diode as described in detail in above-referenced patents and patent applications. At other frequencies, the absorption of the electromagnetic energy is primarily and at still other frequencies the capacitance or electric field influencing effects are used. Generally, the human body will reflect, scatter, absorb or transmit electromagnetic energy in various degrees depending on the frequency of the electromagnetic waves. All such occupant sensors are included herein.

In the embodiment wherein electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 631, 632, 633 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupants of the vehicle prior to the accident. In this manner, it can be ascertained whether the driver was falling asleep, talking on the phone, etc.

A memory device for storing the images of the passenger compartment, and also for receiving and storing any of the other information, parameters and variables relating to the vehicle or occupancy of the vehicle, may be in the form a standardized "black box" (instead of or in addition to a memory part in a processor 601). The IEEE Standards Association is currently beginning to develop an international standard for motor vehicle event data recorders. The information stored in the black box and/or memory unit in the processor 601, can include the images of the interior of the passenger compartment as well as the number of occupants and the health state of the occupants. The black box would preferably be tamper-proof and crash-proof and enable retrieval of the information after a crash.

Figure 2:
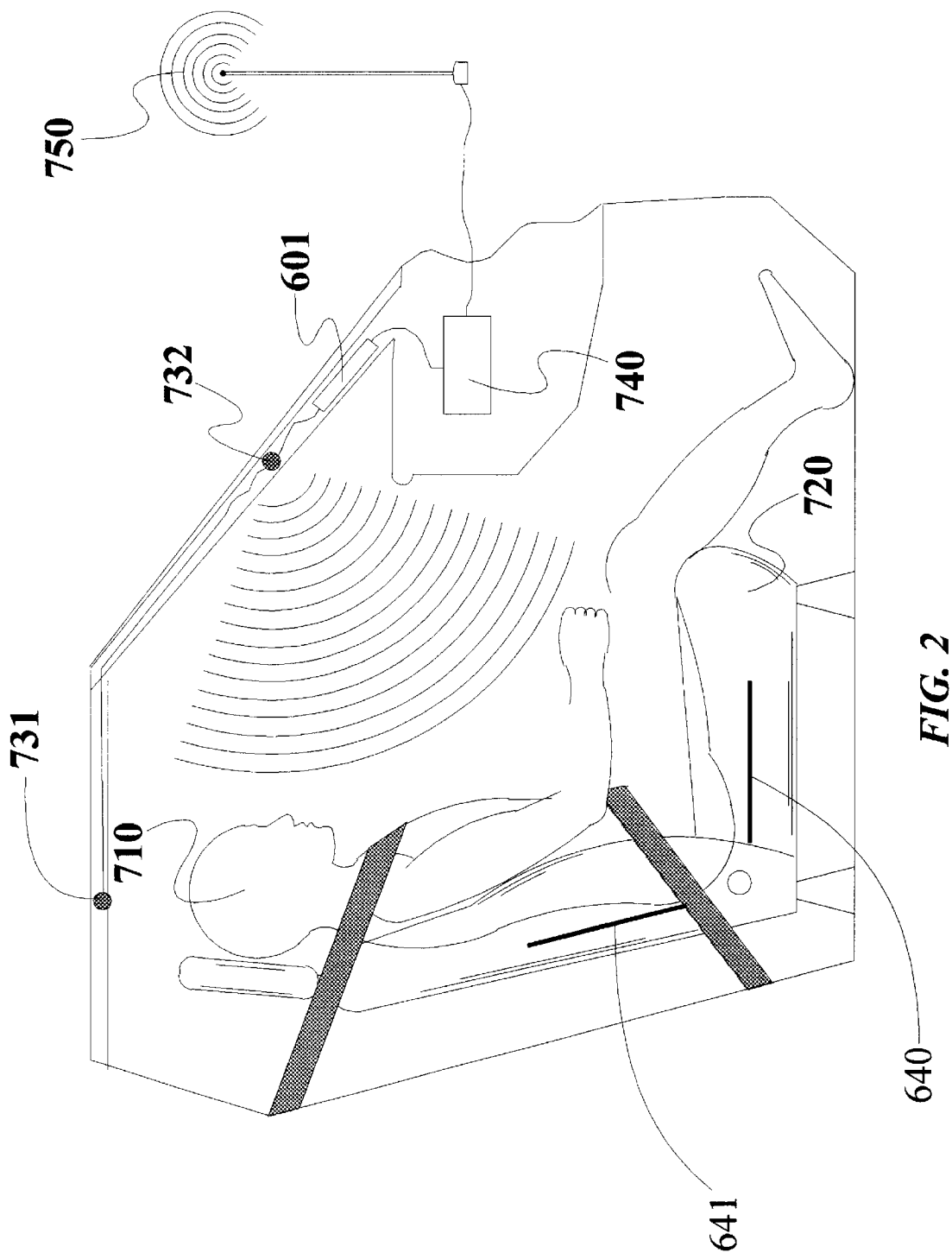
FIG. 2 is a side view with parts cutaway and removed showing schematically the interface between the vehicle interior monitoring system of this invention and the vehicle cellular communication system.

FIG. 2 shows schematically the interface between a vehicle interior monitoring system in accordance with the invention and the vehicle's cellular or other telematics communication system. An adult occupant 710 is shown sitting on the front passenger seat 720 and four transducers 731, 732, 640 and 641 are used to determine the presence (or absence) of the occupant on that seat 720. One of the transducers 732 in this case acts as both a transmitter and receiver while transducer 731 acts only as a receiver. Alternately, transducer 731 could serve as both a transmitter and receiver or the transmitting function could be alternated between the two devices. Also, in many cases more that two transmitters and receivers are used and in still other cases other types of sensors, such as electric field, capacitance, self-tuning antennas (collectively represented by 140 and 141), weight, seatbelt, heartbeat, motion and seat position sensors, are also used in combination with the radiation sensors.

For a general object, transducers 731, 732, 140, 141 can also be used to determine the type of object, determine the location of the object, and/or determine another property or characteristic of the object. A property of the object could be the orientation of a child seat, the velocity of an adult and the like. For example, the transducers 731, 732, 140, 141 can be designed to enable a determination that an object is present on the seat, that the object is a child seat and that the child seat is rear-facing.

The transducers 731 and 732 are attached to the vehicle buried in the A-pillar trim, where their presence can be disguised, and are connected to processor 601 that may also be hidden in the trim as shown (this being a non-limiting position for the processor 601). The A-pillar is the roof support pillar that is closest to the front of the vehicle and which, in addition to supporting the roof, also supports the front windshield and the front door. Other mounting locations can also be used. For example, transducers 731, 732 can be mounted inside the seat (along with or in place of transducers 140 and 141), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in the above-referenced patent applications and all of these mounting locations are contemplated for use with the transducers described herein.

The cellular phone or other communications system 740 outputs to an antenna 750A. The transducers 731, 732, 140 and 141 in conjunction with the pattern recognition hardware and software, which is implemented in processor 601 and is packaged on a printed circuit board or flex circuit along with the transducers 731 and 732, determine the presence of an occupant within a few seconds after the vehicle is started, or within a few seconds after the door is closed. Similar systems located to monitor the remaining seats in the vehicle, also determine the presence of occupants at the other seating locations and this result is stored in the computer memory which is part of each monitoring system processor 601.

Periodically and in particular in the event of an accident, the electronic system associated with the cellular phone system 740 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials the EMS operator (such as 911 or through a telematics service such as OnStart®) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating locations or at multiple seating locations with a provision being made to eliminate repetitive count of occupants. A determination can also be made using the transducers as to whether the life forms are humans, or more specifically, adults, child in child seas, etc. As noted above and below, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number and position of transducers and training of the pattern recognition algorithm.

In addition to the use of transducers to determine the presence and location of occupants in a vehicle, other sensors could also be used. For example, a heartbeat sensor which determines the number and presence of heartbeats can also be arranged in the vehicle, which would thus also determine the number of occupants as the number of occupants would be equal to the number of heartbeats. Conventional heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the 'seat, if such a human occupant is present. The output of the heartbeat sensor is input to the processor of the interior monitoring system. One heartbeat sensor for use in the invention may be of the types as disclosed in McEwan (U.S. Pat. Nos. 5,573,012 and 5,766,208 which are incorporated herein in their entirety by reference). The heartbeat sensor can be positioned at any convenient position relative to the seats where occupancy is being monitored. A preferred location is within the vehicle seatback.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system heretofore is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Pat. No. 5,361,070, which is incorporated herein by reference), as well as many other patents by the same inventor. Motion sensing is accomplished by monitoring a particular range from the sensor as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency is also possible. Additionally, multiple MIR sensors can be used when high speed tracking of the motion of an occupant during a crash is required since they can be individually pulsed without interfering with each through time division multiplexing.

An alternative way to determine motion of the occupant (s) is to monitor the weight distribution of the occupant whereby changes in weight distribution after an accident would be highly suggestive of movement of the occupant. A system for determining the weight distribution of the occupants could be integrated or otherwise arranged in the seats 620, 720 of the vehicle and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar®.

Figure 3:
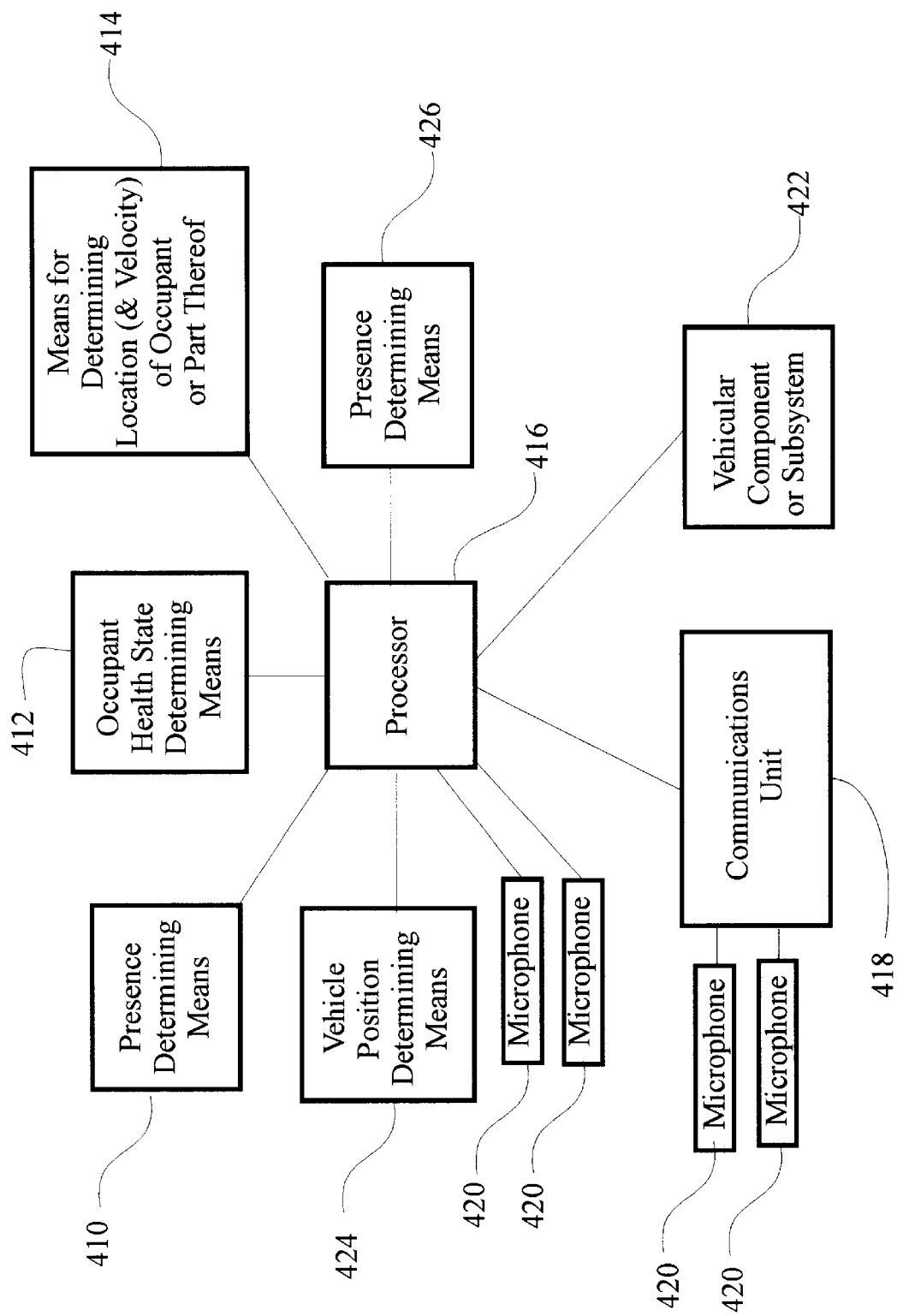
FIG. 3 is a diagram of one exemplifying embodiment of the invention.

FIG. 3 shows a schematic diagram of an embodiment of the invention including a system for determining the presence and health state of any occupants of the vehicle and a telecommunications link. This embodiment includes means for determining the presence of any occupants 410 which may take the form of a heartbeat sensor or motion sensor as described above and means for determining the health state of any occupants 412. The latter means may be integrated into the means for determining the presence of any occupants, i.e., one and the same component, or separate therefrom. Further, means for determining the location, and optionally velocity, of the occupants or one or more parts thereof 414 are provided and may be any conventional occupant position sensor or preferably, one of the occupant position sensors as described herein (e.g., those utilizing waves, electromagnetic radiation or electric fields) or as described in the current assignee's patents and patent applications referenced above.

A processor 416 is coupled to the presence determining means 410, the health state determining means 412 and the location determining means 414. A communications unit 418 is coupled to the processor 416. The processor 416 and/or communications unit 418 can also be coupled to microphones 420 that can be distributed throughout the vehicle and include voice-processing circuitry to enable the occupant(s) to effect vocal control of the processor 416, communications unit 418 or any coupled component or oral communications via the communications unit 418. The processor 416 is also coupled to another vehicular system, component or subsystem 422 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 424 could be coupled to the processor 416 and provides an indication of the absolute position of the vehicle, preferably using satellite-based positioning technology (e.g., a GPS receiver).

In normal use (other than after a crash), the presence determining means 410 determine whether any human occupants are present, i.e., adults or children, and the location determining means 414 determine the occupant's location. The processor 416 receives signals representative of the presence of occupants and their location and determines whether the vehicular system, component or subsystem 422 can be modified to optimize its operation for the specific arrangement of occupants. For example, if the processor 416 determines that only the front seats in the vehicle are occupied, it could control the heating system to provide heat only through vents situated to provide heat for the front-seated occupants.

Another possible vehicular system, component or subsystem is a navigational aid, i.e., a route display or map. In this case, the position of the vehicle as determined by the positioning system 424 is conveyed through processor 416 to the communications unit 418 to a remote facility and a map is transmitted from this facility to the vehicle to be displayed on the route display. If directions are needed, a request for the same could be entered into an input unit 426 associated with the processor 416 and transmitted to the facility. Data for the display map and/or vocal instructions could be transmitted from this facility to the vehicle.

Moreover, using this embodiment, it is possible to remotely monitor the health state of the occupants in the vehicle and most importantly, the driver. The health state determining means 412 may be used to detect whether the driver's breathing is erratic or indicative of a state in which the driver is dozing off. The health state determining means 412 could also include a breath-analyzer to determine whether the driver's breath contains alcohol. In this case, the health state of the driver is relayed through the processor 416 and the communications unit 418 to the remote facility and appropriate action can be taken. For example, it would be possible to transmit a command to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 422.

In use after a crash, the presence determining means 410, health state determining means 412 and location determining means 414 can obtain readings from the passenger compartment and direct such readings to the processor 416. The processor 416 analyzes the information and directs or controls the transmission of the information about the occupant(s) to a remote, manned facility. Such information would include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making noise. Moreover, the communications link through the communications unit 418 can be activated immediately after the crash to enable personnel at the remote facility to initiate communications with the vehicle.

Figure 4:
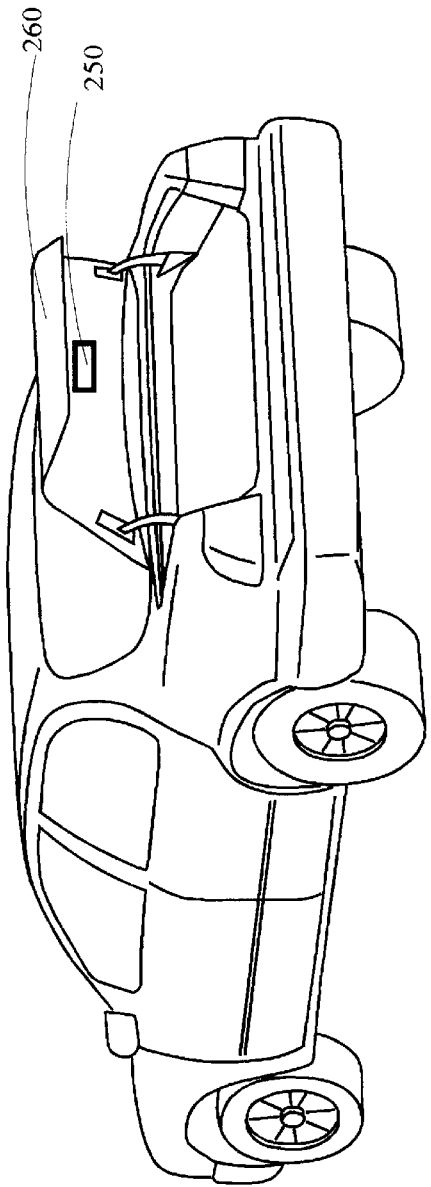
FIG. 4 is a perspective view of a carbon dioxide SAW sensor for mounting in the trunk lid for monitoring the inside of the trunk for detecting trapped children or animals.
Figure 4A:
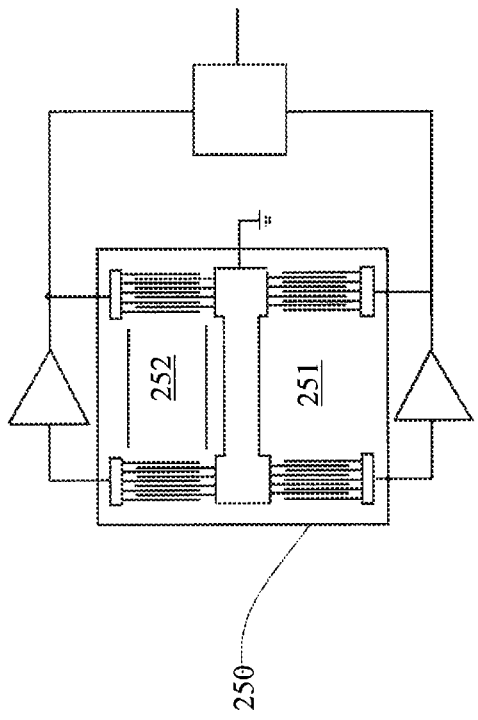
FIG. 4A is a detailed view of the SAW carbon dioxide sensor of FIG. 4.

An occupant sensing system can also involve sensing for the presence of a living occupant in a trunk of a vehicle or in a closed vehicle, for example, when a child is inadvertently left in the vehicle or enters the trunk and the trunk closes. To this end, a SAW-based chemical sensor 250 is illustrated in FIG. 4A for mounting in a vehicle trunk as illustrated in FIG. 4. The chemical sensor 250 is designed to measure carbon dioxide concentration through the mass loading effects as described in U.S. Pat. No. 4,895,017, which is incorporated by reference herein, with a polymer coating selected that is sensitive to carbon dioxide. The speed of the surface acoustic wave is a function of the carbon dioxide level in the atmosphere. Section 252 of the chemical sensor 250 contains a coating of such a polymer and the acoustic velocity in this section is a measure of the carbon dioxide concentration. Temperature effects are eliminated through a comparison of the sonic velocities in sections 251 and 252 as described above.

Thus, when trunk lid 260 is closed and a source of carbon dioxide such as a child or animal is trapped within the trunk, the chemical sensor 250 will provide information indicating the presence of the carbon dioxide producing object to the interrogator which can then release the trunk lock permitting trunk to automatically open. In this manner, the problem of children and animals suffocating in closed trunks is eliminated. Alternately, information that a person or animal is trapped in a trunk can be sent by the telematics system to law enforcement authorities or other location remote from the vehicle.

A similar device can be distributed at various locations within the passenger compartment of vehicle along with a combined temperature sensor. If the car has been left with a child or other animal while owner is shopping, for example, and if the temperature rises within the vehicle to an unsafe level or, alternately, if the temperature drops below an unsafe level, then the vehicle can be signaled to take appropriate action which may involve opening the windows or starting the vehicle with either air conditioning or heating as appropriate. Alternately, information that a person or animal is trapped within a vehicle can be sent by the telematics system to law enforcement authorities or other location remote from the vehicle. Thus, through these simple wireless powerless sensors, the problem of suffocation either from lack of oxygen or death from excessive heat or cold can all be solved in a simple, low-cost manner through using an interrogator as disclosed in the current assignee's U.S. patent application Ser. No. 10/079,065 incorporated by reference herein in its entirety.

Additionally, a sensitive layer on a SAW can be made to be sensitive to other chemicals such as water vapor for humidity control or alcohol for drunk driving control. Similarly, the sensitive layer can be designed to be sensitive to carbon monoxide thereby preventing carbon monoxide poisoning. Many other chemicals can be sensed for specific applications such as to check for chemical leaks in commercial vehicles, for example. Whenever such a sensor system determines that a dangerous situation is developing, an alarm can be sounded and/or the situation can be automatically communicated to an off vehicle location through telematics, a cell phone such as a 911 call, the Internet or though a subscriber service such as OnStar®.

Described above is a system for determining the status of occupants in a vehicle, and in the event of an accident or at any other appropriate time, transmitting the status of the occupants, and optionally additional information, via a communications channel or link to a remote monitoring facility. In addition to the status of the occupant, it is also important to be able to analyze the operating conditions of the vehicle and detect when a component of the vehicle is about to fail. By notifying the driver of the impending failure of the component, appropriate corrective action can be taken to avoid such failure.

The operating conditions of the vehicle can also be transmitted along with the status of the occupants to a remote monitoring facility. The operating conditions of the vehicle include whether the motor is running and whether the vehicle is moving. Thus, in a general embodiment in which information on both occupancy of the vehicle and the operating conditions of the vehicle are transmitted, one or more properties or characteristics of occupancy of the vehicle are determined, such constituting information about the occupancy of the vehicle, and one or more states of the vehicle or of a component of the vehicle is determined, such constituting information about the operation of the vehicle. The information about the occupancy of the vehicle and operation of the vehicle are selectively transmitted, possibly the information about occupancy to an emergency response center and the information about the vehicle to a dealer or repair facility.

Transmission of the information about the operation of the vehicle, i.e., diagnostic information, may be achieved via a satellite and/or via the Internet. The vehicle would thus include appropriate electronic hardware and/or software to enable the transmission of a signal to a satellite, from where it could be re-transmitted to a remote location, and/or to enable the transmission to a web site or host computer. In the latter case, the vehicle could be assigned a domain name or e-mail address for identification or transmission origination purposes It is important to appreciate that the preferred embodiment of the vehicle diagnostic unit described below performs the diagnosis, i.e., processes the input from the various sensors, on the vehicle using for example a processor embodying a pattern recognition technique such as a neural network. The processor thus receives data or signals from the sensors and generates an output indicative or representative of the operating conditions of the vehicle or its component. A signal could thus be generated indicative of an underinflated tire, or an overheating engine.

For the discussion below, the following terms are defined as follows:

The term "component" refers to any part or assembly of parts which is mounted to or a part of a motor vehicle and which is capable of emitting a signal representative of its operating state. The following is a partial list of general automobile and truck components, the list not being exclusive:

engine;
transmission;
brakes and associated brake assembly;
tires;

wheel;
steering wheel and steering column assembly;
water pump;
alternator;
shock absorber;
wheel mounting assembly;
radiator;
battery;
oil pump;
fuel pump;
air conditioner compressor;
differential gear;
exhaust system;
fan belts;
engine valves;
steering assembly;
vehicle suspension including shock absorbers;
vehicle wiring system; and
engine cooling fan assembly.

The term "sensor" refers to any measuring or sensing device mounted on a vehicle or any of its components including new sensors mounted in conjunction with the diagnostic module in accordance with the invention. A partial, non-exclusive list of common sensors mounted on an automobile or truck is as follows:

airbag crash sensor;
accelerometer;
microphone;
camera;
antenna, capacitance sensor or other electromagnetic wave sensor;
stress or strain sensor;
pressure sensor;
weight sensor;
magnetic field sensor;
coolant thermometer;
oil pressure sensor;
oil level sensor;
air flow meter;
voltmeter;
ammeter;
humidity sensor;
engine knock sensor;
oil turbidity sensor;
throttle position sensor;
steering wheel torque sensor;
wheel speed sensor;
tachometer;
speedometer;
other velocity sensors;
other position or displacement sensors;
oxygen sensor;
yaw, pitch and roll angular sensors;
clock;
odometer;
power steering pressure sensor;
pollution sensor;
fuel gauge;
cabin thermometer;
transmission fluid level sensor;
gyroscopes or other angular rate sensors including yaw, pitch and roll rate sensors;
coolant level sensor;
transmission fluid turbidity sensor;
break pressure sensor;
tire pressure sensor;
tire temperature sensor, and
coolant pressure sensor.

The term "signal" herein refers to any time varying output from a component including electrical, acoustic, thermal, or electromagnetic radiation, or mechanical vibration.

Sensors on a vehicle are generally designed to measure particular parameters of particular vehicle components. However, frequently these sensors also measure outputs from other vehicle components. For example, electronic airbag crash sensors currently in use contain an accelerometer for determining the accelerations of the vehicle structure so that the associated electronic circuitry of the airbag crash sensor can determine whether a vehicle is experiencing a crash of sufficient magnitude so as to require deployment of the airbag. This accelerometer continuously monitors the vibrations in the vehicle structure regardless of the source of these vibrations. If a wheel is out of balance, or if there is extensive wear of the parts of the front wheel mounting assembly, or wear in the shock absorbers, the resulting abnormal vibrations or accelerations can, in many cases, be sensed by the crash sensor accelerometer. There are other cases, however, where the sensitivity or location of the airbag crash sensor accelerometer is not appropriate and one or more additional accelerometers may be mounted onto a vehicle for the purposes of this invention. Some airbag crash sensors are not sufficiently sensitive accelerometers or have sufficient dynamic range for the purposes herein.

Every component of a vehicle emits various signals during its life. These signals can take the form of electromagnetic radiation, acoustic radiation, thermal radiation, vibrations transmitted through the vehicle structure, and voltage or current fluctuations, depending on the particular component. When a component is functioning normally, it may not emit a perceptible signal. In that case, the normal signal is no signal, i.e., the absence of a signal. In most cases, a component will emit signals that change over its life and it is these changes which contain information as to the state of the component, e.g., whether failure of the component is impending. Usually components do not fail without warning. However, most such warnings are either not perceived or if perceived are not understood by the vehicle operator until the component actually fails and, in some cases, a breakdown of the vehicle occurs. In a few years, it is expected that various roadways will have systems for automatically guiding vehicles operating thereon. Such systems have been called "smart highways" and are part of the field of intelligent transportation systems (ITS). If a vehicle operating on such a smart highway were to breakdown, serious disruption of the system could result and the safety of other users of the smart highway could be endangered.

In accordance with the invention, each of these signals emitted by the vehicle components is converted into electrical signals and then digitized (i.e., the analog signal is converted into a digital signal) to create numerical time series data which is then entered into a processor. Pattern recognition algorithms then are applied in the processor to attempt to identify and classify patterns in this time series data. For a particular component, such as a tire for example, the algorithm attempts to determine from the relevant digital data whether the tire is functioning properly or whether it requires balancing, additional air, or perhaps replacement.

Frequently, the data entered into the computer needs to be preprocessed before being analyzed by a pattern recognition algorithm. The data from a wheel speed sensor, for example, might be used as is for determining whether a particular tire is operating abnormally in the event it is unbalanced, whereas the integral of the wheel speed data over a long time period (a preprocessing step), when compared to such sensors on different wheels, might be more useful in determining whether a particular tire is going flat and therefore needs air. In some cases, the frequencies present in a set of data are a better predictor of component failures than the data itself. For example, when a motor begins to fail due to worn bearings, certain characteristic frequencies began to appear. In most cases, the vibrations arising from rotating components, such as the engine, will be normalized based on the rotational frequency as disclosed in the NASA TSP referenced above. Moreover, the identification of which component is causing vibrations present in the vehicle structure can frequently be accomplished through a frequency analysis of the data. For these cases, a Fourier transformation of the data is made prior to entry of the data into a pattern recognition algorithm. Other mathematical transformations are also made for particular pattern recognition purposes in practicing the teachings of this invention. Some of these include shifting and combining data to determine phase changes for example, differentiating the data, filtering the data, and sampling the data. Also, there exist certain more sophisticated mathematical operations that attempt to extract or highlight specific features of the data. This invention contemplates the use of a variety of these preprocessing techniques and the choice of which ones is left to the skill of the practitioner designing a particular diagnostic module.

Another technique that is contemplated for some implementations of this invention is the use of multiple accelerometers and/or microphones that will allow the system to locate the source of any measured vibrations based on the time of flight and/or triangulation techniques. Once a distributed accelerometer installation has been implemented to permit this source location, the same sensors can be used for smarter crash sensing as it will permit the determination of the location of the impact on the vehicle. Once the impact location is known, a highly tailored algorithm can be used to accurately forecast the crash severity making use of a knowledge on the force vs. crush properties of the vehicle at the impact location.

When a vehicle component begins to change its operating behavior, it is not always apparent from the particular sensors, if any, which are monitoring that component. The output from any one of these sensors can be normal even though the component is failing. By analyzing the output of a variety of sensors, however, the pending failure can be diagnosed. For example, the rate of temperature rise in the vehicle coolant, if it were monitored, might appear normal unless it were known that the vehicle was idling and not traveling down a highway at a high speed. Even the level of coolant temperature which is in the normal range could be in fact abnormal in some situations signifying a failing coolant pump, for example, but not detectable from the coolant thermometer alone.

The pending failure of some components is difficult to diagnose and sometimes the design of the component requires modification so that the diagnosis can be more readily made. A fan belt, for example, frequently begins failing by a cracking of the inner surface. The belt can be designed to provide a sonic or electrical signal when this cracking begins in a variety of ways. Similarly, coolant hoses can be designed with an intentional weak spot where failure will occur first in a controlled manner that can also cause a whistle sound as a small amount of steam exits from the hose. This whistle sound can then be sensed by a general purpose microphone, for example.

Figure 5:
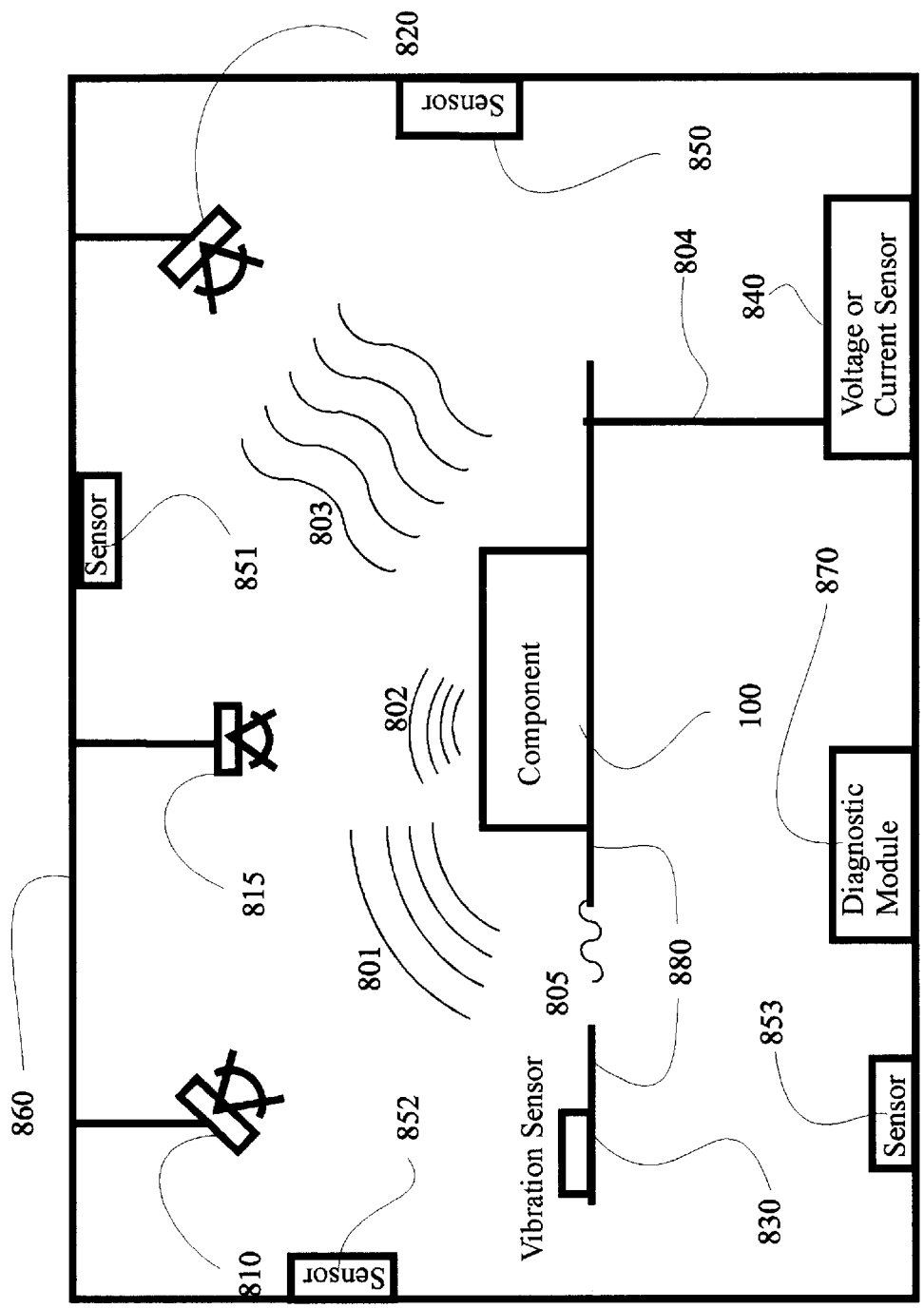
FIG. 5 is a schematic illustration of a generalized component with several signals being emitted and transmitted along a variety of paths, sensed by a variety of sensors and analyzed by the diagnostic module in accordance with the invention and for use in a method in accordance with the invention.

In FIG. 5, a generalized component 800 emitting several signals which are transmitted along a variety of paths, sensed by a variety of sensors and analyzed by the diagnostic device in accordance with the invention is illustrated schematically. Component 800 is mounted to a vehicle 880 and during operation it emits a variety of signals such as acoustic 801, electromagnetic radiation 802, thermal radiation 803, current and voltage fluctuations in conductor 804 and mechanical vibrations 805. Various sensors are mounted in the vehicle to detect the signals emitted by the component 800. These include one or more vibration sensors (accelerometers) 830, 850 and/or gyroscopes also mounted to the vehicle, one or more acoustic sensors 810, 851, electromagnetic radiation sensor 815, heat radiation sensor 820, and voltage or current sensor 840.

In addition, various other sensors 852, 853 measure other parameters of other components that in some manner provide information directly or indirectly on the operation of component 800. All of the sensors illustrated on FIG. 5 can be connected to a data bus 860. A diagnostic module 870, in accordance with the invention, can also be attached to the vehicle data bus 860 and receives the signals generated by the various sensors. The sensors may however be wirelessly connected to the diagnostic module 870 and be integrated into a wireless power and communications system or a combination of wired and wireless connections.

As shown in FIG. 5, the diagnostic module 870 has access to the output data of each of the sensors that have information relative to the component 800. This data appears as a series of numerical values each corresponding to a measured value at a specific point in time. The cumulative data from a particular sensor is called a time series of individual data points. The diagnostic module 870 compares the patterns of data received from each sensor individually, or in combination with data from other sensors, with patterns for which the diagnostic module has been trained to determine whether the component is functioning normally or abnormally.

Important to this invention is the manner in which the diagnostic module 870 determines a normal pattern from an abnormal pattern and the manner in which it decides what data to use from the vast amount of data available. This is accomplished using pattern recognition technologies such as artificial neural networks and training. The theory of neural networks including many examples can be found in several books on the subject including: (1) *Techniques And Application Of Neural Networks*, edited by Taylor, M. and Lisboa, P., Ellis Horwood, West Sussex, England, 1993; (2) *Naturally Intelligent Systems*, by Caudill, M. and Butler, C., MIT Press, Cambridge Mass., 1990; (3) J. M. Zaruda, *Introduction to Artificial Neural Systems*, West publishing Co., N.Y., 1992, (4) *Digital Neural Networks*, by Kung, S. Y., PTR Prentice Hall, Englewood Cliffs, N.J., 1993, Eberhart, R., Simpson, P., (5) Dobbins, R., *Computational Intelligence PC Tools*, Academic Press, Inc., 1996, Orlando, Fla., (6) Cristianini, N. and Shawe-Taylor, J. *An Introduction to Support Vector Machines and other kernal-based learning methods*, Cambridge University Press, Cambridge England, 2000; (7) *Proceedings of the 2000 6$^{th}$ IEEE International Workshop on Cellular Neural Networks and their Applica-* tions (*CNNA* 2000), IEEE, Piscataway N.J.; and (8) Sinha, N. K. and Gupta, M. M. *Soft Computing & Intelligent Systems*, Academic Press 2000 San Diego, Calif., all of which are incorporated herein by reference. The neural network pattern recognition technology is one of the most developed of pattern recognition technologies. The invention described herein frequently uses combinations of neural networks to improve the pattern recognition process.

The neural network pattern recognition technology is one of the most developed of pattern recognition technologies. The neural network will be used here to illustrate one example of a pattern recognition technology but it is emphasized that this invention is not limited to neural networks. Rather, the invention may apply any known pattern recognition technology including sensor fusion and various correlation technologies. A brief description of a particular example of a neural network pattern recognition technology is set forth below.

Neural networks are constructed of processing elements known as neurons that are interconnected using information channels call interconnects. Each neuron can have multiple inputs but only one output. Each output however is usually connected to all other neurons in the next layer. The neurons in the first layer operate collectively on the input data as described in more detail below. Neural networks learn by extracting relational information from the data and the desired output. Neural networks have been applied to a wide variety of pattern recognition problems including automobile occupant sensing, speech recognition, optical character recognition, and handwriting analysis.

To train a neural network, data is provided in the form of one or more time series that represents the condition to be diagnosed as well as normal operation. As an example, the simple case of an out of balance tire will be used. Various sensors on the vehicle can be used to extract information from signals emitted by the tire such as an accelerometer, a torque sensor on the steering wheel, the pressure output of the power steering system, a tire pressure monitor or tire temperature monitor. Other sensors that might not have an obvious relationship to tire unbalance are also included such as, for example, the vehicle speed or wheel speed that can be determined from the ABS system. Data is taken from a variety of vehicles where the tires were accurately balanced under a variety of operating conditions also for cases where varying amounts of unbalance was intentionally introduced. Once the data had been collected, some degree of preprocessing or feature extraction is usually performed to reduce the total amount of data fed to the neural network. In the case of the unbalanced tire, the time period between data points might be chosen such that there are at least ten data points per revolution of the wheel. For some other application, the time period might be one minute or one millisecond.

Once the data has been collected, it is processed by a neural network-generating program, for example, if a neural network pattern recognition system is to be used. Such programs are available commercially, e.g., from NeuralWare of Pittsburgh, Pa. or from International Scientific Research, Inc., of Romeo Mich. for modular neural networks. The program proceeds in a trial and error manner until it successfully associates the various patterns representative of abnormal behavior, an unbalanced tire, with that condition. The resulting neural network can be tested to determine if some of the input data from some of the sensors, for example, can be eliminated. In this way, the engineer can determine what sensor data is relevant to a particular diagnostic problem. The program then generates an algorithm that is programmed onto a microprocessor, microcontroller, neural processor, FPGA, or DSP (herein collectively referred to as a microprocessor or processor). Such a microprocessor appears inside the diagnostic module 870 in FIG. 5. Once trained, the neural network, as represented by the algorithm, will now recognize an unbalanced tire on a vehicle when this event occurs. At that time, when the tire is unbalanced, the diagnostic module 870 will output a message to the driver indicating that the tire should be now be balanced as described in more detail below. The message to the driver is provided by output means coupled to or incorporated within the module 870 and may be, e.g., a light on the dashboard, a vocal tone or any other recognizable indication apparatus. A similar message may also be sent to the dealer or other repair facility or remote facility.

It is important to note that there may be many neural networks involved in a total vehicle diagnostic system. These can be organized either in parallel, series, as an ensemble, cellular neural network or as a modular neural network system. In one implementation of a modular neural network, a primary neural network identifies that there is an abnormality and tries to identify the likely source. Once a choice has been made as to the likely source of the abnormality, another of a group of neural networks is called upon to determine the exact cause of the abnormality. In this manner, the neural networks are arranged in a tree pattern with each neural network trained to perform a particular pattern recognition task.

Discussions on the operation of a neural network can be found in the above references on the subject and are well understood by those skilled in the art. Neural networks are the most well known of the pattern recognition technologies based on training, although neural networks have only recently received widespread attention and have been applied to only very limited and specialized problems in motor vehicles. Other non-training based pattern recognition technologies exist, such as fuzzy logic. However, the programming required to use fuzzy logic, where the patterns must be determine by the programmer, render these systems impractical for general vehicle diagnostic problems such as described herein. Therefore, preferably the pattern recognition systems that learn by training are used herein.

The neural network is the first highly successful of what will be a variety of pattern recognition techniques based on training. There is nothing that suggests that it is the only or even the best technology. The characteristics of all of these technologies which render them applicable to this general diagnostic problem include the use of time-based input data and that they are trainable. In all cases, the pattern recognition technology learns from examples of data characteristic of normal and abnormal component operation.

Figure 6:
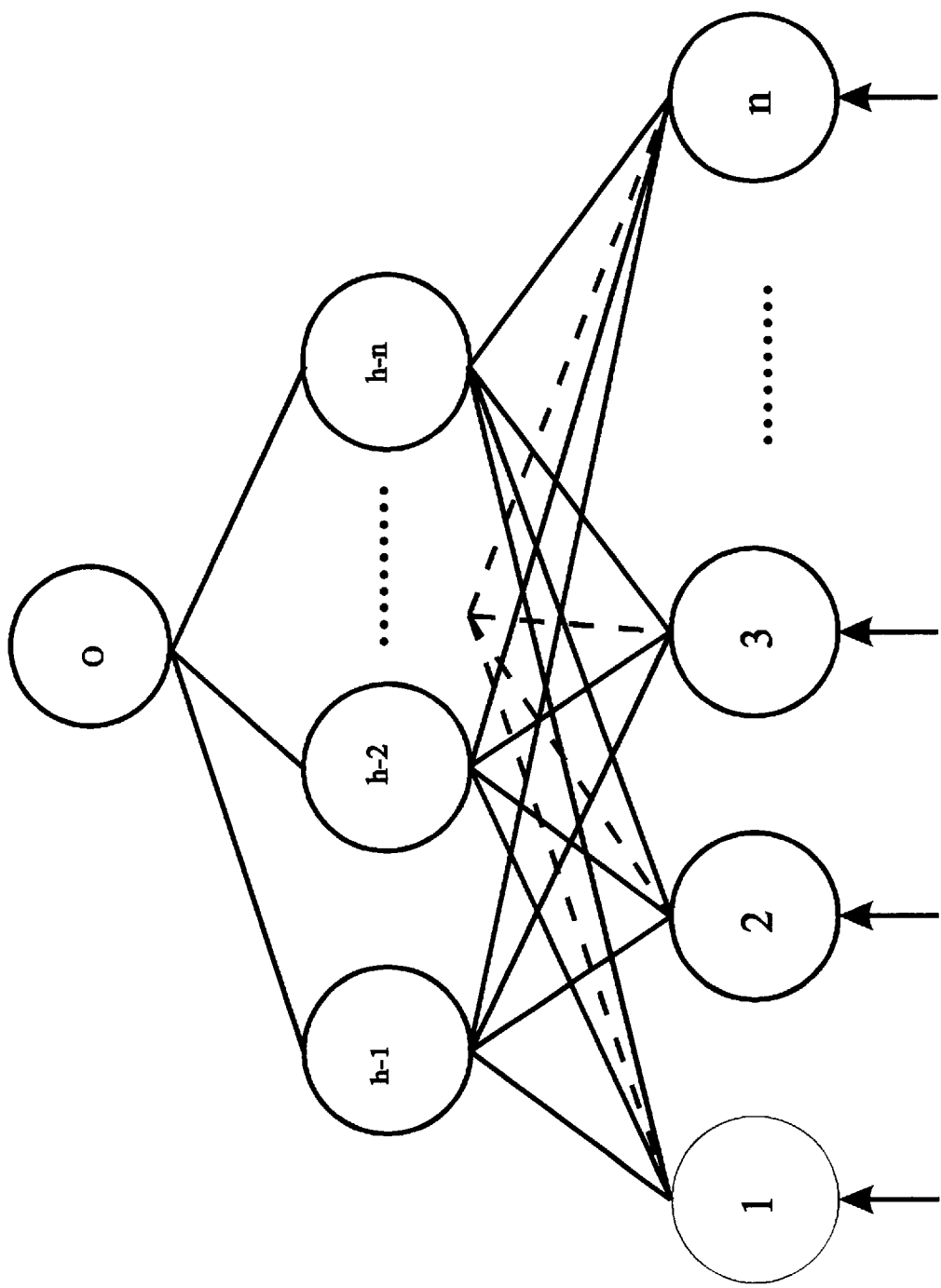
FIG. 6 is a schematic of one pattern recognition methodology known as a neural network which may be used in a method in accordance with the invention.

A diagram of one example of a neural network used for diagnosing an unbalanced tire, for example, based on the teachings of this invention is shown in FIG. 6. The process can be programmed to periodically test for an unbalanced tire. Since this need be done only infrequently, the same processor can be used for many such diagnostic problems. When the particular diagnostic test is run, data from the previously determined relevant sensors is preprocessed and analyzed with the neural network algorithm. For the unbalanced tire, using the data from an accelerometer for example, the digital acceleration values from the analog to digital converter in the accelerometer are entered into nodes 1 through n and the neural network algorithm compares the pattern of values on nodes 1 through n with patterns for which it has been trained as follows.

Each of the input nodes is connected to each of the second layer nodes, h-1,h-2, . . . ,h-n, called the hidden layer, either electrically as in the case of a neural computer, or through mathematical functions containing multiplying coefficients called weights, in the manner described in more detail in the above references. At each hidden layer node, a summation occurs of the values from each of the input layer nodes, which have been operated on by functions containing the weights, to create a node value. Similarly, the hidden layer nodes are in like manner connected to the output layer node(s), which in this example is only a single node 0 representing the decision to notify the driver, and/or a remote facility, of the unbalanced tire. During the training phase, an output node value of 1, for example, is assigned to indicate that the driver should be notified and a value of 0 is assigned to not doing so. Once again, the details of this process are described in above-referenced texts and will not be presented in detail here.

In the example above, twenty input nodes were used, five hidden layer nodes and one output layer node. In this example, only one sensor was considered and accelerations from only one direction were used. If other data from other sensors such as accelerations from the vertical or lateral directions were also used, then the number of input layer nodes would increase. Again, the theory for determining the complexity of a neural network for a particular application has been the subject of many technical papers and will not be presented in detail here. Determining the requisite complexity for the example presented here can be accomplished by those skilled in the art of neural network design.

Briefly, the neural network described above defines a method, using a pattern recognition system, of sensing an unbalanced tire and determining whether to notify the driver, and/or a remote facility, and comprises the steps of:

(a) obtaining an acceleration signal from an accelerometer mounted on a vehicle;

(b) converting the acceleration signal into a digital time series;

(c) entering the digital time series data into the input nodes of the neural network;

(d) performing a mathematical operation on the data from each of the input nodes and inputting the operated on data into a second series of nodes wherein the operation performed on each of the input node data prior to inputting the operated on value to a second series node is different from that operation performed on some other input node data;

(e) combining the operated on data from all of the input nodes into each second series node to form a value at each second series node;

(f) performing a mathematical operation on each of the values on the second series of nodes and inputting this operated on data into an output series of nodes wherein the operation performed on each of the second series node data prior to inputting the operated on value to an output series node is different from that operation performed on some other second series node data;

(g) combining the operated on data from all of the second series nodes into each output series node to form a value at each output series node; and, (h) notifying a driver if the value on one output series node is within a chosen range signifying that a tire requires balancing.

This method can be generalized to a method of predicting that a component of a vehicle will fail comprising the steps of:

(a) sensing a signal emitted from the component;

(b) converting the sensed signal into a digital time series;

(c) entering the digital time series data into a pattern recognition algorithm;

(d) executing the pattern recognition algorithm to determine if there exists within the digital time series data a pattern characteristic of abnormal operation of the component; and (e) notifying a driver and/or a remote facility if the abnormal pattern is recognized.

The particular neural network described and illustrated above contains a single series of hidden layer nodes. In some network designs, more than one hidden layer is used, although only rarely will more than two such layers appear. There are of course many other variations of the neural network architecture illustrated above which appear in the referenced literature. For the purposes herein, therefore, "neural network" will be defined as a system wherein the data to be processed is separated into discrete values which are then operated on and combined in at least a two stage process and where the operation performed on the data at each stage is in general different for each discrete value and where the operation performed is at least determined through a training process.

The implementation of neural networks can take on at least two forms, an algorithm programmed on a digital microprocessor, FPGA, DSP or in a neural computer (including a cellular neural network or support vector machine). In this regard, it is noted that neural computer chips are now becoming available.

In the example above, only a single component failure was discussed using only a single sensor since the data from the single sensor contains a pattern which the neural network was trained to recognize as either normal operation of the component or abnormal operation of the component. The diagnostic module 870 contains preprocessing and neural network algorithms for a number of component failures. The neural network algorithms are generally relatively simple, requiring only a relatively small number of lines of computer code. A single general neural network program can be used for multiple pattern recognition cases by specifying different coefficients for the various terms, one set for each application. Thus, adding different diagnostic checks has only a small affect on the cost of the system. Also, the system has available to it all of the information available on the data bus. During the training process, the pattern recognition program sorts out from the available vehicle data on the data bus or from other sources, those patterns that predict failure of a particular component.

Figure 7:
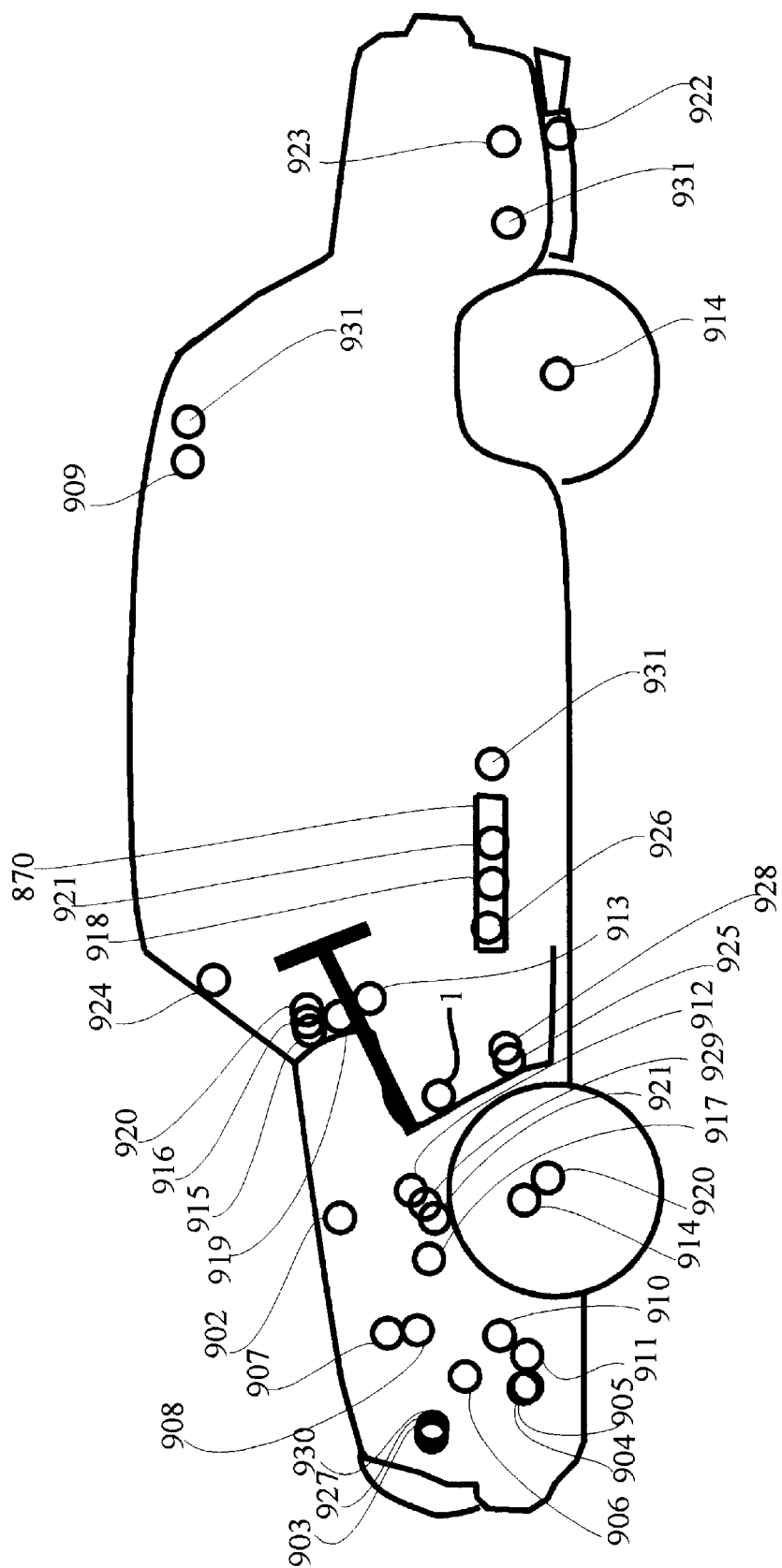
FIG. 7 is a schematic of a vehicle with several components and several sensors and a total vehicle diagnostic system in accordance with the invention utilizing a diagnostic module in accordance with the invention and which may be used in a method in accordance with the invention.
Figure 8:
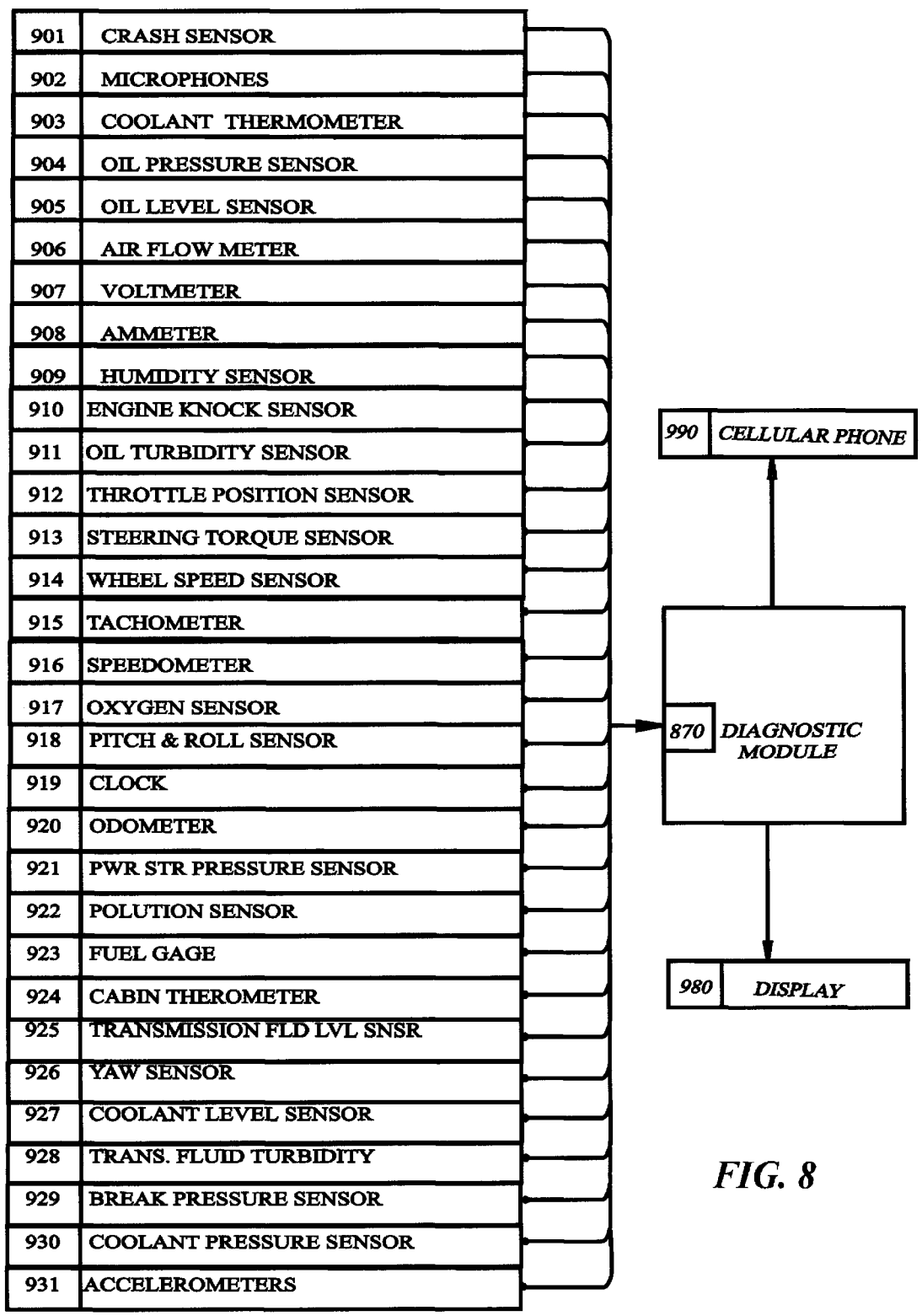
FIG. 8 is a flow diagram of information flowing from various sensors onto the vehicle data bus and thereby into the diagnostic module in accordance with the invention with outputs to a display for notifying the driver, and to the vehicle cellular phone for notifying another person, of a potential component failure.

In FIG. 7, a schematic of a vehicle with several components and several sensors is shown in their approximate locations on a vehicle along with a total vehicle diagnostic system in accordance with the invention utilizing a diagnostic module in accordance with the invention. A flow diagram of information passing from the various sensors shown in FIG. 7 onto the vehicle data bus and thereby into the diagnostic device in accordance with the invention is shown in FIG. 8 along with outputs to a display for notifying the driver and to the vehicle cellular phone, or other communication device, for notifying the dealer, vehicle manufacturer or other entity concerned with the failure of a component in the vehicle. If the vehicle is operating on a smart highway, for example, the pending component failure information may also be communicated to a highway control system and/or to other vehicles in the vicinity so that an orderly exiting of the vehicle from the smart highway can be facilitated. FIG. 8 also contains the names of the sensors shown numbered on FIG. 7.

Sensor 901 is a crash sensor having an accelerometer (alternately one or more dedicated accelerometers 931 can be used), sensor 902 is represents one or more microphones, sensor 903 is a coolant thermometer, sensor 904 is an oil pressure sensor, sensor 905 is an oil level sensor, sensor 906 is an air flow meter, sensor 907 is a voltmeter, sensor 908 is an ammeter, sensor 909 is a humidity sensor, sensor 910 is an engine knock sensor, sensor 911 is an oil turbidity sensor, sensor 912 is a throttle position sensor, sensor 913 is a steering torque sensor, sensor 914 is a wheel speed sensor, sensor 915 is a tachometer, sensor 916 is a speedometer, sensor 917 is an oxygen sensor, sensor 918 is a pitch/roll sensor, sensor 919 is a clock, sensor 920 is an odometer, sensor 921 is a power steering pressure sensor, sensor 922 is a pollution sensor, sensor 923 is a fuel gauge, sensor 924 is a cabin thermometer, sensor 925 is a transmission fluid level sensor, sensor 926 is a yaw sensor, sensor 927 is a coolant level sensor, sensor 928 is a transmission fluid turbidity sensor, sensor 929 is brake pressure sensor and sensor 930 is a coolant pressure sensor. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

If a distributed group of acceleration sensors or accelerometers are used to permit a determination of the location of a vibration source, the same group can, in some cases, also be used to measure the pitch, yaw and/or roll of the vehicle eliminating the need for dedicated angular rate sensors. In addition, as mentioned above, such a suite of sensors can also be used to determine the location and severity of a vehicle crash and additionally to determine that the vehicle is on the verge of rolling over. Thus, the same suite of accelerometers optimally performs a variety of functions including inertial navigation, crash sensing, vehicle diagnostics, roll over sensing etc.

Consider now some examples. The following is a partial list of potential component failures and the sensors from the list on FIG. 8 that might provide information to predict the failure of the component:

| | |
|---|---|
| Out of balance tires | 901,913,914,915,920,921 |
| Front end out of alignment | 901,913,921,926 |
| Tune up required | 901,903,910,912,915,917,920,922 |
| Oil change needed | 903,904,905,911 |
| Motor failure | 901,902,903,904,905,906,910,912,915,917,922 |
| Low tire pressure | 901,913,914,915,920,921 |
| Front end looseness | 901,913,916,921,926 |
| Cooling system failure | 903,915,924,927,930 |
| Alternator problems | 901,902,907,908,915,919,920 |
| Transmission problems | 901,903,912,915,916,920,925,928 |
| Differential problems | 901,912,914 |
| Brakes | 901,902,914,918,920,926,929 |
| Catalytic converter and muffler | 901,902,912,915,922 |
| Ignition | 901,902,907,908,909,910,912,917,923 |
| Tire wear | 901,913,914,915,918,920,921,926 |
| Fuel leakage | 920,923 |
| Fan belt slippage | 901,902,903,907,908,912,915,919,920 |
| Alternator deterioration | 901,902,907,908,915,919 |
| Coolant pump failure | 901,902,903,924,927,930 |
| Coolant hose failure | 901,902,903,927,930 |
| Starter failure | 901,902,907,908,909,912,915 |
| Dirty air filter | 902,903,906,911,912,917,922 |

Several interesting facts can be deduced from a review of the above list. First, all of the failure modes listed can be at least partially sensed by multiple sensors. In many cases, some of the sensors merely add information to aid in the interpretation of signals received from other sensors. In today's automobile, there are few if any cases where multiple sensors are used to diagnose or predict a problem. In fact, there is virtually no failure prediction undertaken at all. Second, many of the failure modes listed require information from more than one sensor. Third, information for many of the failure modes listed cannot be obtained by observing one data point in time as is now done by most vehicle sensors. Usually an analysis of the variation in a parameter as a function of time is necessary. In fact, the association of data with time to create a temporal pattern for use in diagnosing component failures in automobile is unique to this invention as in the combination of several such temporal patterns. Fourth, the vibration measuring capability of the airbag crash sensor, or other accelerometer, is useful for most of the cases discussed above yet there is no such current use of accelerometers. The airbag crash sensor is used only to detect crashes of the vehicle. Fifth, the second most used sensor in the above list, a microphone, does not currently appear on any automobiles yet sound is the signal most often used by vehicle operators and mechanics to diagnose vehicle problems. Another sensor that is listed above which also does not currently appear on automobiles is a pollution sensor. This is typically a chemical sensor mounted in the exhaust system for detecting emissions from the vehicle. It is expected that this and other chemical sensors will be used more in the future.

In addition, from the foregoing depiction of different sensors which receive signals from a plurality of components, it is possible for a single sensor to receive and output signals from a plurality of components which are then analyzed by the processor to determine if any one of the components for which the received signals were obtained by that sensor is operating in an abnormal state. Likewise, it is also possible to provide for a multiplicity of sensors each receiving a different signal related to a specific component which are then analyzed by the processor to determine if that component is operating in an abnormal state. Note that neural networks can simultaneously analyze data from multiple sensors of the same type or different types.

The discussion above has centered on notifying the vehicle operator of a pending problem with a vehicle component. Today, there is great competition in the automobile marketplace and the manufacturers and dealers who are most responsive to customers are likely to benefit by increased sales both from repeat purchasers and new customers. The diagnostic module disclosed herein benefits the dealer by making him instantly aware, through the cellular telephone system, or other communication link, coupled to the diagnostic module or system in accordance with the invention, when a component is likely to fail. As envisioned, on some automobiles, when the diagnostic module 870 detects a potential failure it not only notifies the driver through a display 980, but also automatically notifies the dealer through a vehicle cellular phone 990 or other telematics communication link. The dealer can thus contact the vehicle owner and schedule an appointment to undertake the necessary repair at each party's mutual convenience. Contact by the dealer to the vehicle owner can occur as the owner is driving the vehicle, using a communications device. Thus, the dealer can, contact the driver and informed him of their mutual knowledge of the problem and discuss scheduling maintenance to attend to the problem. The customer is pleased since a potential vehicle breakdown has been avoided and the dealer is pleased since he is likely to perform the repair work. The vehicle manufacturer also benefits by early and accurate statistics on the failure rate of vehicle components. This early warning system can reduce the cost of a potential recall for components having design defects. It could even have saved lives if such a system had been in place during the Firestone tire failure problem mentioned above. The vehicle manufacturer will thus be guided toward producing higher quality vehicles thus improving his competitiveness. Finally, experience with this system will actually lead to a reduction in the number of sensors on the vehicle since only those sensors that are successful in predicting failures will be necessary.

For most cases, it is sufficient to notify a driver that a component is about to fail through a warning display. In some critical cases, action beyond warning the driver may be required. If, for example, the diagnostic module detected that the alternator was beginning to fail, in addition to warning the driver of this eventuality, the module could send a signal to another vehicle system to turn off all non-essential devices which use electricity thereby conserving electrical energy and maximizing the time and distance that the vehicle can travel before exhausting the energy in the battery. Additionally, this system can be coupled to a system such as OnStar*) or a vehicle route guidance system, and the driver can be guided to the nearest open repair facility or a facility of his or her choice.

In the discussion above, the diagnostic module of this invention assumes that a vehicle data bus exists which is used by all of the relevant sensors on the vehicle. Most vehicles today do not have a data bus although it is widely believed that most vehicles will have one in the near future. Naturally, the relevant signals can be transmitted to the diagnostic module through a variety of coupling means other than through a data bus and this invention is not limited to vehicles having a data bus. For example, the data can be sent wirelessly to the diagnostic module using the Bluetooth™ specification. In some cases, even the sensors do not have to be wired and can obtain their power via RF from the interrogator as is well known in the RFID—radio frequency identification (either silicon or surface acoustic wave (SAW) based)) field. Alternately an inductive or capacitive power transfer system can be used.

As can be appreciated from the above discussion, the invention described herein brings several new improvements to automobiles including, but not limited to, the use of pattern recognition technologies to diagnose potential vehicle component failures, the use of trainable systems thereby eliminating the need of complex and extensive programming, the simultaneous use of multiple sensors to monitor a particular component, the use of a single sensor to monitor the operation of many vehicle components, the monitoring of vehicle components which have no dedicated sensors, and the notification of both the driver and possibly an outside entity of a potential component failure in time so that the failure can be averted and vehicle breakdowns substantially eliminated. Additionally, improvements to the vehicle stability, crash avoidance, crash anticipation and occupant protection are available.

To implement a component diagnostic system for diagnosing the component utilizing a plurality of sensors not directly associated with the component, i.e., independent of the component, a series of tests are conducted. For each test, the signals received from the sensors are input into a pattern recognition training algorithm with an indication of whether the component is operating normally or abnormally (the component being intentionally altered to provide for abnormal operation). The data from the test are used to generate the pattern recognition algorithm, e.g., neural network, so that in use, the data from the sensors is input into the algorithm and the algorithm provides an indication of abnormal or normal operation of the component. Also, to provide a more versatile diagnostic module for use in conjunction with diagnosing abnormal operation of multiple components, tests may be conducted in which each component is operated abnormally while the other components are operating normally, as well as tests in which two or more components are operating abnormally. In this manner, the diagnostic module may be able to determine based on one set of signals from the sensors during use that either a single component or multiple components are operating abnormally.

Furthermore, the pattern recognition algorithm may be trained based on patterns within the signals from the sensors. Thus, by means of a single sensor, it would be possible to determine whether one or more components are operating abnormally. To obtain such a pattern recognition algorithm, tests are conducted using a single sensor, such as a microphone, and causing abnormal operation of one or more components, each component operating abnormally while the other components operate normally and multiple components operating abnormally. In this manner, in use, the pattern recognition algorithm may analyze a signal from a single sensor and determine abnormal operation of one or more components. Note that in some cases, simulations can be used to analytically generate the relevant data.

The invention is also particularly useful in light of the foreseeable implementation of smart highways. Smart highways will result in vehicles traveling down highways under partial or complete control of an automatic system, i.e., not being controlled by the driver. The on-board diagnostic system will thus be able to determine failure of a component prior to or upon failure thereof and inform the vehicle's guidance system to cause the vehicle to move out of the stream of traffic, i.e., onto a shoulder of the highway, in a safe and orderly manner. Moreover, the diagnostic system may be controlled or programmed to prevent the movement of the disabled vehicle back into the stream of traffic until the repair of the component is satisfactorily completed.

In a method in accordance with this embodiment, the operation of the component would be monitored and if abnormal operation of the component is detected, e.g., by any of the methods and apparatus disclosed herein (although other component failure systems may of course be used in this implementation), the guidance system of the vehicle which controls the movement of the vehicle would be notified, e.g., via a signal from the diagnostic module to the guidance system, and the guidance system would be programmed to move the vehicle out of the stream of traffic, or off of the restricted roadway, possibly to a service station or dealer, upon reception of the particular signal from the diagnostic module. The automatic guidance systems for vehicles traveling on highways may be any existing system or system being developed, such as one based on satellite positioning techniques or ground-based positioning techniques. Since the guidance system may be programmed to ascertain the vehicle's position on the highway, it can determine the vehicle's current position, the nearest location out of the stream of traffic, or off of the restricted roadway, such as an appropriate shoulder or exit to which the vehicle may be moved, and the path of movement of the vehicle from the current position to the location out of the stream of traffic, or off of the restricted roadway. The vehicle may thus be moved along this path under the control of the automatic guidance system. In the alternative, the path may be displayed to a driver and the driver can follow the path, i.e., manually control the vehicle. The diagnostic module and/or guidance system may be designed to prevent re-entry of the vehicle into the stream of traffic, or off of the restricted roadway, until the abnormal operation of the component is satisfactorily addressed.

Figure 9:
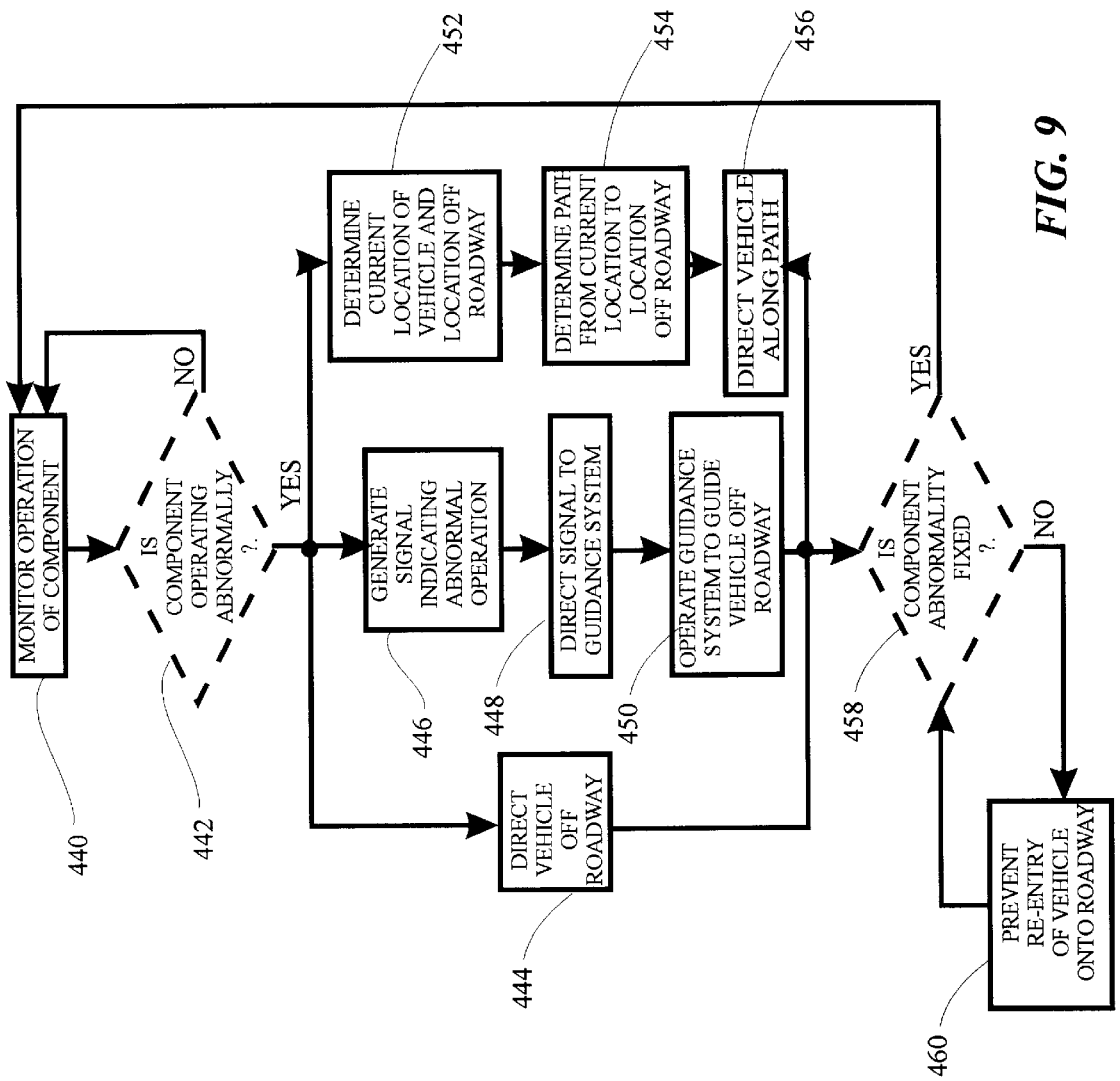
FIG. 9 is a flow chart of the methods for automatically monitoring a vehicular component in accordance with the invention.

FIG. 9 is a flow chart of some of the methods for directing a vehicle off of a roadway if a component is operating abnormally. The component's operation is monitored at 440 and a determination is made at 442 whether its operation is abnormal. If not, the operation of the component is monitored further. If the operation of the component is abnormal, the vehicle can be directed off the roadway at 444. More particularly, this can be accomplished by generating a signal indicating the abnormal operation of the component at 446, directing this signal to a guidance system in the vehicle at 448 that guides movement of the vehicle off of the roadway at 450. Also, if the component is operating abnormally, the current position of the vehicle and the location of a site off of the roadway can be determined at 452, e.g., using satellite-based or ground-based location determining techniques, a path from the current location to the off-roadway location determined at 454 and then the vehicle directed along this path at 456. Periodically, a determination is made at 458 whether the component's abnormality has been satisfactorily addressed and/or corrected and if so, the vehicle can re-enter the roadway and operation of the component begins again. If not, the re-entry of the vehicle onto the roadway is prevented at 460.

Figure 10:
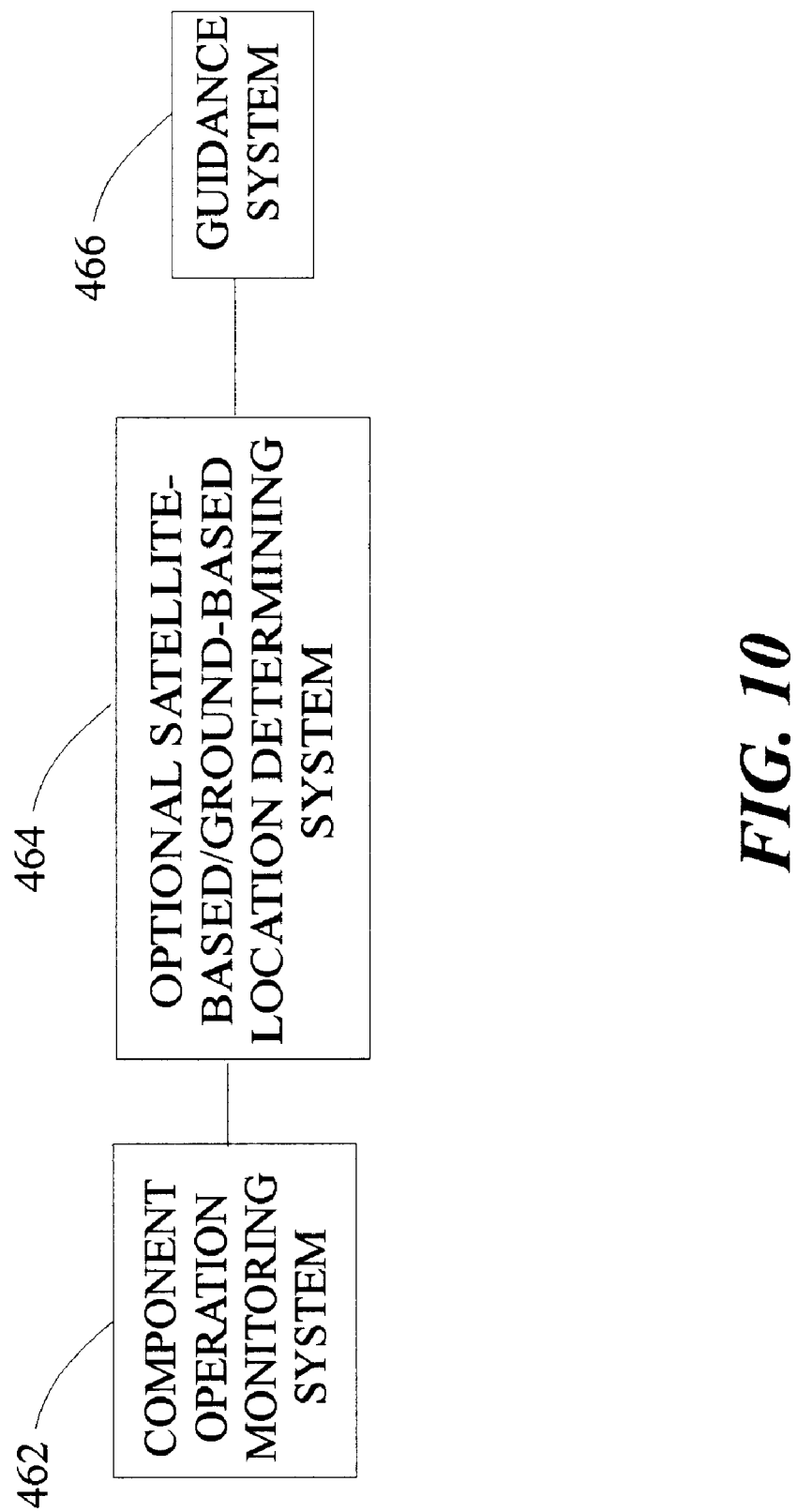
FIG. 10 is a schematic illustration of the components used in the methods for automatically monitoring a vehicular component.

FIG. 10 schematically shows the basic components for performing this method, i.e., a component operation monitoring system 462 (such as described above), an optional satellite-based or ground-based positioning system 464 and a vehicle guidance system 466.

Figure 11:
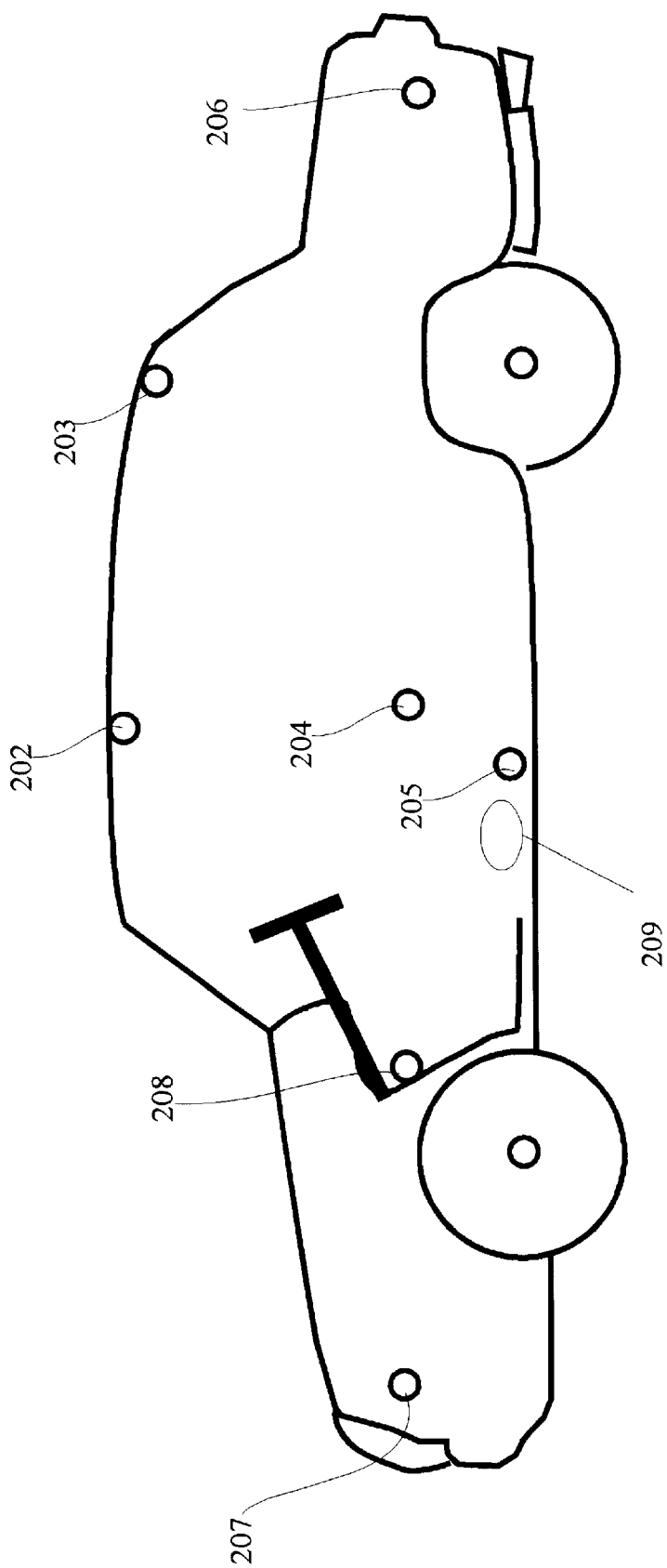
FIG. 11 is a schematic of a vehicle with several accelerometers and/or gyroscopes at preferred locations in the vehicle.

FIG. 11 illustrates the placement of a variety of sensors, primarily accelerometers and/or gyroscopes, which can be used to diagnose the state of the vehicle itself. Sensor 202 can be located in the headliner or attached to the vehicle roof above the side door. Typically, there can be two such sensors one on either side of the vehicle. Sensor 203 is shown in a typical mounting location midway between the sides of the vehicle attached to or near the vehicle roof above the rear window. Sensor 206 is shown in a typical mounting location in the vehicle trunk adjacent the rear of the vehicle. Either one, two or three such sensors can be used depending on the application. If three such sensors are use one would be adjacent each side of vehicle and one in the center. Sensor 204 is shown in a typical mounting location in the vehicle door and sensor 205 is shown in a typical mounting location on the sill or floor below the door. Sensor 207, which can be also multiple sensors, is shown in a typical mounting location forward in the crush zone of the vehicle. Finally, sensor 208 can measure the acceleration of the firewall or instrument panel and is located thereon generally midway between the two sides of the vehicle. If three such sensors are used, one would be adjacent each vehicle side and one in the center.

In general, sensors 202–208 provide a measurement of the state of the vehicle, such as its velocity, acceleration, angular orientation or temperature, or a state of the location at which the sensor is mounted. Thus, measurements related to the state of the sensor would include measurements of the acceleration of the sensor, measurements of the temperature of the mounting location as well as changes in the state of the sensor and rates of changes of the state of the sensor. As such, any described use or function of the sensors 202–208 above is merely exemplary and is not intended to limit the form of the sensor or its function.

Each of the sensors 202–208 may be single axis, double axis or triaxial accelerometers and/or gyroscopes typically of the MEMS type. These sensors 202–208 can either be wired to the central control module or processor directly wherein they would receive power and transmit information, or they could be connected onto the vehicle bus or, in some cases, using RFID, SAW or similar technology, the sensors can be wireless and would receive their power through RF from one or more interrogators located in the vehicle. In this case, the interrogators can be connected either to the vehicle bus or directly to control module. Alternately, an inductive or capacitive power and information transfer system can be used.

One particular implementation will now be described. In this case, each of the sensors 202–208 is a single or dual axis accelerometer. They are made using silicon micromachined technology such as disclosed in U.S. Pat. Nos. 5,121,180 and 5,894,090. These are only representative patents of these devices and there exist more than 100 other relevant U.S. patents describing this technology. Commercially available MEMS gyroscopes such as from Systron Doner have accuracies of approximately one degree per second. In contrast, optical gyroscopes typically have accuracies of approximately one degree per hour. Unfortunately, the optical gyroscopes are prohibitively expensive for automotive applications. On the other hand, typical MEMS gyroscopes are not sufficiently accurate for many control applications.

The angular rate function can be obtained through placing accelerometers at two separated, non-co-located points in a vehicle and using the differential acceleration to obtain an indication of angular motion and angular acceleration. From the variety of accelerometers shown on FIG. 11, it can be appreciated that not only will all accelerations of key parts of the vehicle be determined, but the pitch, yaw and roll angular rates can also be determined based on the accuracy of the accelerometers. By this method, low cost systems can be developed which, although not as accurate as the optical gyroscopes, are considerably more accurate than conventional MEMS gyroscopes. Alternately, it has been found that from a single package containing up to three low cost MEMS gyroscopes and three low cost MEMS accelerometers, when carefully calibrated, an accurate inertial measurement unit (IMU) can be constructed that performs as well as units costing a great deal more. Such a package is sold by Crossbow Technology, Inc. 41 Daggett Dr., San Jose, Calif. 95134. If this IMU is combined with a GPS system and sometimes other vehicle sensor inputs using a Kalman filter, accuracy approaching that of expensive military units can be achieved.

Instead of using two accelerometers at separate locations on the vehicle, a single conformal MEMS-IDT gyroscope may be used. Such a conformal MEMS-IDT gyroscope is described in a paper by V. K. Karadan, Conformal MEMS-IDT Gyroscopes and Their Comparison With Fiber Optic Gyro, incorporated in its entirety herein. The MEMS-IDT gyroscope is based on the principle of surface acoustic wave (SAW) standing waves on a piezoelectric substrate. A surface acoustic wave resonator is used to create standing waves inside a cavity and the particles at the anti-nodes of the standing waves experience large amplitude of vibrations, which serves as the reference vibrating motion for the gyroscope. Arrays of metallic dots are positioned at the anti-node locations so that the effect of Coriolis force due to rotation will acoustically amplify the magnitude of the waves. Unlike other MEMS gyroscopes, the MEMS-IDT gyroscope has a planar configuration with no suspended resonating mechanical structures. Other SAW-based gyroscopes are also now under development.

The system of FIG. 11 using dual axis accelerometers, or the IMU Kalman filter system, therefore provides a complete diagnostic system of the vehicle itself and its dynamic motion. Such a system is far more accurate than any system currently available in the automotive market. This system provides very accurate crash discrimination since the exact location of the crash can be determined and, coupled with a knowledge of the force deflection characteristics of the vehicle at the accident impact site, an accurate determination of the crash severity and thus the need for occupant restraint deployment can be made. Similarly, the tendency of a vehicle to roll over can be predicted in advance and signals sent to the vehicle steering, braking and throttle systems to attempt to ameliorate the rollover situation or prevent it. In the event that it cannot be prevented, the deployment side curtain airbags can be initiated in a timely manner.

Similarly, the tendency of the vehicle to the slide or skid can be considerably more accurately determined and again the steering, braking and throttle systems commanded to minimize the unstable vehicle behavior.

Thus, through the sample deployment of inexpensive accelerometers at a variety of locations in the vehicle, or the IMU Kalman filter system significant improvements are made in the vehicle stability control, crash sensing, rollover sensing, and resulting occupant protection technologies.

Finally, as mentioned above, the combination of the outputs from these accelerometer sensors and the output of strain gage weight sensors in a vehicle seat, or in or on a support structure of the seat, can be used to make an accurate assessment of the occupancy of the seat and differentiate between animate and inanimate occupants as well as determining where in the seat the occupants are sitting. This can be done by observing the acceleration signals from the sensors of FIG. 11 and simultaneously the dynamic strain gage measurements from seat mounted strain gages. The accelerometers provide the input function to the seat and the strain gages measure the reaction of the occupying item to the vehicle acceleration and thereby provide a method of determining dynamically the mass of the occupying item and its location. This is particularly important during occupant position sensing during a crash event. By combining the outputs of the accelerometers and the strain gages and appropriately processing the same, the mass and weight of an object occupying the seat can be determined as well as the gross motion of such an object so that an assessment can be made as to whether the object is a life form such as a human being.

For this embodiment, sensor 209 represents one or more strain gage weight sensors mounted on the seat or in connection with the seat or its support structure. Suitable mounting locations and forms of weight sensors are discussed in the current assignee's U.S. patent application Ser. No. 09/193,209 and contemplated for use in this invention as well. The mass or weight of the occupying item of the seat can thus be measured based on the dynamic measurement of the strain gages with optional consideration of the measurements of accelerometers on the vehicle, which are represented by any of sensors 202–208.

Figure 12:
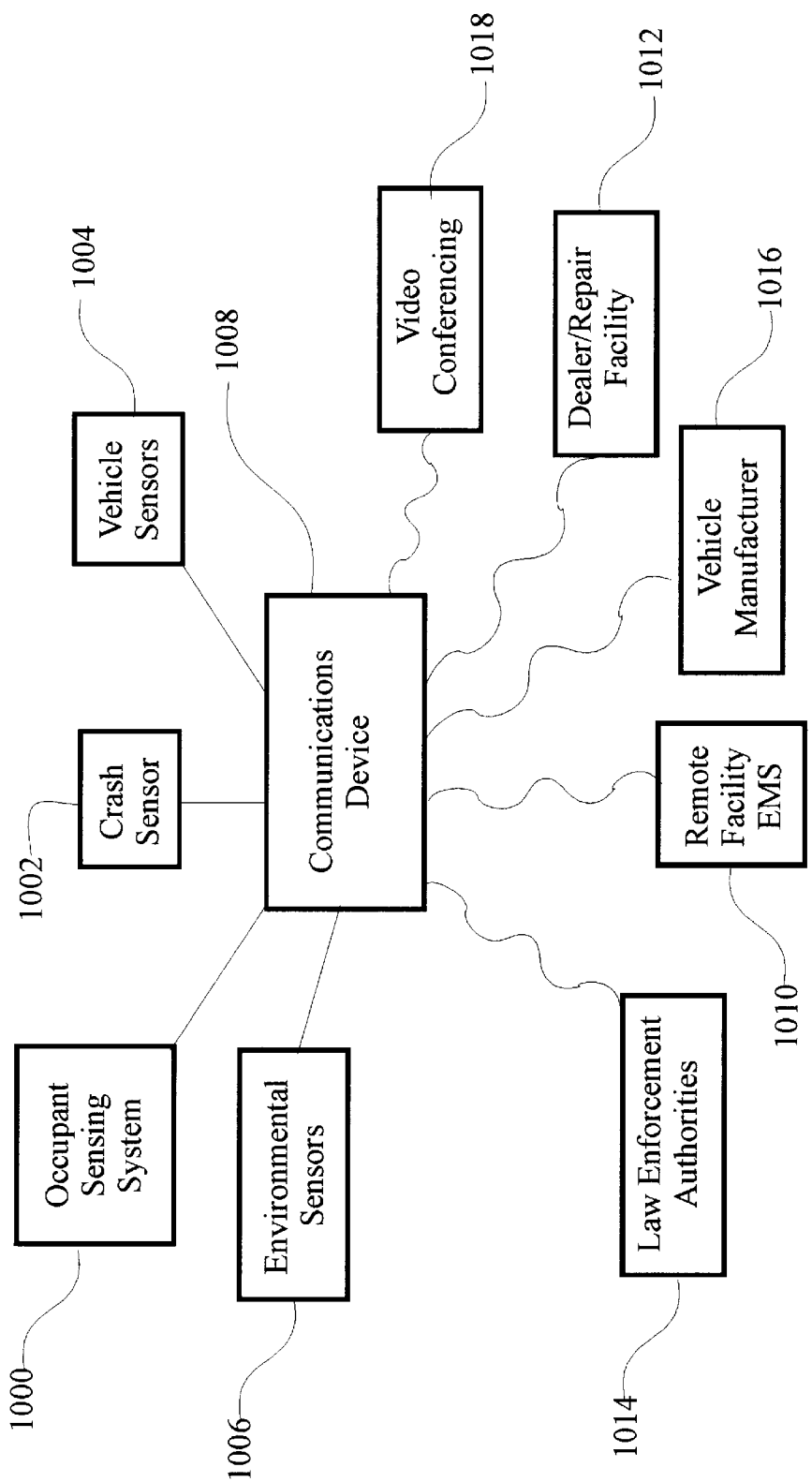
FIG. 12 is a schematic view of overall telematics system in accordance with the invention.

FIG. 12 shows a schematic of the integration of the occupant sensing with a telematics link and the vehicle diagnosis with a telematics link. As envisioned, the occupant sensing system 1000 includes those components which determine the presence, position, health state, and other information relating to the occupants, for example the transducers discussed above with reference to FIGS. 1–3 and the SAW device discussed above with reference to FIG. 4. Information relating to the occupants includes information as to what the driver is doing, talking on the phone, communicating with OnStar® or other route guidance, listening to the radio, sleeping, drunk, drugged, having a heart attack The occupant sensing system may also be any of those systems and apparatus described in any of the current assignee's above-referenced patents and patent applications incorporated by reference herein, or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor 1002 is provided and determines when the vehicle experiences a crash. Crash sensor 1002 may be any type of crash sensor.

Vehicle sensors 1004 include sensors which detect the operating conditions of the vehicle such as those sensors discussed with reference to FIGS. 4–8 above. Also included are tire sensors such as disclosed in U.S. patent application Ser. No. 10/079,065. Other examples include velocity and acceleration sensors, and angular and angular rate pitch, roll and yaw sensors. Of particular importance are sensors that tell what the car is doing: speed, skidding, sliding, location, communicating with other cars or the infrastructure, etc.

Environment sensors 1006 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 1000, crash sensors 1002, vehicle sensors 1004, environment sensors 1006 all are coupled to a communications device 1008 which may contain a memory unit and appropriate electrical hardware to communicate with all of the sensors, process data from the sensors, and transmit data from the sensors. The memory unit would be useful to store data from the sensors, updated periodically, so that such information could be transmitted at set time intervals.

The communications device 308 can be designed to transmit information to any number of different types of facilities. For example, the communications device 1008 would be designed to transmit information to an emergency response facility 1010 in the event of an accident involving the vehicle. The transmission of the information would be triggered by a signal from the crash sensor 1002 that the vehicle was experiencing a crash or experienced a crash. The information transmitted would come from the occupant sensing system 1000 so that the emergency response could be tailored to the status of the occupants. For example, if the vehicle was determined to have ten occupants, multiple ambulances might be sent than if the vehicle contained only a single occupant. Also, if the occupants are determined not be breathing, then a higher priority call with living survivors might receive assistance first. As such, the information from the occupant sensing system 1000 would be used to prioritize the duties of the emergency response personnel.

Information from the vehicle sensors 1004 and environment sensors 1006 could also be transmitted to law enforcement authorities 1014 in the event of an accident so that the cause(s) of the accident could be determined. Such information can also include information from the occupant sensing system 1000, which might reveal that the driver was talking on the phone, putting on make-up, or another distracting activity, information from the vehicle sensors 1004 which might reveal a problem with the vehicle, and information from the environment sensors 1006 which might reveal the existence of slippery roads, dense fog and the like.

Information from the occupant sensing system 1000, vehicle sensors 1004 and environment sensors 1006 could also be transmitted to the vehicle manufacturer 1016 in the event of an accident so that a determination can be made as to whether failure of a component of the vehicle causes or contributed to the cause of the accident. For example, the vehicle sensors might determine that the tire pressure was too low so that advice can be disseminated to avoid maintaining the tire pressure too low in order to avoid an accident. Information from the vehicle sensors 1004 relating to component failure could be transmitted to a dealer/repair facility 1012 which could schedule maintenance to correct the problem.

The communications device 1008 could be designed to transmit particular information to each site, i.e., only information important to be considered by the personnel at that site. For example, the emergency response personnel have no need for the fact that the tire pressure was too low but such information is important to the law enforcement authorities 1014 (for the possible purpose of issuing a recall of the tire and/or vehicle) and the vehicle manufacturer 1016.

The communication device can be a cellular phone, OnStar® or other subscriber-based telematics system, a peer-to-peer vehicle communication system that eventually communicates to the infrastructure and then, perhaps, to the Internet with email to the dealer, manufacturer, vehicle owner, law enforcement authorities or others. It can also be a vehicle to LEO or Geostationary satellite system such as SkyBytes which can then forward the information to the appropriate facility either directly or through the Internet.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information.

When optical sensors are provided as part of the occupant sensing system 1000, video conferencing becomes a possibility, whether or not the vehicle experiences a crash. That is, the occupants of the vehicle can engage in a video conference with people at another location 1018 via establishment of a communications channel by the communications device 1008.

The vehicle diagnostic system described above using a telematics link can transmit information from any type of sensors on the vehicle.

In one particular use of the invention, a wireless sensing and communication system is provided whereby the information or data obtained through processing of input from sensors of the wireless sensing and communication system is further transmitted for reception by a remote facility. Thus, in such a construction, there is an intra-vehicle communications between the sensors on the vehicle and a processing system (control module, computer or the like) and remote communications between the same or a coupled processing system (control module, computer or the like). The electronic components for the intra-vehicle communication may be designed to transmit and receive signals over short distances whereas the electronic components which enable remote communications should be designed to transmit and receive signals over relatively long distances.

The wireless sensing and communication system includes sensors that are located on the vehicle or in the vicinity of the vehicle and which provide information which is transmitted to one or more interrogators in the vehicle by wireless radio frequency means, using wireless radio frequency transmission technology. In some cases, the power to operate a particular sensor is supplied by the interrogator while in other cases, the sensor is independently connected to either a battery, generator, vehicle power source or some source of power external to the vehicle.

The sensors for a system installed in a vehicle would likely include tire pressure, temperature and acceleration monitoring sensors, weight or load measuring sensors, switches, temperature, acceleration, angular position, angular rate, angular acceleration, proximity, rollover, occupant presence, humidity, presence of fluids or gases, strain, road condition and friction, chemical sensors and other similar sensors providing information to a vehicle system, vehicle operator or external site. The sensors can provide information about the vehicle and its interior or exterior environment, about individual components, systems, vehicle occupants, subsystems, or about the roadway, ambient atmosphere, travel conditions and external objects.

The system can use one or more interrogators each having one or more antennas that transmit radio frequency energy to the sensors and receive modulated radio frequency signals from the sensors containing sensor and/or identification information. One interrogator can be used for sensing multiple switches or other devices. For example, an interrogator may transmit a chirp form of energy at 905 MHz to 925 MHz to a variety of sensors located within or in the vicinity of the vehicle. These sensors may be of the RFID electronic type or of the surface acoustic wave (SAW) type. In the electronic type, information can be returned immediately to the interrogator in the form of a modulated RF signal. In the case of SAW devices, the information can be returned after a delay. Naturally, one sensor can respond in both the electronic and SAW delayed modes.

When multiple sensors are interrogated using the same technology, the returned signals from the various sensors can be time, code, space or frequency multiplexed. For example, for the case of the SAW technology, each sensor can be provided with a different delay. Alternately, each sensor can be designed to respond only to a single frequency or several frequencies. The radio frequency can be amplitude or frequency modulated. Space multiplexing can be achieved through the use of two or more antennas and correlating the received signals to isolate signals based on direction.

In many cases, the sensors will respond with an identification signal followed by or preceded by information relating to the sensed value, state and/or property. In the case of a SAW-based switch, for example, the returned signal may indicate that the switch is either on or off or, in some cases, an intermediate state can be provided signifying that a light should be dimmed, rather than or on or off, for example.

Great economies are achieved by using a single interrogator or even a small number of interrogators to interrogate many types of devices. For example, a single interrogator may monitor tire pressure and temperature, the weight of an occupying item of the seat, the position of the seat and seatback, as well as a variety of switches controlling windows, door locks, seat position, etc. in a vehicle. Such an interrogator may use one or multiple antennas and when multiple antennas are used, may switch between the antennas depending on what is being monitored.

More particularly, the tire monitoring system of this invention actually comprises three separate systems corresponding to three stages of product evolution. Generation 1 is a tire valve cap that provides information as to the pressure within the tire as described below. Generation 2 requires the replacement of the tire valve stem, or the addition of a new stem-like device, with a new valve stem that also measures temperature and pressure within the tire or it may be a device that attaches to the vehicle wheel rim. Generation 3 is a product that is attached to the inside of the tire adjacent the tread and provides a measure of the diameter of the footprint between the tire and the road, the tire pressure and temperature, indications of tire wear and, in some cases, the coefficient of friction between the tire and the road.

Surface acoustic wave technology permits the measurement of many physical and chemical parameters without the requirement of local power or energy. Rather, the energy to run devices can be obtained from radio frequency electromagnetic waves. These waves excite an antenna that is coupled to the SAW device. Through various means, the properties of the acoustic waves on the surface of the SAW device are modified as a function of the variable to be measured. The SAW device belongs to the field of microelectromechanical systems (MEMS) and can be produced in high-volume at low cost.

For the generation 1 system, a valve cap contains a SAW material at the end of the valve cap, which may be polymer covered. This device senses the absolute pressure in the valve cap. Upon attaching the valve cap to the valve stem, a depressing member gradually depresses the valve permitting the air pressure inside the tire to communicate with a small volume inside the valve cap. As the valve cap is screwed onto the valve stem, a seal prevents the escape of air to the atmosphere. The SAW device is electrically connected to the valve cap, which is also electrically connected to the valve stem that acts as an antenna for transmitting and receiving radio frequency waves. An interrogator located within 20 feet of the tire periodically transmits radio waves that power the SAW device. The SAW device measures the absolute pressure in the valve cap that is equal to the pressure in the tire. U.S. Pat. Nos. 5,641,902, 5,819,779 and 4,103,549 illustrate a valve cap pressure sensor where a visual output is provided. Other related prior art includes U.S. Pat. No. 4,545,246.

The generation 2 system permits the measurement of both the tire pressure and tire temperature. In this case, the tire valve stem is removed and replaced with a new tire valve stem that contains a SAW device attached at the bottom of the valve stem. This device actually contains two SAW devices, one for measuring temperature and the second for measuring pressure through a novel technology discussed below. This second generation device therefore permits the measurement of both the pressure and the temperature inside the tire. Alternately, this device can be mounted inside the tire, attached to the rim or attached to another suitable location. An external pressure sensor is mounted in the interrogator to measure the pressure of the atmosphere to compensate for altitude and/or barometric changes.

The generation 3 device contains a pressure and temperature sensor, as in the case of the generation 2 device, but additionally contains one or more accelerometers which measure at least one component of the acceleration of the vehicle tire tread adjacent the device. This acceleration varies in a known manner as the device travels in an approximate circle attached to the wheel. This device is capable of determining when the tread adjacent the device is in contact with road surface. It is also able to measure the coefficient of friction between the tire and the road surface. In this manner, it is capable of measuring the length of time that this tread portion is in contact with the road and thereby provides a measure of the diameter of the tire footprint on the road. A technical discussion of the operating principle of a tire inflation and load detector based on flat area detection follows:

When tires are inflated and not in contact with the ground, the internal pressure is balanced by the circumferential tension in the fibers of the shell. Static equilibrium demands that tension is equal to the radius of curvature multiplied by the difference between the internal and the external gas pressure. Tires support the weight of the automobile by changing the curvature of the part of the shell that touches the ground. The relation mentioned above is still valid. In the part of the shell that gets flattened, the radius of curvature increases while the tension in the tire structure stays the same. Therefore, the difference between the external and internal pressures becomes small to compensate for the growth of the radius. If the shell were perfectly flexible, the tire contact with the ground would develop into a flat spot with an area equal to the load divided by the pressure.

A tire operating at correct values of load and pressure has a precise signature in terms of variation of the radius of curvature in the loaded zone. More flattening indicates under-inflation or overloading, while less flattening indicates over-inflation or under-loading. Note that tire loading has essentially no effect on internal pressure.

From the above, one can conclude that monitoring the curvature of the tire as it rotates can provide a good indication of its operational state. A sensor mounted inside the tire at its largest diameter can accomplish this measurement. Preferably, the sensor would measure mechanical strain. However, a sensor measuring acceleration in any one axis could also serve the purpose.

In the case of the strain measurement, the sensor would indicate a constant strain as it spans the arc over which the tire is not in contact with the ground, and a pattern of increased stretch during the arc of close proximity with the ground. A simple ratio of the times of duration of these two states would provide a good indication of inflation, but more complex algorithms could be employed, where the values and the shape of the period of increased strain are utilized.

In the case of acceleration measurement, the system would utilize the fact that the part of the tire in contact with the ground possesses zero velocity for a finite period of time, while the rest of the tire is accelerating and decelerating in a cyclic fashion. The resulting acceleration profiles in the circumferential axis or the radial axis present a characteristic near-zero portion, the length of which, when related to the rest of the rotation, is a result of the state of tire inflation.

As an indicator of tire health, the measurement of strain on the largest inside diameter of the tire is believed to be superior to the measurement of stress, such as inflation pressure, because, the tire could be deforming, as it ages or otherwise progresses toward failure, without any changes in inflation pressure. Radial strain could also be measured on the inside of the tire sidewall thus indicating the degree of flexure that the tire undergoes.

The accelerometer approach has the advantage of giving a signature from which a harmonic analysis of once-perrevolution disturbances could indicate developing problems such as hernias, flat spots, loss of part of the tread, sticking of foreign bodies to the tread, etc.

As a bonus, both of the above-mentioned sensors give clear once-per-revolution signals for each tire that could be used as inputs for speedometers, odometers, differential slip indicators, tire wear indicators, etc.

Tires can fail for a variety of reasons including low pressure, high temperature, delamination of the tread, excessive flexing of the sidewall, and wear (see, e.g., Summary Root Cause Analysis Bridgestone/Firestone, Inc." http://www.bridgestone-firestone.com/homeimgs/rootcause.htm, Printed March, 2001). Most tire failures can be predicted based on tire pressure alone and the TREAD Act thus addresses the monitoring of tire pressure. However, some failures, such as the Firestone tire failures, can result from substandard materials especially those that are in contact with a steel-reinforcing belt. If the rubber adjacent the steel belt begins to move relative to the belt, then heat will be generated and the temperature of the tire will rise until the tire fails catastrophically. This can happen even in properly inflated tires.

Finally, tires can fail due to excessive vehicle loading and excessive sidewall flexing even if the tire is properly inflated. This can happen if the vehicle is overloaded or if the wrong size tire has been mounted on the vehicle. In most cases, the tire temperature will rise as a result of this additional flexing, however, this is not always the case, and it may even occur too late. Therefore, the device which measures the diameter of the tire footprint on the road is a superior method of measuring excessive loading of the tire.

Generation 1 devices monitor pressure only while generation 2 devices also monitor the temperature and therefore will provide a warning of imminent tire failure more often than through monitoring pressure alone. Generation 3 devices will give an indication that the vehicle is overloaded before either a pressure or temperature monitoring system can respond. The generation 3 system can also be augmented to measure the vibration signature of the tire and thereby detect when a tire has worn to the point that the steel belt is contacting the road. In this manner, the generation 3 system also provides an indication of a worn out tire and, as will be discussed below, an indication of the road coefficient of friction.

Each of these devices communicates to an interrogator with pressure, temperature, and acceleration as appropriate In none of these generational devices is a battery mounted within the vehicle tire required, although in some cases a generator can be used. In most cases, the SAW devices will optionally provide an identification number corresponding to the device to permit the interrogator to separate one tire from another.

Key advantages of the tire monitoring system disclosed herein over most of the currently known prior art are:
  very small size and insignificant weight eliminating the need for wheel counterbalance,
  cost competitive for tire monitoring only, significant cost advantage when systems are combined,
  exceeds customers' price targets,
  high update rate,
  self-diagnostic,
  automatic wheel identification,
  no batteries required—powerless,
  no wires required—wireless.

SAW devices have been used for sensing many parameters including devices for chemical sensing and materials characterization in both the gas and liquid phase. They also are used for measuring pressure, strain, temperature, acceleration, angular rate and other physical states of the environment.

The monitoring of temperature and or pressure of a tire can take place infrequently. It is adequate to check the pressure and temperature of vehicle tires once every ten seconds to once per minute. To utilize the centralized interrogator of this invention, the tire monitoring system would preferably use SAW technology and the device could be located in the valve stem, wheel, tire side wall, tire tread, or other appropriate location with access to the internal tire pressure of the tires. A preferred system is based on a SAW technology discussed above.

At periodic intervals, such as once every minute, the interrogator sends a radio frequency signal at a frequency such as 905 MHz to which the tire monitor sensors have been sensitized. When receiving this signal, the tire monitor sensors (of which there are five in a typical configuration) respond with a signal providing an optional identification number, temperature and pressure data. In one implementation, the interrogator would use multiple, typically two or four, antennas which are spaced apart. By comparing the time of the returned signals from the tires to the antennas, the location of each of the senders can be approximately determined. That is, the antennas can be so located that each tire is a different distance from each antenna and by comparing the return time of the signals sensed by the antennas, the location of each tire can be determined and associated with the returned information. If at least three antennas are used, then returns from adjacent vehicles can be eliminated.

An identification number can accompany each transmission from each tire sensor and can also be used to validate that the transmitting sensor is in fact located on the subject vehicle. In traffic situations, it is possible to obtain a signal from the tire of an adjacent vehicle. This would immediately show up as a return from more than five vehicle tires and the system would recognize that a fault had occurred. The sixth return can be easily eliminated, however, since it could contain an identification number that is different from those that have heretofore been returned frequently to the vehicle system or based on a comparison of the signals sensed by the different antennas. Thus, when the vehicle tire is changed or tires are rotated, the system will validate a particular return signal as originating from the tire-monitoring sensor located on the subject vehicle.

This same concept is also applicable for other vehicle-mounted sensors. This permits a plug and play scenario whereby sensors can be added to, changed, or removed from a vehicle and the interrogation system will automatically adjust. The system will know the type of sensor based on the identification number, frequency, delay and/or its location on the vehicle. For example, a tire monitor could have a different code in the identification number from a switch or weight-monitoring device. This also permits new kinds of sensors to be retroactively installed on a vehicle. If a totally new type of the sensor is mounted to the vehicle, the system software would have to be updated to recognize and know what to do with the information from the new sensor type. By this method, the configuration and quantity of sensing systems on a vehicle can be easily changed and the system interrogating these sensors need only be updated with software upgrades which could occur automatically over the Internet.

Preferred tire-monitoring sensors for use with this invention use the surface acoustic wave (SAW) technology. A radio frequency interrogating signal is sent to all of the tire gages simultaneously and the received signal at each tire gage is sensed using an antenna. The antenna is connected to the IDT transducer that converts the electrical wave to an acoustic wave that travels on the surface of a material such as lithium niobate, or other piezoelectric material such as zinc oxide, Langasite or the polymer polyvinylidene fluoride (PVDF). During its travel on the surface of the piezoelectric material, either the time delay, resonant frequency, amplitude, or phase of the signal (or even possibly combinations thereof) is modified based on the temperature and/or pressure in the tire. This modified wave is sensed by one or more IDT transducers and converted back to a radio frequency wave that is used to excite an antenna for re-broadcasting the wave back to interrogator. The interrogator receives the wave at a time delay after the original transmission that is determined by the geometry of the SAW transducer and decodes this signal to determine the temperature and/or pressure in the subject tire. By using slightly different geometries for each of the tire monitors, slightly different delays can be achieved and randomized so that the probability of two sensors having the same delay is small. The interrogator transfers the decoded information to a central processor that then determines whether the temperature and/or pressure of each of the tires exceed specifications. If so, a warning light can be displayed informing the vehicle driver of the condition. In some cases, this random delay is all that is required to separate the five tire signals and to identify which tires are on the vehicle and thus ignore responses from adjacent vehicles.

With an accelerometer mounted in the tire, as is the case for the generation 3 system, information is present to diagnose other tire problems. For example, when the steel belt wears through the rubber tread, it will make a distinctive noise and create a distinctive vibration when it contacts the pavement. This can be sensed by the SAW accelerometer. The interpretation of various such signals can be done using neural network technology. Similar systems are described more detail in U.S. Pat. No. 5,829,782, incorporated by reference herein. As the tread begins to separate from the tire as in the Bridgestone cases, a distinctive vibration is created which can also be sensed by a tire-mounted accelerometer.

As the tire rotates, stresses are created in the rubber tread surface between the center of the footprint and the edges. If the coefficient of friction on the pavement is low, these stresses can cause the shape of the footprint to change. The generation 3 system, which measures the circumferential length of the footprint, can therefore also be used to measure the friction coefficient between the tire and the pavement.

Similarly, the same or a different interrogator can be used to monitor various components of the vehicle's safety system including occupant position sensors, vehicle acceleration sensors, vehicle angular position, velocity and acceleration sensors, related to both frontal, side or rear impacts as well as rollover conditions. The interrogator could also be used in conjunction with other detection devices such as weight sensors, temperature sensors, accelerometers which are associated with various systems in the vehicle to enable such systems to be controlled or affected based on the measured state.

Some specific examples of the use of interrogators and responsive devices will now be described.

The antennas used for interrogating the vehicle tire pressure transducers will be located outside of the vehicle passenger compartment. For many other transducers to be sensed the antennas must be located at various positions within passenger compartment. This invention contemplates, therefore, a series of different antenna systems, which can be electronically switched by the interrogator circuitry. Alternately, in some cases, all of the antennas can be left connected and total transmitted power increased.

There are several applications for weight or load measuring devices in a vehicle including the vehicle suspension system and seat weight sensors for use with automobile safety systems. As reported in U.S. Pat. Nos. 4,096,740, 4,623,813, 5,585,571, 5,663,531, 5,821,425 and 5,910,647 and International Publication No. WO 00/65320(A1), all of which are incorporated by reference herein to the extent the disclosure of these publications is necessary, SAW devices are appropriate candidates for such weight measurement systems. In this case, the surface acoustic way on the lithium niobate, or other piezoelectric material, is modified in delay time, resonant frequency, amplitude and/or phase based on strain of the member upon which the SAW device is mounted. For example, the conventional bolt that is typically used to connect the passenger seat to the seat adjustment slide mechanism can be replaced with a stud which is threaded on both ends. A SAW strain device is mounted to the center unthreaded section of the stud and the stud is attached to both the seat and the slide mechanism using appropriate threaded nuts. Based on the particular geometry of the SAW device used, the stud can result in as little as a 3 mm upward displacement of the seat compared to a normal bolt mounting system. No wires are required to attach the SAW device to the stud. The interrogator transmits a radio frequency pulse at, for example, 925 MHz that excites antenna on the SAW strain measuring system. After a delay caused by the time required for the wave to travel the length of the SAW device, a modified wave is re-transmitted to the interrogator providing an indication of the strain of the stud with the weight of an object occupying the seat corresponding to the strain. For a seat that is normally bolted to the slide mechanism with four bolts, at least four SAW strain sensors would be used. Since the individual SAW devices are very small, multiple devices can be placed on a stud to provide multiple redundant measurements, or permit bending strains to be determined, and/or to permit the stud to be arbitrarily located with at least one SAW device always within direct view of the interrogator antenna. In some cases, the bolt or stud will be made on non-conductive material to limit the blockage of the RF signal. In other cases, it will be insulated from the slide (mechanism) and used as an antenna.

If two longitudinally spaced apart antennas are used to receive the SAW transmissions from the seat weight sensors, one antenna in front of the seat and the other behind the seat, then the position of the seat can be determined eliminating the need for current seat position sensors. A similar system can be used for other seat and seatback position measurements.

For strain gage weight sensing, the frequency of interrogation would be considerably higher than that of the tire monitor, for example. However, if the seat is unoccupied then the frequency of interrogation can be substantially reduced. For an occupied seat, information as to the identity and/or category and position of an occupying item of the seat can be obtained through the multiple weight sensors described. For this reason, and due to the fact that during the pre-crash event the position of an occupying item of the seat may be changing rapidly, interrogations as frequently as once every 10 milliseconds can be desirable. This would also enable a distribution of the weight being applied to the seat to be obtained which provides an estimation of the position of the object occupying the seat. Using pattern recognition technology, e.g., a trained neural network, sensor fusion, fuzzy logic, etc., the identification of the object can be ascertained based on the determined weight and/or determined weight distribution.

There are many other methods by which SAW devices can be used to determine the weight and/or weight distribution of an occupying item other than the method described above and all such uses of SAW strain sensors for determining the weight and weight distribution of an occupant are contemplated. For example, SAW devices with appropriate straps can be used to measure the deflection of the seat cushion top or bottom caused by an occupying item, or if placed on the seat belts, the load on the belts can determined wirelessly and powerlessly. Geometries similar to those disclosed in U.S. Pat. No. 6,242,701 (which discloses multiple strain gage geometries, the entire disclosure of this patent is incorporated by reference herein to the extent the disclosure is necessary) using SAW strain-measuring devices can also be constructed, e.g., any of the multiple strain gage geometries shown therein.

Although a preferred method for using the invention is to interrogate each of the SAW devices using wireless means, in some cases it may be desirable to supply power to and/or obtain information from one or more of the devices using wires. As such, the wires would be an optional feature.

One advantage of the weight sensors of this invention along with the geometries disclosed in the '701 patent and herein below, is that in addition to the axial stress in the seat support, the bending moments in the structure can be readily determined. For example, if a seat is supported by four "legs", it is possible to determine the state of stress, assuming that axial twisting can be ignored, using four strain gages on each leg support for a total of 16 such gages. If the seat is supported by three legs, then this can be reduced to 12. Naturally, a three-legged support is preferable than four since with four, the seat support is over-determined severely complicating the determination of the stress caused by an object on the seat. Even with three supports, stresses can be introduced depending on the nature of the support at the seat rails or other floor-mounted supporting structure. If simple supports are used that do not introduce bending moments into the structure, then the number of gages per seat can be reduced to three providing a good model of the seat structure is available. Unfortunately, this is usually not the case and most seats have four supports and the attachments to the vehicle not only introduce bending moments into the structure but these moments vary from one position to another and with temperature. The SAW strain gages of this invention lend themselves to the placement of multiple gages onto each support as needed to approximately determine the state of stress and thus the weight of the occupant depending on the particular vehicle application. Furthermore, the wireless nature of these gages greatly simplifies the placement of such gages at those locations that are most appropriate.

One additional point should be mentioned. In many cases, the determination of the weight of an occupant from the static strain gage readings yields inaccurate results due to the indeterminate stress state in the support structure. However, the dynamic stresses to a first order are independent of the residual stress state. Thus, the change in stress that occurs as a vehicle travels down a roadway caused by dips in the roadway can provide an accurate measurement of the weight of an object in a seat. This is especially true if an accelerometer is used to measure the vertical excitation provided to the seat.

Some vehicle models provide load leveling and ride control functions that depend on the magnitude and distribution of load carried by the vehicle suspension. Frequently, wire strain gage technology is used for these functions. That is, the wire strain gages are used to sense the load and/or load distribution of the vehicle on the vehicle suspension system. Such strain gages can be advantageously replaced with strain gages based on SAW technology with the significant advantages in terms of cost, wireless monitoring, dynamic range, and signal level. In addition, SAW strain gage systems can be significantly more accurate than wire strain gage systems.

A strain detector in accordance with this invention can convert mechanical strain to variations in electrical 'signal frequency with a large dynamic range and high accuracy even for very small displacements. The frequency variation is produced through use of a surface acoustic wave delay line as the frequency control element of an oscillator. A surface acoustic wave delay line comprises a transducer deposited on a piezoelectric material such as quartz or lithium niobate which is disposed so as to be deformed by strain in the member which is to be monitored. Deformation of the piezoelectric substrate changes the frequency control characteristics of the surface acoustic wave delay line, thereby changing the frequency of the oscillator. Consequently, the oscillator frequency change is a measure of the strain in the member being monitored and thus the weight applied to the seat. A SAW strain transducer is capable of a degree of accuracy substantially greater than that of a conventional resistive strain gage.

Other applications of weight measuring systems for an automobile include measuring the weight of the fuel tank or other containers of fluid to determine quantity of fluid contained therein.

One problem with SAW devices is that if they are designed to operate at the GHz frequency, the feature sizes become exceeding small and the devices are difficult to manufacture. On the other hand, if the frequencies are considerably lower, for example, in the tens of megahertz range, then the antenna sizes become excessive. It is also more difficult to obtain antenna gain at the lower frequencies. This is also related to antenna size. One method of solving this problem is to transmit an interrogation signal in the many GHz range which is modulated at the hundred MHz range. At the SAW transducer, the transducer is tuned to the modulated frequency. Using a nonlinear device such as a Shocky diode, the modified signal can be mixed with the incoming high frequency signal and re-transmitted through the same antenna. For this case, the interrogator could continuously broadcast the carrier frequency.

In addition to measuring the weight of an occupying item on a seat, the location of the seat and setback can also be determined by the interrogator. Since the SAW devices inherently create a delayed return signal, either that delay must be very accurately known or an alternate approach is required. One such alternate approach is to use the heterodyne principal described above to cause the antenna to return a signal of a different frequency. By comparing the phases of the sending and received signal, the distance to the device can be determined. Also, as discussed above, multiple antennas can be used for seat position and seatback position sensing.

With respect to switches, devices based on RFID technology can be used as switches in a vehicle as described in U.S. Pat. Nos. 6,078,252 and 6,144,288, and U.S. provisional patent application Ser. No. 60/231,378 all of which are incorporated by reference herein. There are many ways that it can be accomplished. A switch can be used to connect an antenna to either an RFID electronic device or to an RFID SAW device. This of course requires contacts to the closed by the switch activation. An alternate approach is to use pressure from an occupant's finger, for example, to alter the properties of the acoustic wave on the SAW material much as in a SAW touch screen. These properties that can be modified include the amplitude of the acoustic wave, and its phase, and/or the time delay or an external impedance connected to one of the SAW reflectors as disclosed in U.S. Pat. No. 6,084,503, incorporated by reference herein. In this implementation, the SAW transducer can contain two sections, one which is modified by the occupant and the other which serves as a reference. A combined signal is sent to the interrogator that decodes the signal to determine that the switch has been activated. By any of these technologies, switches can be arbitrarily placed within the interior of an automobile, for example, without the need for wires. (The wires would be an optional feature.) Since wires and connectors are the clause of most warranty repairs in an automobile, not only is the cost of switches substantially reduced but also the reliability of the vehicle electrical system is substantially improved.

The interrogation of switches can take place with moderate frequency such as once every 100 milliseconds. Either through the use of different frequencies or different delays, a large number of switches can be either time, code, space or frequency multiplexed to permit separation of the signals obtained by the interrogator.

Another approach is to attach a variable impedance device across one of the reflectors on the SAW device. The impedance can therefore used to determine the relative reflection from the reflector compared to other reflectors on the SAW device. In this way, the magnitude as well as the presence of a force exerted by an occupant's finger, for example, can be used to provide a rate sensitivity to the desired function. In an alternate design, as shown U.S. Pat. No. 6,144,288, incorporated by reference herein, the switch is used to connect the antenna to the SAW device. Of course, in this case the interrogator will not get a return from the SAW switch unless it is depressed.

Temperature measurement is another field in which SAW technology can be applied and the invention encompasses several embodiments of SAW temperature sensors.

U.S. Pat. No. 4,249,418, incorporated by reference herein, is one of many examples of prior art SAW temperature sensors. Temperature sensors are commonly used within vehicles and many more applications might exist if a low cost wireless temperature sensor is available, i.e., the invention. The SAW technology can be used for such temperature sensing tasks. These tasks include measuring the vehicle coolant temperature, air temperature within passenger compartment at multiple locations, seat temperature for use in conjunction with seat warming and cooling systems, outside temperatures and perhaps tire surface temperatures to provide early warning to operators of road freezing conditions. One example, is to provide air temperature sensors in the passenger compartment in the vicinity of ultrasonic transducers used in occupant sensing systems as described in the current assignee's U.S. Pat. No. 5,943,295 (Varga et al.), incorporated by reference herein, since the speed of sound in the air varies by approximately 20% from −40° C. to 85° C. The subject matter of this patent is included in the invention to form a part thereof. Current ultrasonic occupant sensor systems do not measure or compensate for this change in the speed of sound with the effect of significantly reducing the accuracy of the systems at the temperature extremes. Through the judicious placement of SAW temperature sensors in the vehicle, the passenger compartment air temperature can be accurately estimated and the information provided wirelessly to the ultrasonic occupant sensor system thereby permitting corrections to be made for the change in speed of sound.

Acceleration sensing is another field in which SAW technology can be applied and the invention encompasses several embodiments of SAW accelerometers.

U.S. Pat. Nos. 4,199,990, 4,306,456 and 4,549,436, all of which are incorporated by reference herein, are examples of prior art SAW accelerometers. Most airbag crash sensors for determining whether the vehicle is experiencing a frontal or side impact currently use micromachined accelerometers. These accelerometers are usually based on the deflection of a mass which is sensed using either capacitive or piezoresistive technologies. SAW technology has heretofore not been used as a vehicle accelerometer or for vehicle crash sensing. Due to the importance of this function, at least one interrogator could be dedicated to this critical function. Acceleration signals from the crash sensors should be reported at least preferably every 100 microseconds. In this case, the dedicated interrogator would send an interrogation pulse to all crash sensor accelerometers every 100 microseconds and receive staggered acceleration responses from each of the SAW accelerometers wirelessly. This technology permits the placement of multiple low-cost accelerometers at ideal locations for crash sensing including inside the vehicle side doors, in the passenger compartment and in the frontal crush zone. Additionally crash sensors can now be located in the rear of the vehicle in the crush zone to sense rear impacts. Since the acceleration data is transmitted wirelessly, concern about the detachment or cutting of wires from the sensors disappears. One of the main concerns, for example, of placing crash sensors in the vehicle doors where they most appropriately can sense vehicle side impacts, is the fear that an impact into the A-pillar of the automobile would sever the wires from the door-mounted crash sensor before the crash was sensed. This problem disappears with the current wireless technology of this invention. If two accelerometers are placed at some distance from each other, the roll rate of the vehicle can be determined and thus the tendency of the vehicle to rollover can be predicted in time to automatically take corrective action and/or deploy a curtain airbag or other airbag(s).

Although the sensitivity of measurement is considerably greater than that obtained with conventional piezoelectric accelerometers, the frequency deviation remains low in absolute value. Accordingly, the frequency drift of thermal origin has to be made as low as possible by selecting a suitable cut of the piezoelectric material. The resulting accuracy is impressive as presented in U.S. Pat. No. 4,549,436, incorporated by reference herein, which discloses an angular accelerometer with a dynamic a range of 1 million, temperature coefficient of 0.005%/deg F, an accuracy of 1 microradian/sec$^2$, a power consumption of 1 milliwatt, a drift of 0.01% per year, a volume of 1 cc/axis and a frequency response of 0 to 1000 Hz. The subject matter of this patent is hereby included in the invention to constitute a part of the invention. A similar design can be used for acceleration sensing.

In a similar manner as the polymer coated SAW device is used to measure pressure, a similar device wherein a seismic mass is attached to a SAW device through a polymer interface can be made to sense acceleration. This geometry has a particular advantage for sensing accelerations below 1 G, which has proved to be very difficult in conventional micromachined accelerometers due to their inability to both measure low accelerations and withstand shocks.

Gyroscopes are another field in which SAW technology can be applied and the invention encompasses several embodiments of SAW gyroscopes.

The SAW technology is particularly applicable for gyroscopes as described in International Publication No. WO 00/79217A2 to Varadan et al. The output of such gyroscopes can be determined with an interrogator that is also used for the crash sensor accelerometers, or a dedicated interrogator can be used. Gyroscopes having an accuracy of approximately 1 degree per second have many applications in a vehicle including skid control and other dynamic stability functions. Additionally, gyroscopes of similar accuracy can be used to sense impending vehicle rollover situations in time to take corrective action.

SAW gyroscopes of the type described in WO 00/79217A2 have the capability of achieving accuracies approaching 3 degrees per hour. This high accuracy permits use of such gyroscopes in an inertial measuring unit (IMU) that can be used with accurate vehicle navigation systems and autonomous vehicle control based on differential GPS corrections. Such a system is described in the current assignee's U.S. patent application Ser. No. 09/177,041. Such navigation systems depend on the availability of four or more GPS satellites and an accurate differential correction signal such as provided by the OmniStar Corporation or NASA or through the National Differential GPS system now being deployed. The availability of these signals degrades in urban canyon environments, tunnels, and on highways when the vehicle is in the vicinity of large trucks. For this application, an IMU system should be able to accurately control the vehicle for perhaps 15 seconds and preferably for up to five minutes. An IMU based on SAW technology or the technology of U.S. Pat. No. 4,549,436 discussed above are the best-known devices capable of providing sufficient accuracies for this application at a reasonable cost. Other accurate gyroscope technologies such as fiber optic systems are more accurate but can cost many thousands of dollars. In contrast, in high volume production, an IMU of the required accuracy based on SAW technology should cost less than $100.

Once an IMU of the accuracy described above is available in the vehicle, this same device can be used to provide significant improvements to vehicle stability control and rollover prediction systems.

Keyless entry systems are another field in which SAW technology can be applied and the invention encompasses several embodiments of access control systems using SAW devices.

A common use of SAW technology is for access control to buildings. RFID technology using electronics is also applicable for this purpose; however, the range of electronic RFID technology is usually limited to one meter or less. In contrast, the SAW technology can permit sensing up to about 30 meters. As a keyless entry system, an automobile can be configured such that the doors unlock as the holder of a card containing the SAW ID system approaches the vehicle and similarly, the vehicle doors can be automatically locked when occupant with the card travels beyond a certain distance from the vehicle. When the occupant enters the vehicle, the doors can again automatically lock either through logic or through a current system wherein doors automatically lock when the vehicle is placed in gear. An occupant with such a card would also not need to have an ignition key. The vehicle would recognize that the SAW based card was inside vehicle and then permit the vehicle to be started by issuing an oral command if a voice recognition system is present or by depressing a button, for example, without the need for an ignition key.

Occupant presence and position sensing is another field in which SAW technology can be applied and the invention encompasses several embodiments of SAW occupant presence and/or position sensors.

Many sensing systems are available for the use to identify and locate occupants or other objects in a passenger compartment of the vehicle. Such sensors include ultrasonic sensors, chemical sensors (e.g. carbon dioxide), cameras, radar systems, heat sensors, capacitance, magnetic or other field change sensors, etc. Most of these sensors require power to operate and return information to a central processor for analysis. An ultrasonic sensor, for example, may be mounted in or near the headliner of the vehicle and periodically it transmits a few ultrasonic waves and receives reflections of these waves from occupying items of the passenger seat. Current systems on the market are controlled by electronics in a dedicated ECU.

An alternate method as taught in this invention is to use an interrogator to send a signal to the headliner-mounted ultrasonic sensor causing that sensor to transmit and receive ultrasonic waves. The sensor in this case would perform mathematical operations on the received waves and create a vector of data containing perhaps twenty to forty values and transmit that vector wirelessly to the interrogator. By means of this system, the ultrasonic sensor need only be connected to the vehicle power system and the information could be transferred to and from the sensor wirelessly. Such a system significantly reduces the wiring complexity especially when there may be multiple such sensors distributed in the passenger compartment. Now, only a power wire needs to be attached to the sensor and there does not need to be any direct connection between the sensor and the control module. Naturally, the same philosophy would apply to radar-based sensors, electromagnetic sensors of all kinds including cameras, capacitive or other electromagnetic field change sensitive sensors etc. In some cases, the sensor itself can operate on power supplied by the interrogator through radio frequency transmission. In this case, even the connection to the power line can be omitted. This principle can be extended to the large number of sensors and actuators that are currently in the vehicle where the only wires that are needed are those to supply power to the sensors and actuators and the information is supplied wirelessly.

Such wireless powerless sensors can also be use, for example, as close proximity sensors based on measurement of thermal radiation from an occupant. Such sensors can be mounted on any of the surfaces in the passenger compartment, including the seats, which are likely to receive such radiation.

A significant number of people are suffocated each year in automobiles due to excessive heat, carbon dioxide, carbon monoxide, or other dangerous fumes. The SAW sensor technology is particularly applicable to solving these kinds of problems. The temperature measurement capabilities of SAW transducers have been discussed above. If the surface of a SAW device is covered with a material which captures carbon dioxide, for example, such that the mass, elastic constants or other property of surface coating changes, the characteristics of the surface acoustic waves can be modified as described in detail in U.S. Pat. No. 4,637,987 and elsewhere. Once again, an interrogator can sense the condition of these chemical-sensing sensors without the need to supply power and connect the sensors with either wireless communication or through the power wires. If a concentration of carbon monoxide is sensed, for example, an alarm can be sounded, the windows opened, and/or the engine extinguished. Similarly, if the temperature within the passenger compartment exceeds a certain level, the windows can be automatically opened a little to permit an exchange of air reducing the inside temperature and thereby perhaps saving the life of an infant or pet left in the vehicle unattended.

In a similar manner, the coating of the surface wave device can contain a chemical which is responsive to the presence of alcohol. In this case, the vehicle can be prevented from operating when the concentration of alcohol vapors in the vehicle exceeds some determined limit.

Each year a number of children and animals are killed when they are locked into a vehicle trunk. Since children and animals emit significant amounts of carbon dioxide, a carbon dioxide sensor connected to the vehicle system wirelessly and powerlessly provides an economic way of detecting the presence of a life form in the trunk. If a life form is detected, then a control system can release a trunk lock thereby opening the trunk. Alarms can also be sounded or activated when a life form is detected in the trunk.

Although they will not be discussed in detail, SAW sensors operating in the wireless mode can also be used to sense for ice on the windshield or other exterior surfaces of the vehicle, condensation on the inside of the windshield or other interior surfaces, rain sensing, heat load sensing and many other automotive sensing functions. They can also be used to sense outside environmental properties and states including temperature, humidity, etc.

SAW sensors can be economically used to measure the temperature and humidity at numerous places both inside and outside of a vehicle. When used to measure humidity inside the vehicle, a source of water vapor can be activated to increase the humanity when desirable and the air conditioning system can be activated to reduce the humidity when necessary. Temperature and humidity measurements outside of the vehicle can be an indication of potential road icing problems. Such information can be used to provide early warning to a driver of potentially dangerous conditions. Although the invention described herein is related to land vehicles, many of these advances are equally applicable to other vehicles such as boats, airplanes and even, in some cases, homes and buildings. The invention disclosed herein, therefore, is not limited to automobiles or other land vehicles.

Road condition sensing is another field in which SAW technology can be applied and the invention encompasses several embodiments of SAW road condition sensors.

The temperature and moisture content of the surface of a roadway are critical parameters in determining the icing state of the roadway. Attempts have been made to measure the coefficient of friction between a tire and the roadway by placing strain gages in the tire tread. Naturally, such strain gages are ideal for the application of SAW technology especially since they can be interrogated wirelessly from a distance and they require no power for operation. As discussed above, SAW accelerometers can also perform this function. The measurement of the friction coefficient, however, is not predictive and the vehicle operator is only able to ascertain the condition after the fact. SAW based transducers have the capability of being interrogated as much as 100 feet from the interrogator. Therefore, the judicious placement of low-cost powerless SAW temperature and humidity sensors in or on the roadway at critical positions can provide an advance warning to vehicle operators that road is slippery ahead. Such devices are very inexpensive and therefore could be placed at frequent intervals along a highway.

An infrared sensor that looks down the highway in front of the vehicle can actually measure the road temperature prior to the vehicle traveling on that part of the roadway. This system also would not give sufficient warning if the operator waited for the occurrence of a frozen roadway. The probability of the roadway becoming frozen, on the other hand, can be predicted long before it occurs, in most cases, by watching the trend in the temperature.

Some lateral control of the vehicle can also be obtained from SAW transducers or electronic RFID tags placed down the center of the lane, either above the vehicles or in the roadway, for example. A vehicle having two receiving antennas approaching such devices, through triangulation, is able to determine the lateral location of the vehicle relative to these SAW devices. If the vehicle also has an accurate map of the roadway, the identification number associated with each such device can be used to obtain highly accurate longitudinal position determinations. Ultimately, the SAW devices can be placed on structures beside the road and perhaps on every mile or tenth of a mile marker. If three antennas are used, as discussed herein, the distances to the SAW device can be determined.

Electronic RFID tags are also suitable for lateral and longitudinal positioning purposes, however, the range available for electronic RFID systems is considerably less than that of SAW based systems. On the other hand, as taught in U.S. provisional patent application Ser. No. 60/231,378, the time of flight of the RFID system can be used to determine the distance from the vehicle to the RFID tag. Because of the inherent delay in the SAW devices and its variation with temperature, accurate distance measurement is probably not practical based on time of flight but somewhat less accurate distance measurements based on relative time of arrival can be made. Even if the exact delay imposed by the SAW device was accurately known at one temperature, such devices are usually reasonably sensitive to changes in temperature, hence they make good temperature sensors, and thus the accuracy of the delay in the SAW device is more difficult to maintain. An interesting variation of an electronic RFID that is particularly applicable to this and other applications of this invention is disclosed in A. Pohl, L. Reindl, "New passive sensors", Proc. 16th IEEE Instrumentation and Measurement Technology Conf., IMTC/99, 1999, pp. 1251–1255, which is incorporated by reference herein in its entirety.

Many SAW devices are based on lithium niobate or similar strong piezoelectric materials. Such materials have high thermal expansion coefficients. An alternate material is quartz that has a very low thermal expansion coefficient. However, its piezoelectric properties are inferior to lithium niobate. One solution to this problem is to use lithium niobate as the coupling system between the antenna and the material upon which the surface acoustic wave travels. In this matter, the advantages of a low thermal expansion coefficient material can be obtained while using the lithium niobate for its strong piezoelectric properties. Other useful materials such as Langasite have properties that are intermediate between lithium niobate and quartz. Note that it is also possible to use combinations of materials to achieve particular objectives with property measurement since different materials respond differently to different sensed properties or environments.

The use of SAW tags as an accurate precise positioning system as described above would be applicable for accurate vehicle location, as discussed in U.S. patent application Ser. No. 09/177,041, for lanes in tunnels, for example, or other cases where loss of satellite lock is common.

The various technologies discussed above can be used in combination. The electronic RFID tag can be incorporated into a SAW tag providing a single device that provides both an instant reflection of the radio frequency waves as well as a re-transmission at a later time. This marriage of the two technologies permits the strengths of each technology to be exploited in the same device. For most of the applications described herein, the cost of mounting such a tag in a vehicle or on the roadway far exceeds the cost of the tag itself. Therefore, combining the two technologies does not significantly affect the cost of implementing tags onto vehicles or roadways or side structures.

An alternate method to the electronic RFID tag is to simply use a radar reflector and measure the time of flight to the reflector and back. The radar reflector can even be made of a series of reflecting surfaces displaced from each other to achieve some simple coding.

Another field in which SAW technology can be applied is for "ultrasound-on-a-surface" type of devices.

U.S. Pat. No. 5,629,681, assigned to the same assignee herein and incorporated by reference herein, describes many uses of ultrasound in a tube. Many of the applications are also candidates for ultrasound-on-a-surface devices. In this case, a micromachined SAW device will in general be replaced by a much larger structure.

Touch screens based on surface acoustic waves are well known in the art. The use of this technology for a touch pad for use with a heads-up display is disclosed in the current assignee's U.S. patent application Ser. No. 09/645,709. The use of surface acoustic waves in either one or two dimensional applications has many other possible uses such as for pinch protection on window and door closing systems, crush sensing crash sensors, occupant presence detector and butt print measurement systems, generalized switches such as on the circumference or center of the steering wheel, etc. Since these devices typically require significantly more power than the micromachined SAW devices discussed above, most of these applications will require a power connection. On the other hand, the output of these devices can go through a SAW micromachined device or, in some other manner, be attached to an antenna and interrogated using a remote interrogator thus eliminating the need for a direct wire communication link.

One example would be to place a surface acoustic wave device on the circumference of the steering wheel. Upon depressing a section of this device, the SAW wave would be attenuated. The interrogator would notify the acoustic wave device at one end of the device to launch an acoustic wave and then monitor output from the antenna. Depending on the phase, time delay, and/or amplitude of the output wave, the interrogator would know where the operator had depressed the steering wheel SAW switch and therefore know the function desired by the operator.

Piezoelectric generators are another field in which SAW technology can be applied and the invention encompasses several embodiments of SAW piezoelectric generators.

An alternate approach for some applications, such as tire monitoring, where it is difficult to interrogate the SAW device as the wheel, and thus the antenna, is rotating, the transmitting power can be significantly increased if there is a source of energy inside the tire. Many systems now use a battery but this leads to problems related to having to periodically replace the battery and temperature effects. In some cases, the manufacturers recommend that the battery be replaced as often as every 6 to 12 months. Batteries also sometimes fail to function properly at cold temperatures and have their life reduced when operated at high temperatures. For these reasons, there is a strong belief that a tire monitoring system should obtain its power from some source external of the tire. Similar problems can be expected for other applications.

One novel solution to this problem is to use the flexing of the tire itself to generate electricity. If a thin film of PVDF is attached to the tire inside and adjacent to the tread, then as the tire rotates the film will flex and generate electricity. This energy can then be stored on one or more capacitors and used to power the tire monitoring circuitry. Also, since the amount of energy that is generated depends of the flexure of the tire, this generator can also be used to monitor the health of the tire in a similar manner as the generation 3 accelerometer system described above.

As mentioned above, the transmissions from different SAW devices can be time multiplexed by varying the delay time from device to device, frequency multiplexed by varying the natural frequencies of the SAW devices, code multiplexed by varying the identification code of the SAW devices or space multiplexed by using multiple antennas. Considering the time multiplexing case, varying the length of the SAW device and thus the delay before retransmission can separate different classes of devices. All seat sensors can have one delay which would be different from tire monitors or light switches etc.

Figure 13A:
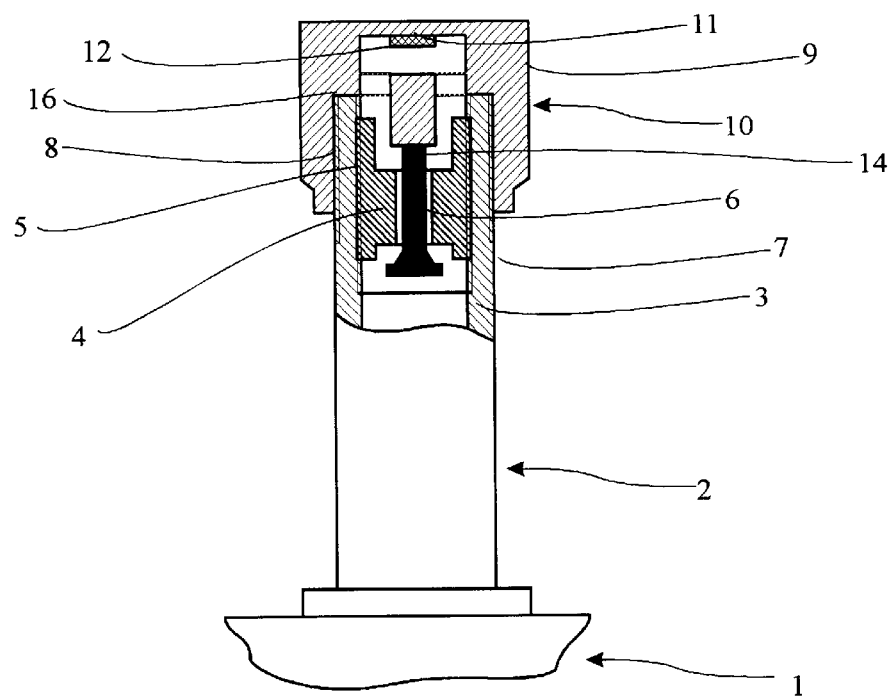
FIG. 13A is a partial cutaway view of a tire pressure monitor using an absolute pressure measuring SAW device.

Referring now to FIGS. 13A–36B, a first embodiment of a valve cap 10 including a tire pressure monitoring system in accordance with the invention is shown generally at 10 in FIG. 13A. A tire 1 has a protruding, substantially cylindrical valve stem 2 which is shown in a partial cutaway view in FIG. 13A. The valve stem 2 comprises a sleeve 3 and a tire valve assembly 5. The sleeve 3 of the valve stem 2 is threaded on both its inner surface and its outer surface. The tire valve assembly 5 is arranged in the sleeve 3 and includes threads on an outer surface which are mated with the threads on the inner surface of the sleeve 3. The valve assembly 5 comprises a valve seat 4 and a valve pin 6 arranged in an aperture in the valve seat 4. The valve assembly 5 is shown in the open condition in FIG. 13A whereby air flows through a passage between the valve seat 4 and the valve pin 6.

The valve cap 10 includes a substantially cylindrical body 9 and is attached to the valve stem 2 by means of threads 8 arranged on an inner cylindrical surface of body 9 which are mated with the threads on the outer surface of the sleeve 3. The valve cap 10 comprises a valve pin depressor 14 arranged in connection with the body 9 and a SAW pressure sensor 11. The valve pin depressor 14 engages the valve pin 6 upon attachment of the valve cap 10 to the valve stem 2 and depresses it against its biasing spring, not shown, thereby opening the passage between the valve seat 4 and the valve pin 6 allowing air to pass from the interior of tire 1 into a reservoir or chamber 12 in the body 9. Chamber 12 contains the SAW pressure sensor 11 as described in more detail below.

Pressure sensor 11 is an absolute pressure-measuring device. It functions based on the principle that the increase in air pressure and thus air density in the chamber 12 increases the mass loading on a SAW device changing the velocity of surface acoustic wave on the piezoelectric material. The pressure sensor 11 is therefore positioned in an exposed position in the chamber 12.

Figure 13B:
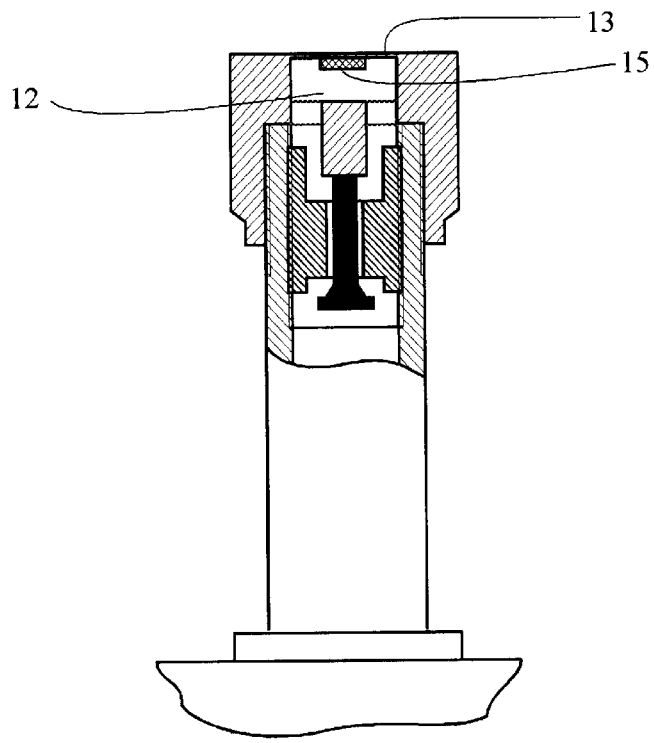
FIG. 13B is a partial cutaway view of a tire pressure monitor using a differential pressure measuring SAW device.

A second embodiment of a valve cap 10' in accordance with the invention is shown in FIG. 13B and comprises a SAW strain sensing device 15 that is mounted onto a flexible membrane 13 attached to the body 9' of the valve cap 10' and in a position in which it is exposed to the air in the chamber 12'. When the pressure changes in chamber 12', the deflection of the membrane 13 changes thereby changing the stress in the SAW device 15.

Strain sensor 15 is thus a differential pressure-measuring device. It functions based on the principle that changes in the flexure of the membrane 13 can be correlated to changes in pressure in the chamber 12' and thus, if an initial pressure and flexure are known, the change in pressure can be determined from the change in flexure.

FIGS. 13A and 13B therefore illustrate two different methods of using a SAW sensor in a valve cap for monitoring the pressure inside a tire. The precise manner in which the SAW sensors 11,15 operate is discussed fully below but briefly, each sensor 11,15 includes an antenna and an interdigital transducer which receives a wave via the antenna from an interrogator which proceeds to travel along a substrate. The time in which the waves travel across the substrate and return to the interdigital transducer is dependent on the temperature, the mass loading on the substrate (in the embodiment of FIG. 13A) or the flexure of membrane 13 (in the embodiment of FIG. 13B). The antenna transmits a return wave which is receives and the time delay between the transmitted and returned wave is calculated and correlated to the pressure in the chamber 12 or 12'.

Sensors 11 and 15 are electrically connected to the metal valve cap 10 that is electrically connected to the valve stem 2. The valve stem 2 is electrically isolated from the tire rim and serves as an antenna for transmitting radio frequency electromagnetic signals from the sensors 11 and 15 to a vehicle mounted interrogator, not shown, to be described in detail below. As shown in FIG. 13A., a pressure seal 16 is arranged between an upper rim of the sleeve 3 and an inner shoulder of the body 9 of the valve cap 10 and serves to prevent air from flowing out of the tire 1 to the atmosphere.

The speed of the surface acoustic wave on the piezoelectric substrate changes with temperature in a predictable manner as well as with pressure. For the valve cap implementations, a separate SAW device can be attached to the outside of the valve cap and protected with a cover where it is subjected to the same temperature as the SAW sensors 11 or 15 but is not subject to pressure or strain. This requires that each valve cap comprise two SAW devices, one for pressure sensing and another for temperature sensing. Since the valve cap is exposed to ambient temperature, a preferred approach is to have a single device on the vehicle which measures ambient temperature outside of the vehicle passenger compartment. Many vehicles already have such a temperature sensor. For those installations where access to this temperature data is not convenient, a separate SAW temperature sensor can be mounted associated with the interrogator antenna, as illustrated below, or some other convenient place.

Although the valve cap 10 is provided with the pressure seal 16, there is a danger that the valve cap 10 will not be properly assembled onto the valve stem 2 and a small quantity of the air will leak over time. FIG. 14 provides an alternate design where the SAW temperature and pressure measuring devices are incorporated into the valve stem. This embodiment is thus particularly useful in the initial manufacture of a tire.

The valve stem assembly is shown generally at 20 and comprises a brass valve stem 7 which contains a tire valve assembly 5. The valve stem 7 is covered with a coating 21 of a resilient material such as rubber, which has been partially removed in the drawing. A metal conductive ring 22 is electrically attached to the valve stem 7. A rubber extension 23 is also attached to the lower end of the valve stem 7 and contains a SAW pressure and temperature sensor 24. The SAW pressure and temperature sensor 24 can be of at least two designs wherein the SAW sensor is used as an absolute pressure sensor as shown in FIG. 14A or an as a differential sensor based on membrane strain as shown in FIG. 14B.

In FIG. 14A, the SAW sensor 24 comprises a capsule 32 having an interior chamber in communication with the interior of the tire via a passageway 30. A SAW absolute pressure sensor 27 is mounted onto one side of a rigid membrane or separator 31 in the chamber in the capsule 32. Separator 31 divides the interior chamber of the capsule 32 into two compartments 25 and 26, with only compartment 25 being in flow communication with the interior of the tire. The SAW absolute pressure sensor 27 is mounted in compartment 25 which is exposed to the pressure in the tire through passageway 30. A SAW temperature sensor 28 is attached to the other side of the separator 31 and is exposed to the pressure in compartment 26. The pressure in compartment 26 is unaffected by the tire pressure and is determined by the atmospheric pressure when the device was manufactured and the effect of temperature on this pressure. The speed of sound on the SAW temperature sensor 28 is thus affected by temperature but not by pressure in the tire.

The operation of SAW sensors 27 and 28 is discussed elsewhere more fully but briefly, since SAW sensor 27 is affected by the pressure in the tire, the wave which travels along the substrate is affected by this pressure and the time delay between the transmission and reception of a wave can be correlated to the pressure. Similarly, since SAW sensor 28 is affected by the temperature in the tire, the wave which travels along the substrate is affected by this temperature and the time delay between the transmission and reception of a wave can be correlated to the temperature.

FIG. 14B illustrates an alternate configuration of sensor 24 where a flexible membrane 33 is used instead of the rigid separator 31 shown in the embodiment of FIG. 14A, and a SAW device is mounted on flexible member 33. In this embodiment, the SAW temperature sensor 28 is mounted to a different wall of the capsule 32. A SAW device 29 is thus affected both by the strain in membrane 33 and the absolute pressure in the tire. Normally, the strain effect will be much larger with a properly designed membrane 33.

The operation of SAW sensors 28 and 29 is discussed elsewhere more fully but briefly, since SAW sensor 28 is affected by the temperature in the tire, the wave which travels along the substrate is affected by this temperature and the time delay between the transmission and reception of a wave can be correlated to the temperature. Similarly, since SAW sensor 29 is affected by the pressure in the tire, the wave which travels along the substrate is affected by this pressure and the time delay between the transmission and reception of a wave can be correlated to the pressure.

In both of the embodiments shown in FIG. 14A and FIG. 14B, a separate temperature sensor is illustrated. This has two advantages. First, it permits the separation of the temperature effect from the pressure effect on the SAW device. Second, it permits a measurement of tire temperature to be recorded. Since a normally inflated tire can experience excessive temperature caused, for example, by an overload condition, it is desirable to have both temperature and pressure measurements of each vehicle tire The SAW devices 27, 28 and 29 are electrically attached to the valve stem 7 which again serves as an antenna to transmit radio frequency information to an interrogator. This electrical connection can be made by a wired connection; however, the impedance between the SAW devices and the antenna may not be properly matched. An alternate approach as described in Varadan, V. K. et al., "Fabrication, characterization and testing of wireless MEMS-IDT based microaccelerometers" Sensors and Actuators A 90 (2001) p. 7–19, 2001 Elsevier Netherlands, incorporated herein by reference, is to inductively couple the SAW devices to the brass tube.

Although an implementation into the valve stem and valve cap examples have been illustrated above, an alternate approach is to mount the SAW temperature and pressure monitoring devices elsewhere within the tire. Similarly, although the tire stem in both cases above serves the antenna, in many implementations, it is preferable to have a separately designed antenna mounted within or outside of the vehicle tire. For example, such an antenna can project into the tire from the valve stem or can be separately attached to the tire or tire rim either inside or outside of the tire. In some cases, it can be mounted on the interior of the tire on the sidewall.

Figure 15A:
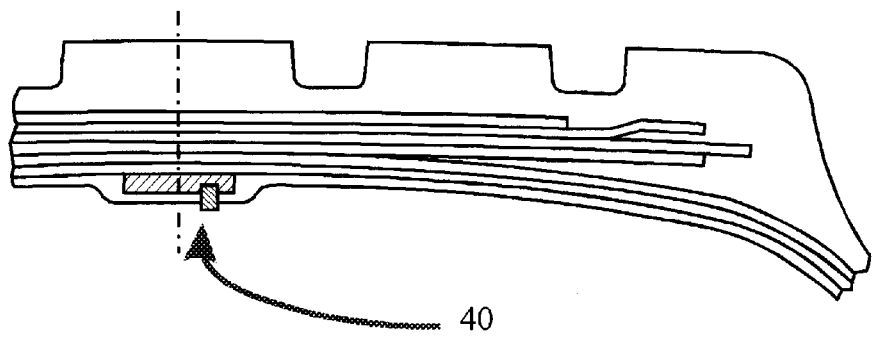
FIG. 15A is a view of an accelerometer-based tire monitor also incorporating a SAW pressure and temperature monitor and inserted into the tire opposite the tread during manufacture.
Figure 15:
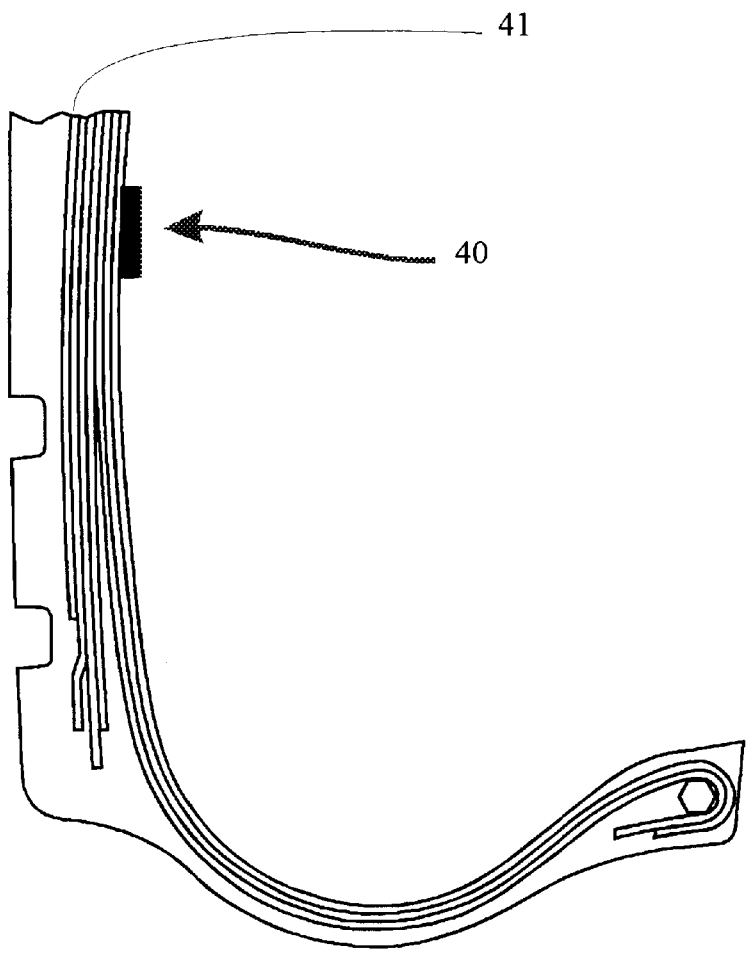
FIG. 15 is a view of an accelerometer-based tire monitor also incorporating a SAW pressure and temperature monitor and cemented to the interior of the tire opposite the tread.

A more advanced embodiment of a tire monitor in accordance with the invention is illustrated generally at 40 in FIGS. 15 and 15A. In addition to temperature and pressure monitoring devices as described in the previous applications, the tire monitor assembly 40 comprises an accelerometer of any of the types to be described below which is configured to measure either or both of the tangential and radial accelerations. Tangential accelerations as used herein mean accelerations tangent to the direction of rotation of the tire and radial accelerations as used herein mean accelerations toward or away from the wheel axis. For either accelerometer case, the acceleration will be zero when the monitor assembly 40 is closest to the road and will be at a maximum when the monitor assembly 40 is at its maximum distance from the road. Both accelerations will increase and decrease at all positions in between.

In FIG. 15, the tire monitor assembly 40 is cemented to the interior of the tire opposite the tread. In FIG. 15A, the tire monitor assembly 40 is inserted into the tire opposite the tread during manufacture.

Superimposed on the acceleration signals will be vibrations introduced into tire from road interactions and due to tread separation and other defects. Additionally, the presence of the nail or other object attached to the tire will, in general, excite vibrations that can be sensed by the accelerometers. When the tread is worn to the extent that the wire belts 41 begin impacting the road, additional vibrations will be induced.

Through monitoring the acceleration signals from the tangential or radial accelerometers within the tire monitor assembly 40, delamination, a worn tire condition, imbedded nails, other debris attached to the tire tread, hernias, can all be sensed. Additionally, as previously discussed, the length of time that the tire tread is in contact with the road opposite tire monitor 40 can be measured and, through a comparison with the total revolution time, the length of the tire footprint on the road can be determined. This permits the load on the tire to be measured, thus providing an indication of excessive tire loading. As discussed above, a tire can fail due to over loading even when the tire interior temperature and pressure are within acceptable limits. Other tire monitors cannot sense such conditions.

Since the acceleration changes during the rotation of the tire, a simple switch containing an acceleration sensing mass can now be designed that would permit data transmission only during one part of the tire rotation. Such a switch can be designed, for example, such that it shorts out the antenna except when the tire is experiencing zero acceleration at which time it permits the device to transmit data to the interrogator. Such a system would save on battery power, for example, for powered systems and minimize bandwidth use for passive systems.

In the discussion above, the use of the tire valve stem as an antenna has been discussed. An antenna can also be placed within the tire when the tire sidewalls are not reinforced with steel. In some cases and for some frequencies, it is sometimes possible to use the tire steel bead or steel belts as an antenna, which in some cases can be coupled to inductively. Alternately, the antenna can be designed integral with the tire beads or belts and optimized and made part of the tire during manufacture.

Although the discussion above has centered on the use of SAW devices, the configuration of FIG. 15 can also be effectively accomplished with other pressure, temperature and accelerometer sensors. One of the advantages of using SAW devices is that they are totally passive thereby eliminating the requirement of a battery. For the implementation of tire monitor assembly 40, the changes in acceleration can also be used to generate sufficient electrical energy to power a silicon microcircuit. In this configuration, additional devices, typically piezoelectric devices, are used as a generator of electricity that can be stored in one or more conventional capacitors or ultra-capacitors. Naturally, other types of electrical generators can be used such as those based on a moving coil and a magnetic field etc. A PVDF piezoelectric polymer can also be used to generate electrical energy based on the flexure of the tire as described below.

Figure 16:
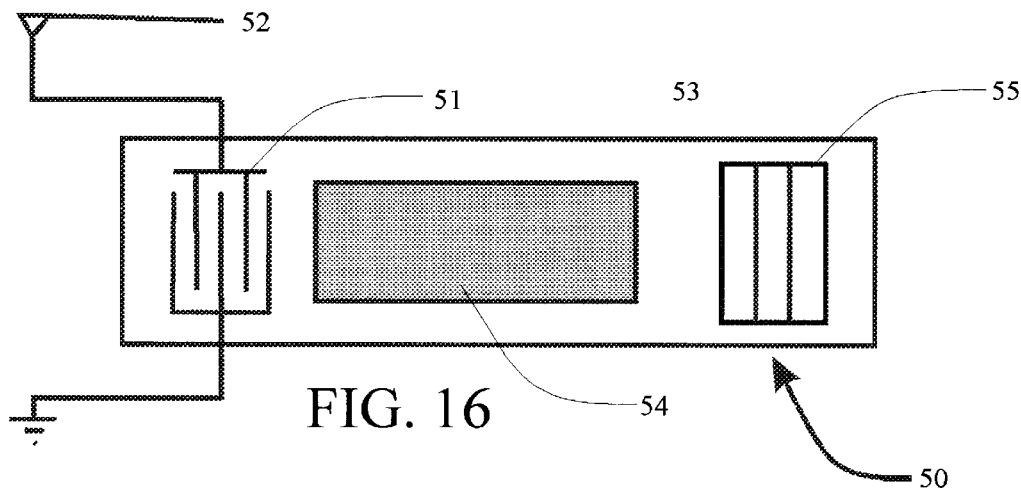
FIG. 16 is a detailed view of a polymer on SAW pressure sensor.

FIG. 16 illustrates an absolute pressure sensor based on surface acoustic wave (SAW) technology. A SAW absolute pressure sensor 50 has an interdigital transducer (IDT) 51 which is connected to antenna 52. Upon receiving an RF signal of the proper frequency, the antenna induces a surface acoustic wave in the material 53 which can be lithium niobate, quartz, zinc oxide, or other appropriate piezoelectric material. As the wave passes through a pressure sensing area 54 formed on the material 53, its velocity is changed depending on the air pressure exerted on the sensing area 54. The wave is then reflected by reflectors 55 where it returns to the IDT 51 and to the antenna 52 for retransmission back to the interrogator. The material in the pressure sensing area 54 can be a thin (such as one micron) coating of a polymer that absorbs or reversibly reacts with oxygen or nitrogen where the amount absorbed depends on the air density.

Figure 16A:
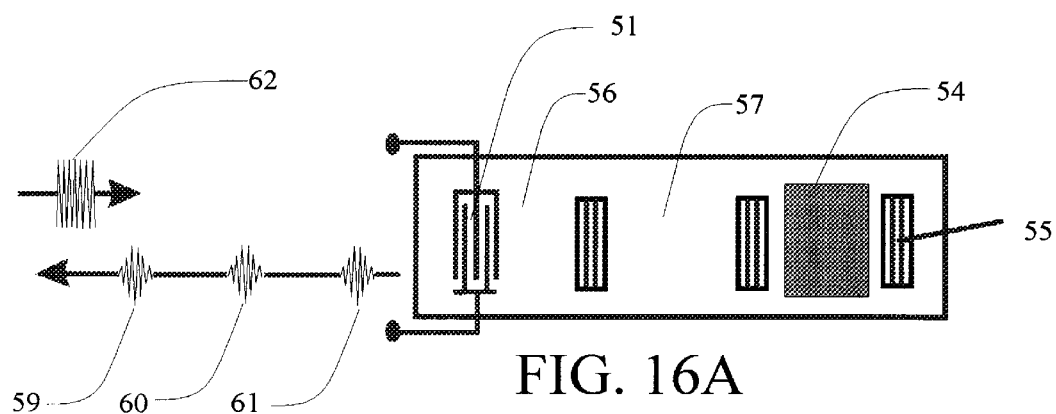
FIG. 16A is a view of a SAW temperature and pressure monitor on a single SAW device.

In FIG. 16A, two additional sections of the SAW device, designated 56 and 57, are provided such that the air pressure affects sections 56 and 57 differently than pressure sensing area 54. This is achieved by providing three reflectors. The three reflecting areas cause three reflected waves to appear, 59, 60 and 61 when input wave 62 is provided. The spacing between waves 59 and 60, and between waves 60 and 61 provides a measure of the pressure. This construction of a pressure sensor may be utilized in the embodiments of FIGS. 13A–15 or in any embodiment wherein a pressure measurement by a SAW device is obtained.

Figure 16B:
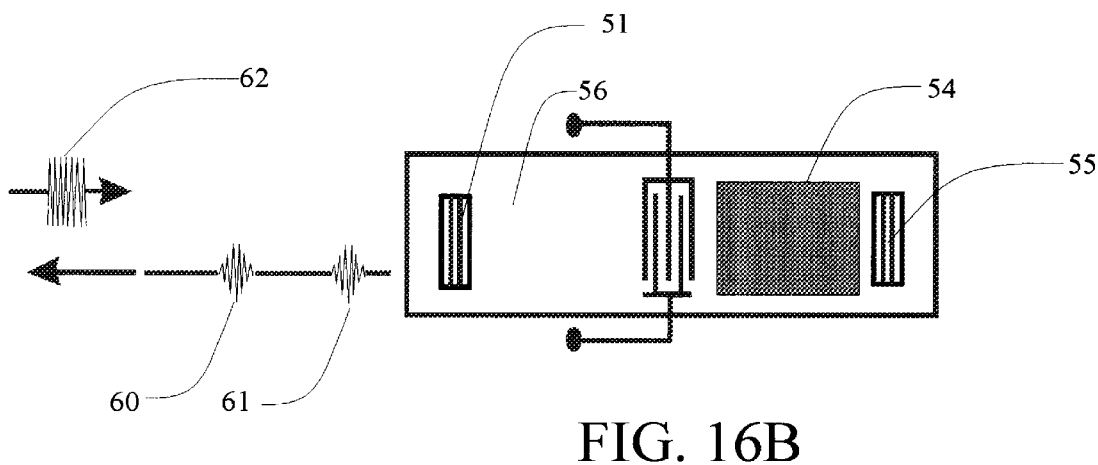
FIG. 16B is a view of an alternate design of a SAW temperature and pressure monitor on a single SAW device.

There are many other ways in which the pressure can be measured based on either the time between reflections or on the frequency or phase change of the SAW device as is well known to those skilled in the art. FIG. 16B, for example, illustrates an alternate SAW geometry where only two sections are required to measure both temperature and pressure. This construction of a temperature and pressure sensor may be utilized in the embodiments of FIGS. 13A–15 or in any embodiment wherein both a pressure measurement and a temperature measurement by a single SAW device is obtained.

Another method where the speed of sound on a piezoelectric material can be changed by pressure was first reported in Varadan et al., "Local/Global SAW Sensors for Turbulence" referenced above. This, phenomenon has not been applied to solving pressure sensing problems within an automobile until now. The instant invention is believed to be the first application of this principle to measuring tire pressure, oil pressure, coolant pressure, pressure in a gas tank, etc. Experiments to date, however, have been unsuccessful.

In some cases, a flexible membrane is placed loosely over the SAW device to prevent contaminants from affecting the SAW surface. The flexible membrane permits the pressure to be transferred to the SAW device without subjecting the surface to contaminants. Such a flexible membrane can be used in most if not all of the embodiments described herein.

Figure 17B:
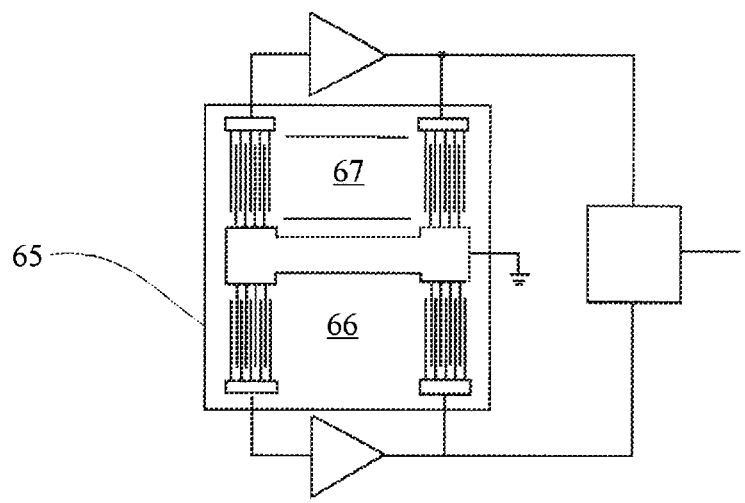
FIG. 17B is a top view of an alternate SAW device capable of determining two physical or chemical properties such as pressure and temperature.
Figure 17A:
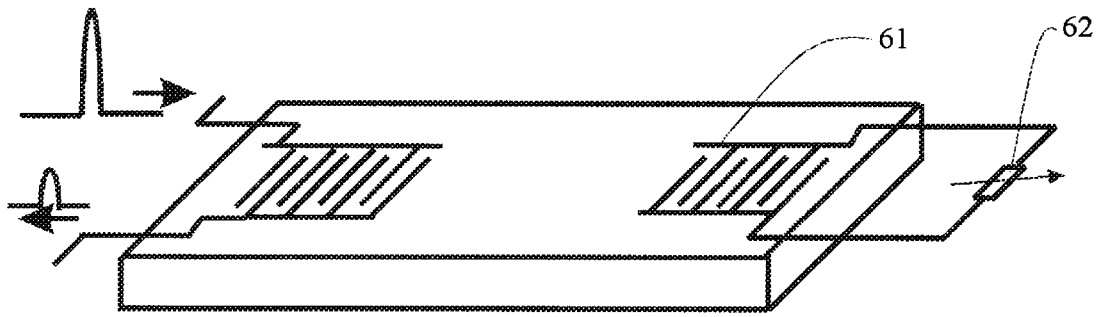
FIG. 17A is a perspective view of a device that can provide two measurements of temperature or one of temperature and another of some other physical or chemical property such as pressure or chemical concentration.
Figure 17:
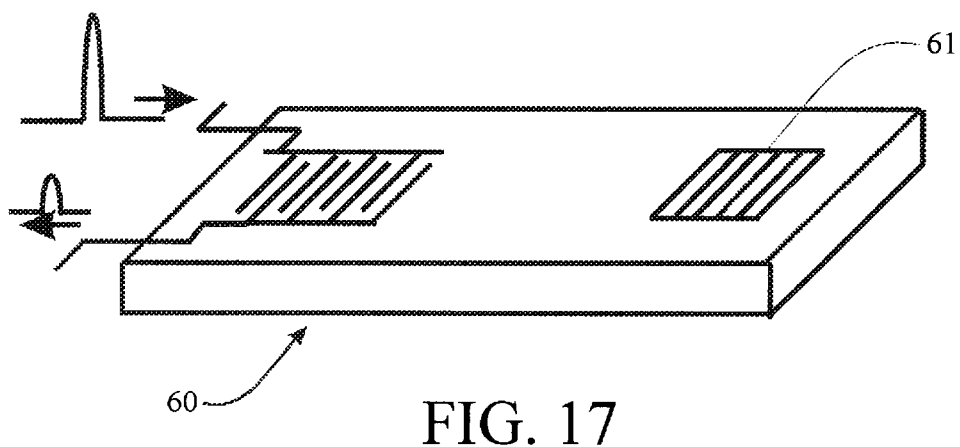
FIG. 17 is a perspective view of a SAW temperature sensor.

A SAW temperature sensor 60 is illustrated in FIG. 17. Since the SAW material, such as lithium niobate, expands significantly with temperature, the natural frequency of the device also changes. Thus, for a SAW temperature sensor to operate, a material for the substrate is selected which changes its properties as a function of temperature, i.e., expands. Similarly, the time delay between the insertion and retransmission of the signal also varies measurably. Since speed of a surface wave is typically 100,000 times slower then the speed of light, usually the time for the electromagnetic wave to travel to the SAW device and back is small in comparison to the time delay of the SAW wave and therefore the temperature is approximately the time delay between transmitting electromagnetic wave and its reception.

An alternate approach as illustrated in FIG. 17A is to place a thermistor 62 across an interdigital transducer (IDT) 61, which is now not shorted as it was in FIG. 17. In this case, the magnitude of the returned pulse varies with the temperature. Thus, this device can be used to obtain two independent temperature measurements, one based on time delay or natural frequency of the device 60 and the other based on the resistance of the thermistor 62.

When some other property such as pressure is being measured by the device 65 as shown in FIG. 17B, two parallel SAW devices are commonly used. These devices are designed so that they respond differently to one of the parameters to be measured. Thus, SAW device 66 and SAW device 67 can be designed to both respond to temperature and respond to pressure. However, SAW device 67, which contains a surface coating, will respond differently to pressure than SAW device 66. Thus, by measuring natural frequency or the time delay of pulses inserted into both SAW devices 66 and 67, a determination can be made of both the pressure and temperature, for example. Naturally, the device which is rendered sensitive to pressure in the above discussion could alternately be rendered sensitive to some other property such as the presence or concentration of a gas, vapor, or liquid chemical as described in more detail below.

Figure 18A:
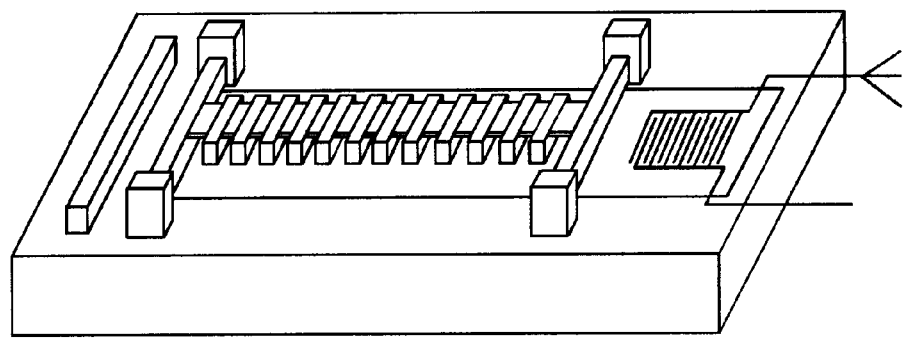
FIGS. 18 and 18A are views of a prior art SAW accelerometer that can be used for the tire monitor assembly of FIG. 15.
Figure 18:
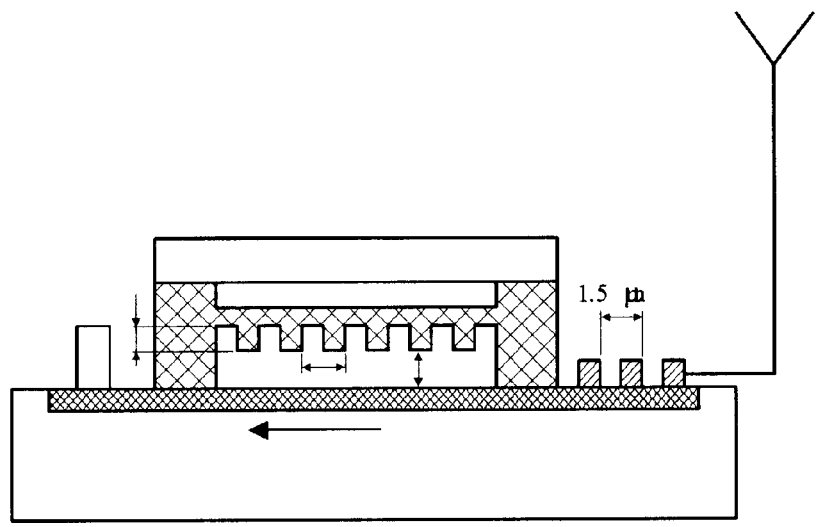

An accelerometer that can be used for either radial or tangential acceleration in the tire monitor assembly of FIG. 15 is illustrated in FIGS. 18 and 18A. The design of this accelerometer is explained in detail in Varadan, V. K. et al., "Fabrication, characterization and testing of wireless MEMS-IDT based microaccelerometers" referenced above, which is incorporated in its entirety herein by reference, and will not be repeated herein.

Figure 19A:
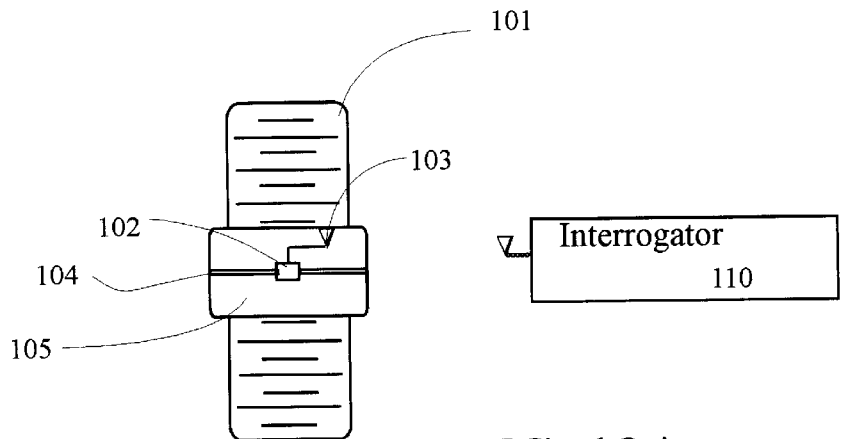
FIGS. 19A, 19B, 19C, 19D and 19E are views of occupant seat weight sensors using a slot spanning SAW strain gage and other strain concentrating designs.

A stud which is threaded on both ends and which can be used to measure the weight of an occupant seat is illustrated in FIGS. 19A–19D. The operation of this device is disclosed in U.S. patent application Ser. No. 09/849,558 wherein the center section of stud 101 is solid. It has been discovered that sensitivity of the device can be significantly improved if a slotted member is used as described in U.S. Pat. No. 5,539,236, which is incorporated herein by reference. FIG. 19A illustrates a SAW strain gage 102 mounted on a substrate and attached to span a slot 104 in a center section 105 of the stud 101. This technique can be used with any other strain-measuring device.

Figure 19B:
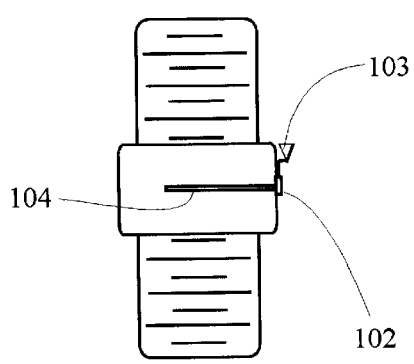

FIG. 19B is a side view of the device of FIG. 19A.

Figure 19C:
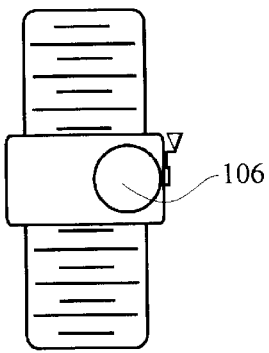

FIG. 19C illustrates use of a single hole 106 drilled off-center in the center section 105 of the stud 101. A single hole 106 also serves to magnify the strain as sensed by the strain gage 102. It has the advantage in that strain gage 102 does not need to span an open space. The amount of magnification obtained from this design, however, is significantly less than obtained with the design of FIG. 19A.

Figure 19D:
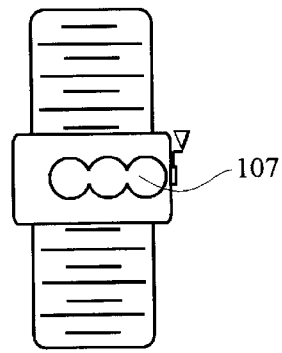
Figure 19E:
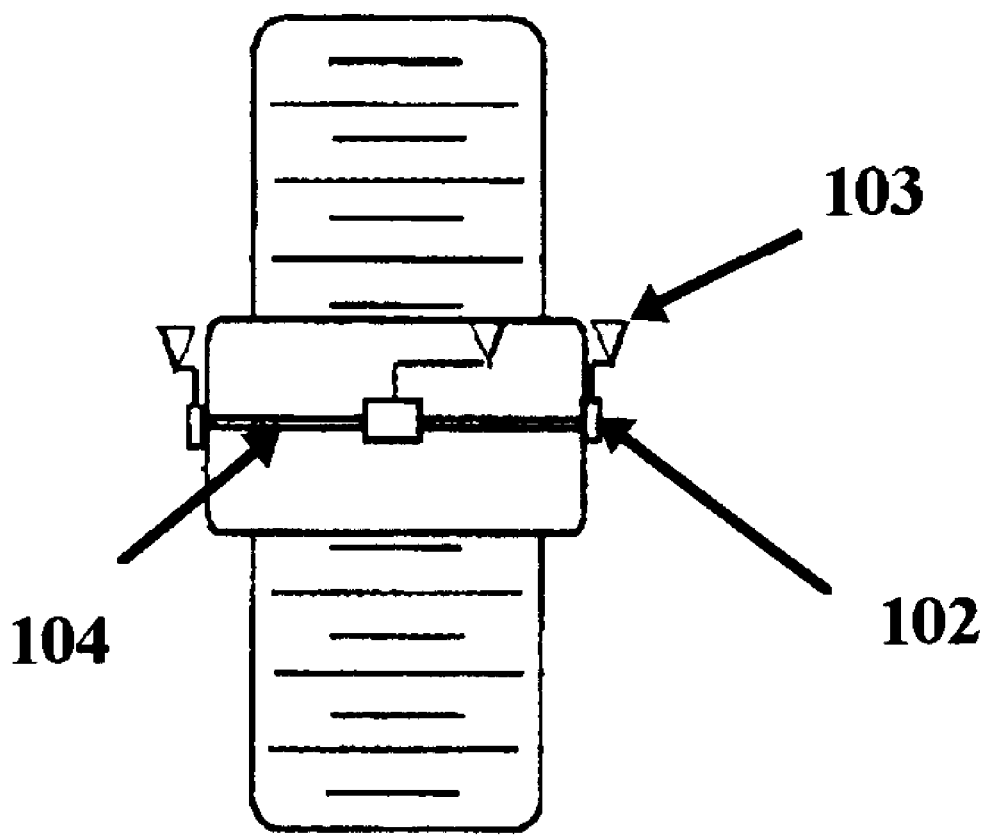

To improve the sensitivity of the device shown in FIG. 19C, multiple smaller holes 107 can be used as illustrated in FIG. 19D. FIG. 19E in an alternate configuration showing four gages for determining the bending moments as well as the axial stress in the support member.

In operation, the SAW strain gage 102 receives radio frequency waves from an interrogator 110 and returns electromagnetic waves via a respective antenna 103 which are delayed based on the strain sensed by strain gage 102.

Figure 20A:
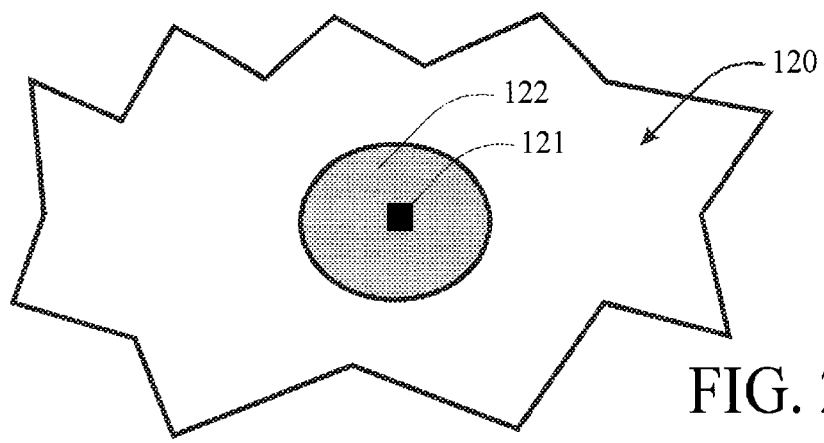
FIG. 20A is a view of a view of a SAW switch sensor for mounting on or within a surface such as a vehicle armrest.
Figure 20B:
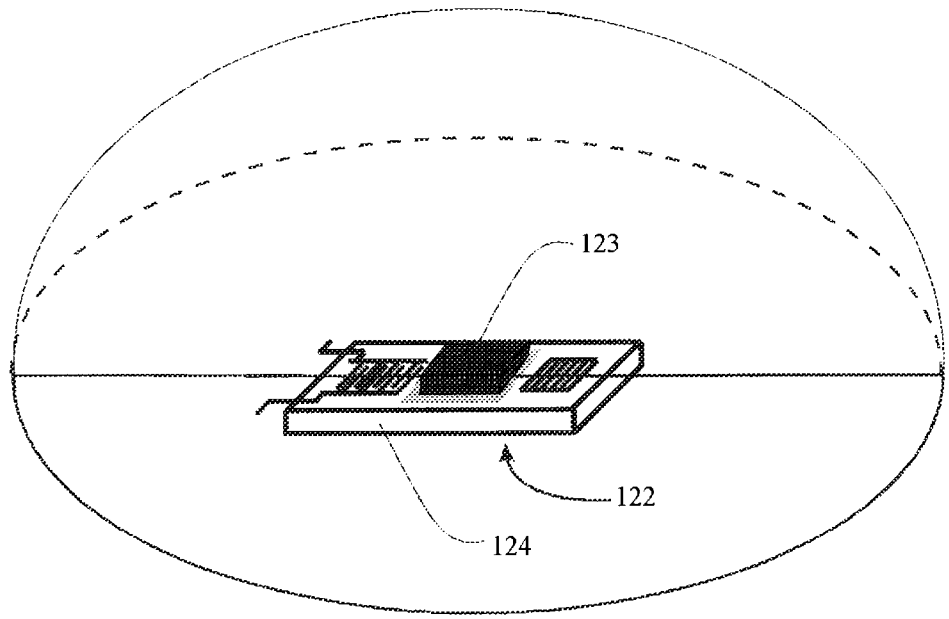
FIG. 20B is a detailed perspective view of the device of FIG. 20A with the force-transmitting member rendered transparent.

A SAW device can also be used as a wireless switch as shown in FIGS. 20A and 20B. FIG. 20A shows a surface 120 containing a projection 122 on top of a SAW device 121. Surface material 120 could be, for example, the armrest of an automobile, the steering wheel airbag cover, or any other surface within the passenger compartment of an automobile or elsewhere. Projection 122 will typically be a material capable of transmitting force to the surface of SAW device 121. As shown in FIG. 20B, a projection 123 may be placed on top of the SAW device 124. This projection 123 permits force exerted on the projection 122 to create a pressure on the SAW device 124. This increased pressure changes the time delay or natural frequency of the SAW wave traveling on the surface of material. Alternately, it can affect the magnitude of the returned signal. The projection 123 is typically held slightly out of contact with the surface until forced into contact with it.

Figure 20C:
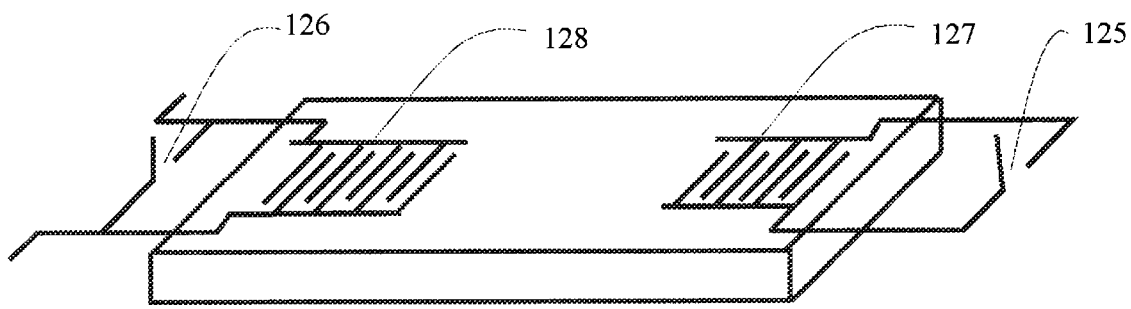
FIG. 20C is a detailed perspective view of an alternate SAW device for use in FIGS. 20A and 20B showing the use of one of two possible switches, one that activates the SAW and the other that suppresses the SAW.

An alternate approach is to place a switch across the IDT 127 as shown in FIG. 20C. If switch 125 is open, then the device will not return a signal to the interrogator. If it is closed, than the IDT 127 will act as a reflector sending a single back to IDT 128 and thus to the interrogator. Alternately, a switch 126 can be placed across the SAW device. In this case, a switch closure shorts the SAW device and no signal is returned to the interrogator. For the embodiment of FIG. 20C, using switch 126 instead of switch 125, a standard reflector IDT would be used in place of the IDT 127.

Figure 21A:
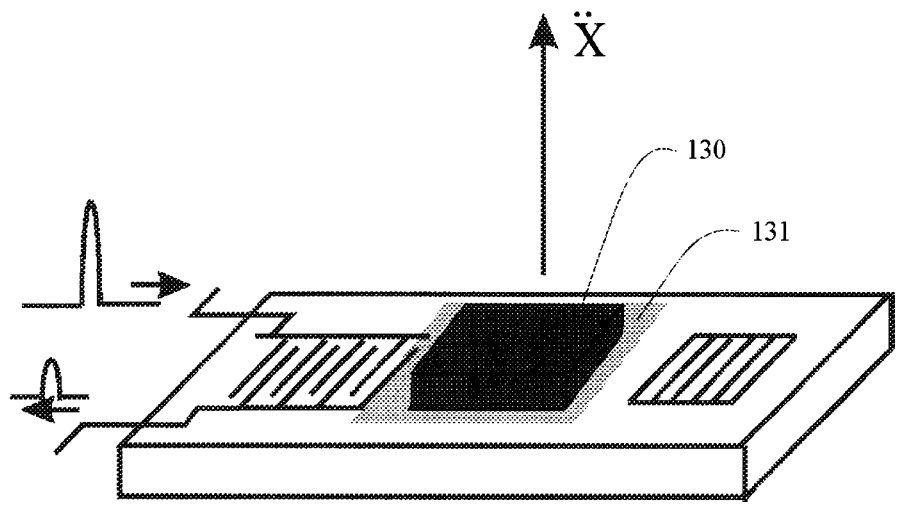
FIG. 21A is a detailed perspective view of a polymer and mass on SAW accelerometer for use in crash sensors, vehicle navigation, etc.
Figure 21B:
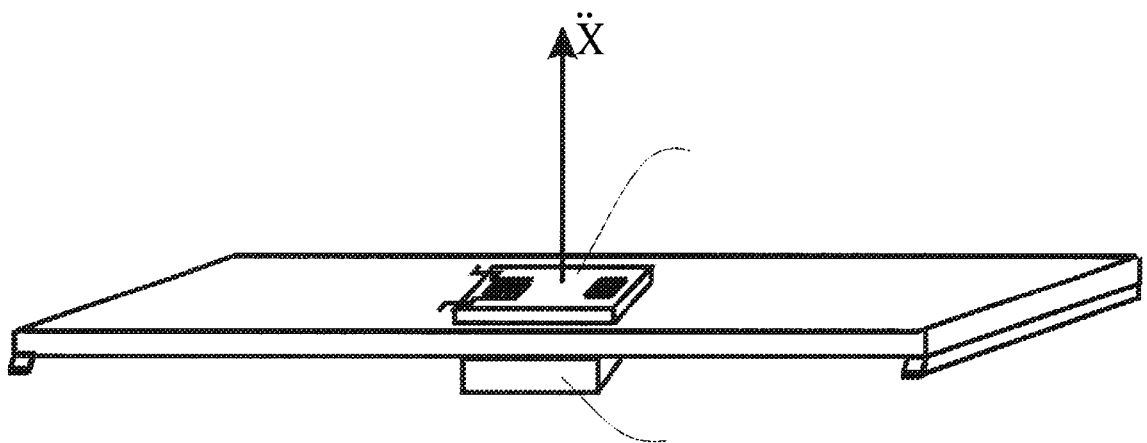
FIG. 21B is a detailed perspective view of a normal mass on SAW accelerometer for use in crash sensors, vehicle navigation, etc.

Most SAW-based accelerometers work on the principle of straining the SAW surface and thereby changing either the time delay or natural frequency of the system. An alternate novel accelerometer is illustrated FIG. 21A wherein a mass 130 is attached to a silicone rubber coating 131 which has been applied the SAW device. Acceleration of the mass in FIG. 21 in the direction of arrow X changes the amount of rubber in contact with the surface of the SAW device and thereby changes the damping, natural frequency or the time delay of the device. By this method, accurate measurements of acceleration below 1 G are readily obtained. Furthermore, this device can withstand high deceleration shocks without damage. FIG. 21B illustrates a more conventional approach where the strain in a beam 137 caused by the acceleration acting on a mass 136 is measured with a SAW strain sensor 135.

It is important to note that all of these devices have a high dynamic range compared with most competitive technologies. In some cases, this dynamic range can exceed 100,000.

This is the direct result of the ease with which frequency and phase can be accurately measured.

Figure 22:
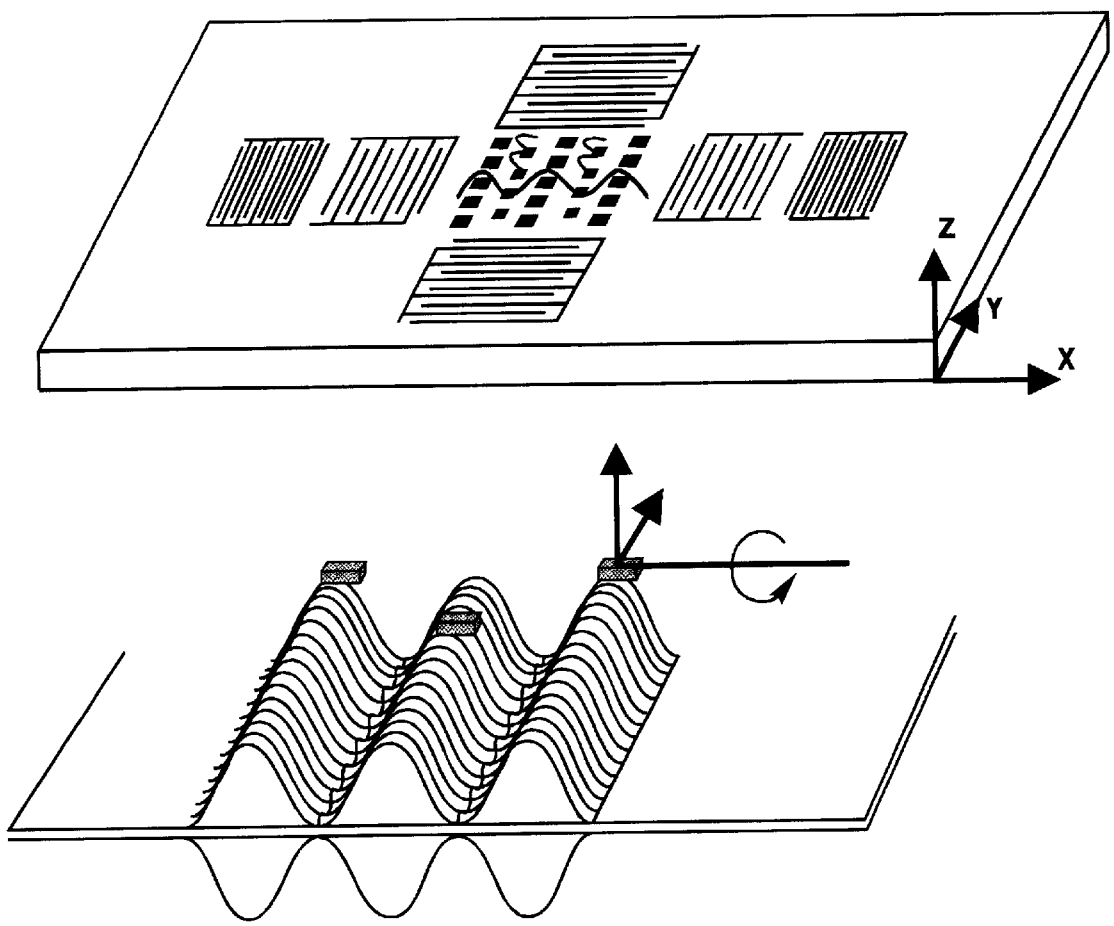
FIG. 22 is a view of a prior art SAW gyroscope that can be used with this invention.

A gyroscope, which is suitable for automotive applications, is illustrated in FIG. 22 and described in detail in V. K. Varadan's International Application No. WO 00/79217, which is incorporated by reference herein in its entirety. This SAW-based gyroscope has applicability for the vehicle navigation, dynamic control, and rollover sensing among others.

Figure 23A:
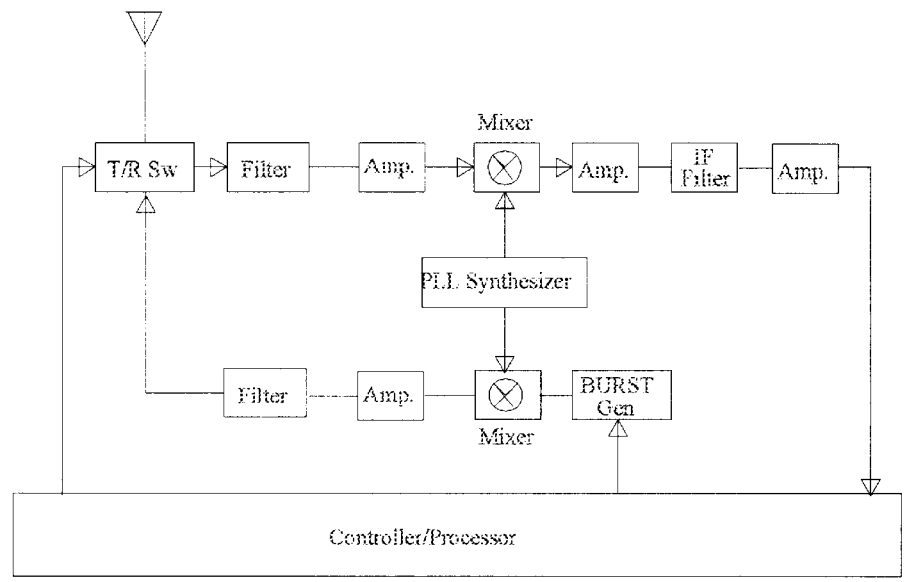
FIGS. 23A, 23B and 23C are a block diagrams of three interrogators that can be used with this invention to interrogate several different devices.
Figure 23B:
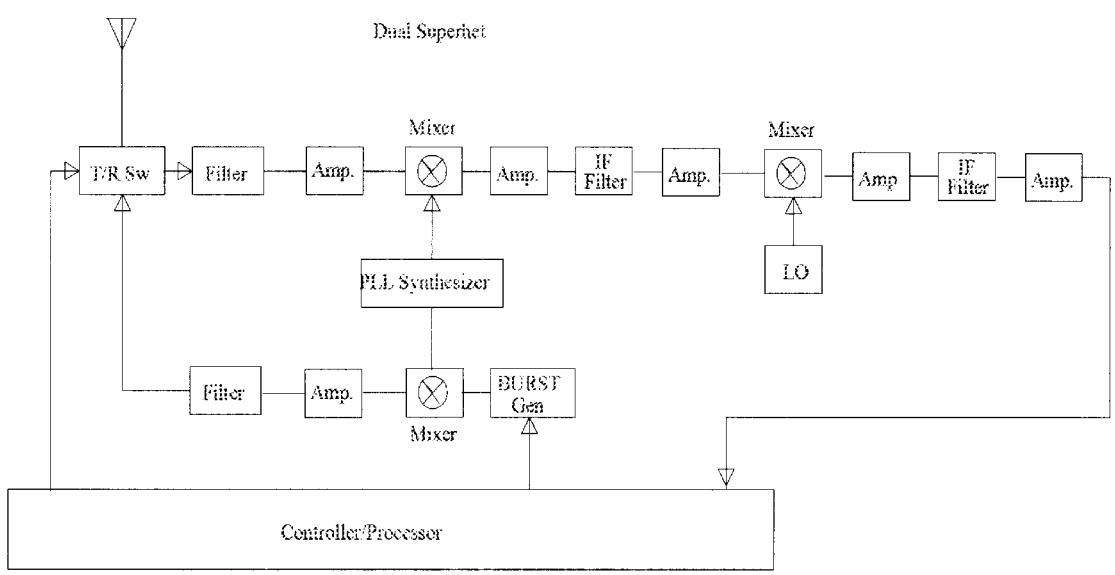
Figure 23C:
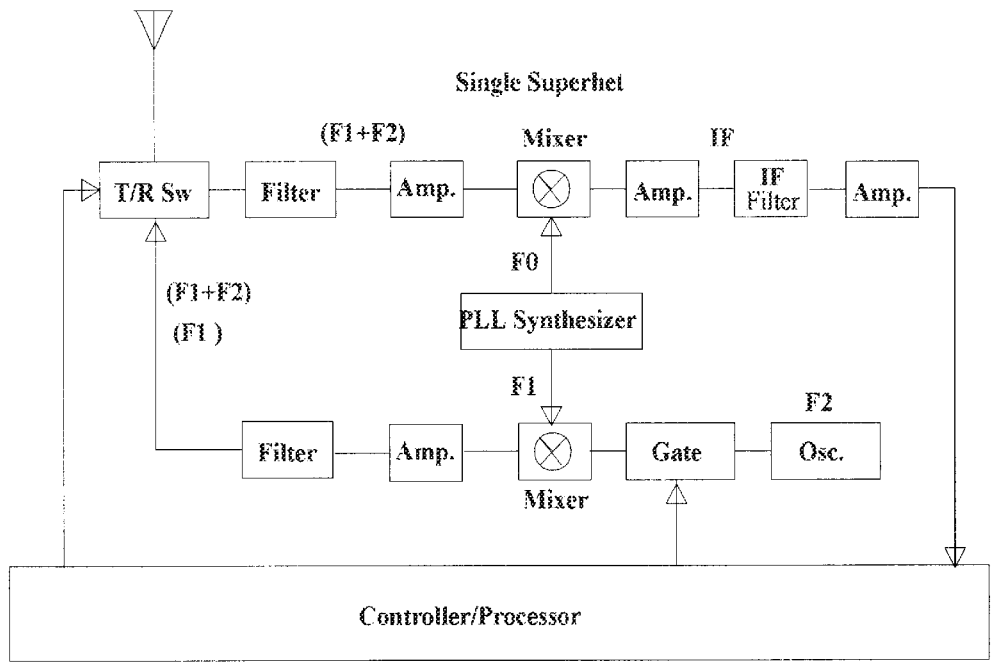
Figure 23C:
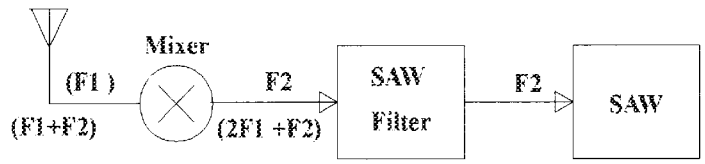
Figure 23C:
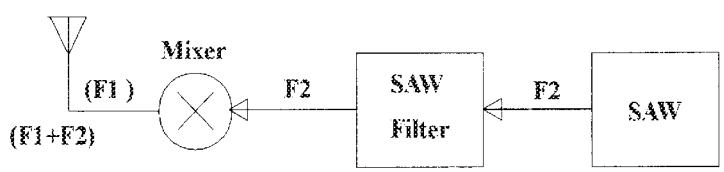
Figure 23C:
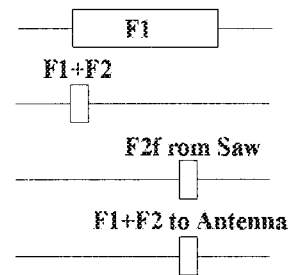

Note that any of the disclosed applications can be interrogated by the central interrogator of this invention and can either be powered or operated powerlessly as described in general above. Block diagrams of three interrogators suitable for use in this invention are illustrated in FIGS. 23A–23C. FIG. 23A illustrates a superheterodyne circuit and FIG. 23B illustrates a dual superheterodyne circuit. FIG. 23C operates as follows. During the burst time two frequencies, F1 and F1+F2, are sent by the transmitter after being generated by mixing using oscillator Osc. The two frequencies are needed by the SAW transducer where they are mixed yielding F2 which is modulated by the SAW and contains the information. Frequency (F1+F2) is sent only during the burst time while frequency F1 remains on until the signal F2 returns from the SAW. This signal is used for mixing. The signal returned from the SAW transducer to the interrogator is F1+F2 where F2 has been modulated by the SAW transducer. It is expected that the mixing operations will result in about 12 db loss in signal strength.

Figure 24:
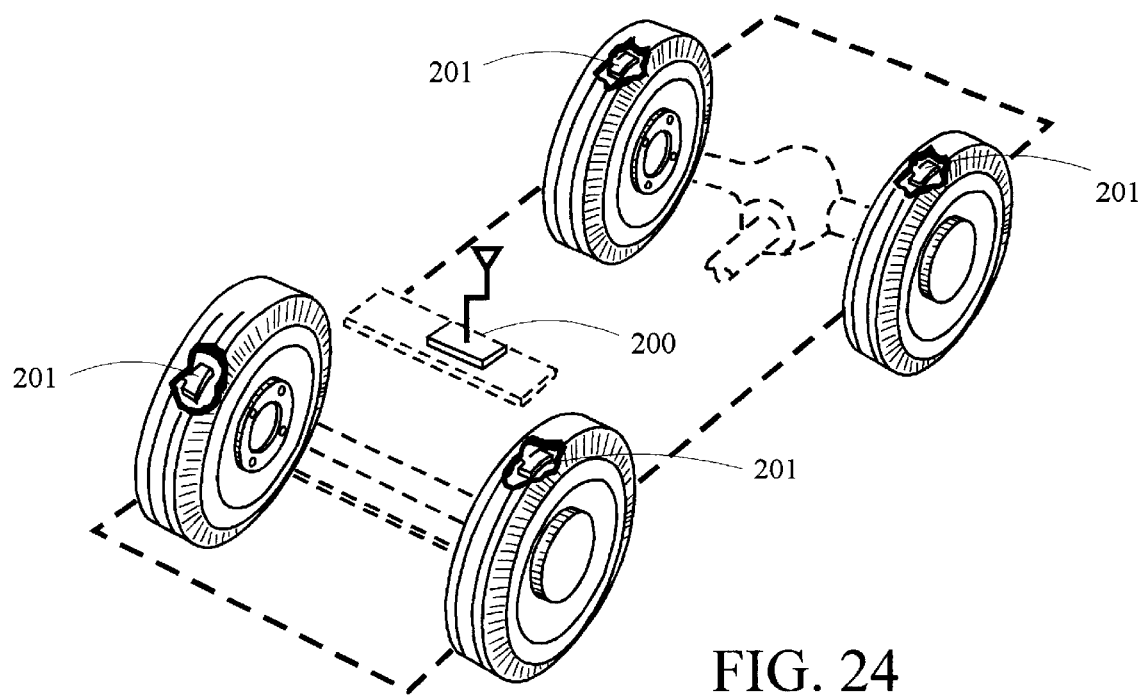
FIG. 24 is a perspective view of a SAW antenna system adapted for mounting underneath a vehicle and for communicating with the four mounted tires.

FIG. 24 illustrates a central antenna mounting arrangement for permitting interrogation of the tire monitors for four tires and is similar to that described in U.S. Pat. No. 4,237,728, which is incorporated by reference herein. An antenna package 200 is mounted on the underside of the vehicle and communicates with devices 201 through their antennas as described above. In order to provide for antennas both inside (for example for weight sensor interrogation) and outside of the vehicle, another antenna assembly (not shown) can be mounted on the opposite side of the vehicle floor from the antenna assembly 200.

Figure 24A:
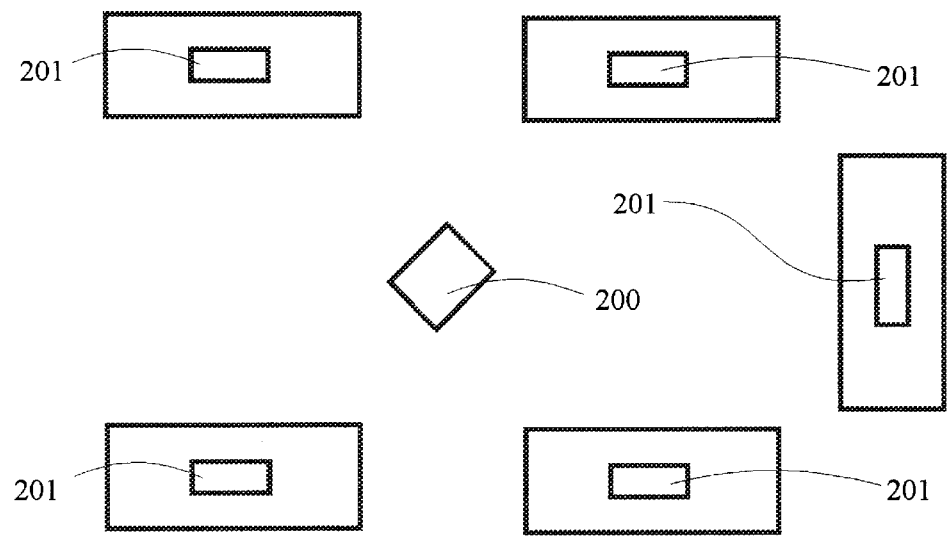
FIG. 24A is a detail view of an antenna system for use in the system of FIG. 24.

FIG. 24A is a schematic of the vehicle shown in FIG. 24. The antenna package 200, which can be considered as an electronics module, contains a time domain multiplexed antenna array that sends and receives data from each of the five tires (including the spare tire), one at a time. It comprises a microstrip or stripline antenna array and a microprocessor on the circuit board The antennas that face each tire are in an X configuration so that the transmissions to and from the tire can be accomplished regardless of the tire rotation angle.

Figure 25:
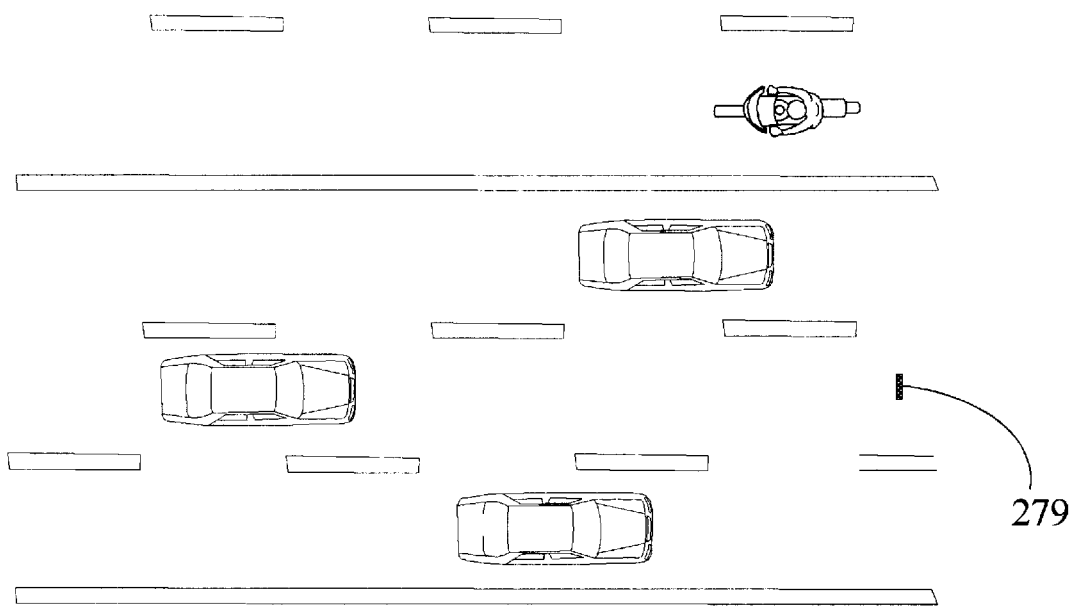
FIG. 25 is an overhead view of a roadway with vehicles and a SAW road temperature and humidity monitoring sensor.
Figure 25A:
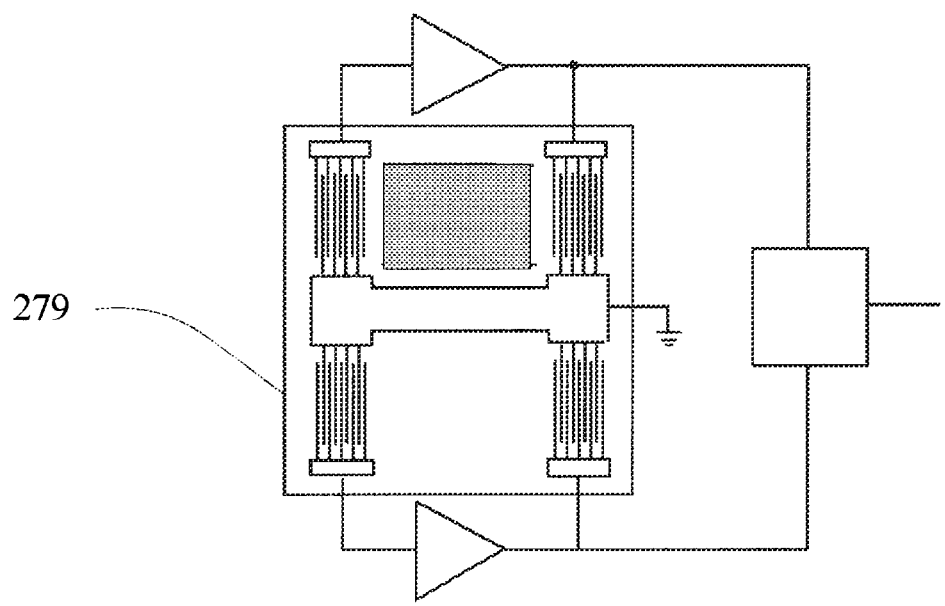
FIG. 25A is a detail drawing of the monitoring sensor of FIG. 25.

Based on the frequency and power available, and on FCC limitations, SAW devices can be designed to permit transmission distances of up to 100 feet or more. Since SAW devices can measure both temperature and humidity, they are also capable of monitoring road conditions in front of and around a vehicle. Thus, a properly equipped vehicle can determine the road conditions prior to entering a particular road section if such SAW devices are embedded in the road surface or on mounting structures close to the road surface as shown at 279 in FIG. 25. Such devices could provide advance warning of freezing conditions, for example. Although at 60 miles per hour, such devices may only provide a one second warning, this can be sufficient to provide information to a driver to prevent dangerous skidding. Additionally, since the actual temperature and humidity can be reported, the driver will be warned prior to freezing of the road surface. SAW device 279 is shown in detail in FIG. 25A.

Figure 26:
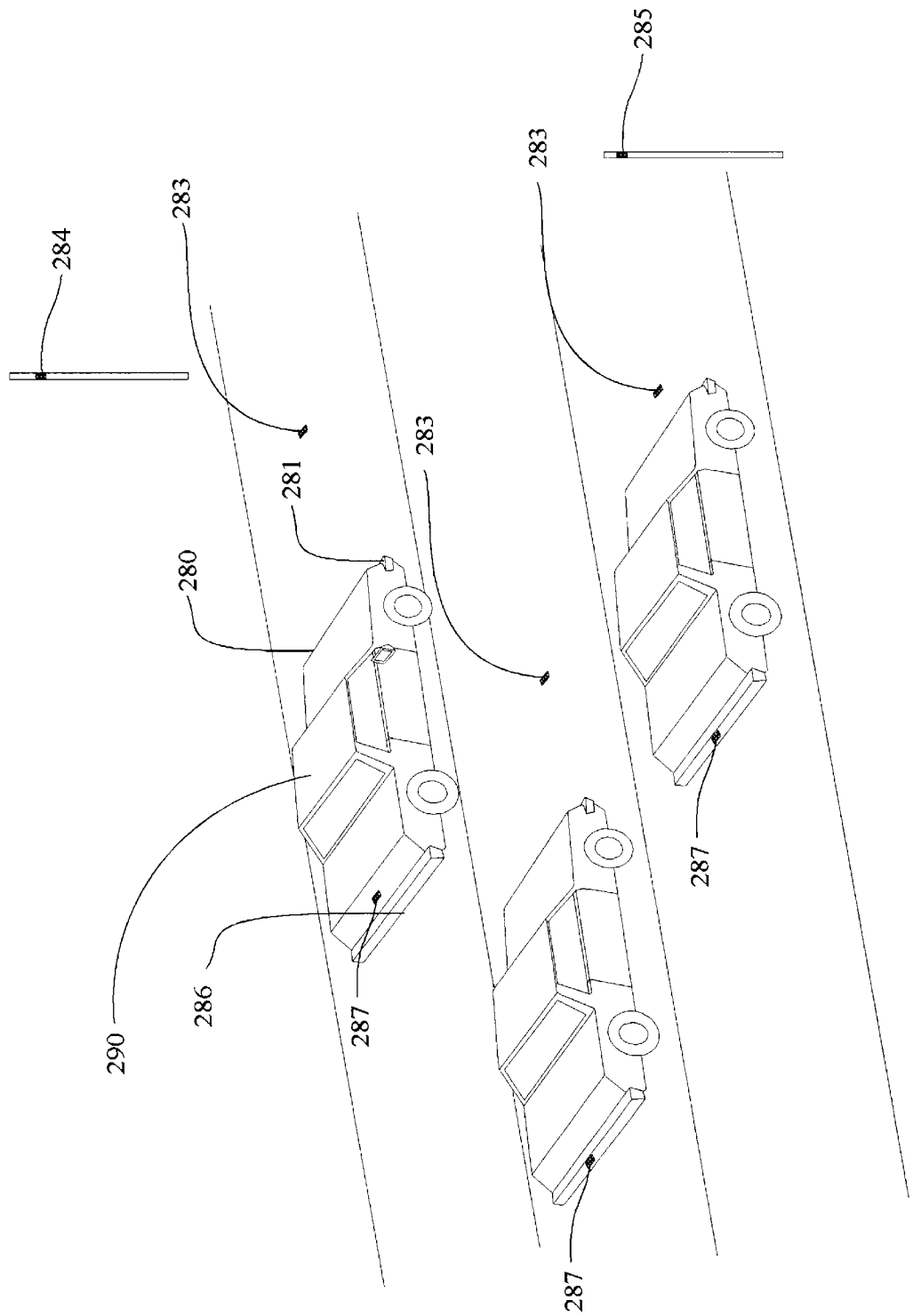
FIG. 26 is a perspective view of a SAW system for locating a vehicle on a roadway, and on the earth surface if accurate maps are available. It also illustrates the use of a SAW transponder in the license plate for the location of preceding vehicles and preventing rear end impacts.

If a SAW device 283 is placed in a roadway, as illustrated in FIG. 26, and if a vehicle 290 has two receiving antennas 280 and 281, an interrogator can transmit a signal from either of the two antennas and at a later time, the two antennas will receive the transmitted signal from the SAW device. By comparing the arrival time of the two received pulses, the position of vehicle on a lane can precisely determined (since the direction from each antenna 280,281 to the SAW device 283 can be calculated). If the SAW device 283 has an identification code encoded into the returned signal generated thereby, then the vehicle 290 can determine, providing a precise map is available, its position on the surface of the earth. If another antenna 286 is provided, for example, at the rear of the vehicle 290 then the longitudinal position of the vehicle can also be accurately determined as the vehicle passes the SAW device 283. Of course the SAW device 283 need not be in the center of the road. Alternate locations for positioning of the SAW device 283 are on overpasses above the road and on poles such as 284 and 285 on the roadside. Such a system has an advantage over a competing system using radar and reflectors in that it is easier to measure the relative time between the two received pulses than it is to measure time of flight of a radar signal to a reflector and back. Such a system operates in all weather conditions and is known as a precise location system. Eventually such a SAW device 283 can be placed every tenth of a mile along the roadway or at some other appropriate spacing.

If a vehicle is being guided by a DGPS and accurate map system such as disclosed in U.S. Pat. application Ser. No. 09/679,317 filed Oct. 4, 2000, which is incorporated by reference herein, a problem arises when the GPS receiver system looses satellite lock as would happen when the vehicle enters a tunnel, for example. If a precise location system as described above is placed at the exit of the tunnel then the vehicle will know exactly where it is and can re-establish satellite lock in as little as one second rather than typically 15 seconds as might otherwise be required. Other methods making use of the cell phone system can be used to establish an approximate location of the vehicle suitable for rapid acquisition of satellite lock as described in G. M. Djuknic, R. E. Richton "Geolocation and Assisted GPS", Computer Magazine, February 2001, IEEE Computer Society, which is incorporated by reference herein in its entirety.

More particularly, geolocation technologies that rely exclusively on wireless networks such as time of arrival, time difference of arrival, angle of arrival, timing advance, and multipath fingerprinting offer a shorter time-to-first-fix (TTFF) than GPS. They also offer quick deployment and continuous tracking capability for navigation applications, without the added complexity and cost of upgrading or replacing any existing GPS receiver in vehicles. Compared to either mobile-station-based, stand-alone GPS or network-based geolocation, assisted-GPS (AGPS) technology offers superior accuracy, availability, and coverage at a reasonable cost. AGPS for use with vehicles would comprise a communications unit with a partial GPS receiver arranged in the vehicle, an AGPS server with a reference GPS receiver that can simultaneously "see" the same satellites as the communications unit, and a wireless network infrastructure consisting of base stations and a mobile switching center. The network can accurately predict the GPS signal the communication unit will receive and convey that information to the mobile, greatly reducing search space size and shortening the TTFF from minutes to a second or less. In addition, an AGPS receiver in the communication unit can detect and demodulate weaker signals than those that conventional GPS receivers require. Because the network performs the location calculations, the communication unit only needs to contain a scaled-down GPS receiver. It is accurate within about 15 meters when they are outdoors, an order of magnitude more sensitive than conventional GPS.

Since an AGPS server can obtain the vehicle's position from the mobile switching center, at least to the level of cell and sector, and at the same time monitor signals from GPS satellites seen by mobile stations, it can predict the signals received by the vehicle for any given time. Specifically, the server can predict the Doppler shift due to satellite motion of GPS signals received by the vehicle, as well as other signal parameters that are a function of the vehicle's location. In a typical sector, uncertainty in a satellite signal's predicted time of arrival at the vehicle is about ±5 ps, which corresponds to ±5 chips of the GPS coarse acquisition (C/A) code. Therefore, an AGPS server can predict the phase of the pseudorandom noise (PRN) sequence that the receiver should use to despread the C/A signal from a particular satellite—each GPS satellite transmits a unique PRN sequence used for range measurements—and communicate that prediction to the vehicle. The search space for the actual Doppler shift and PRN phase is thus greatly reduced, and the AGPS receiver can accomplish the task in a fraction of the time required by conventional GPS receivers. Further, the AGPS server maintains a connection with the vehicle receiver over the wireless link, so the requirement of asking the communication unit to make specific measurements, collect the results, and communicate them back is easily met. After despreading and some additional signal processing, an AGPS receiver returns back "pseudoranges" —that is, ranges measured without taking into account the discrepancy between satellite and receiver clocks—to the AGPS server, which then calculates the vehicle's location. The vehicle can even complete the location fix itself without returning any data to the server.

Sensitivity assistance, also known as modulation wipe-off, provides another enhancement to detection of GPS signals in the vehicle's receiver. The sensitivity-assistance message contains predicted data bits of the GPS navigation message, which are expected to modulate the GPS signal of specific satellites at specified times. The mobile station receiver can therefore remove bit modulation in the received GPS signal prior to coherent integration. By extending coherent integration beyond the 20-ms GPS data-bit period—to a second or more when the receiver is stationary and to 400 ms when it is fast-moving-this approach improves receiver sensitivity. Sensitivity assistance provides an additional 3-to-4-dB improvement in receiver sensitivity. Because some of the gain provided by the basic assistance— code phases and Doppler shift values—is lost when integrating the GPS receiver chain into a mobile system, this can prove crucial to making a practical receiver.

Achieving optimal performance of sensitivity assistance in TIA/EIA-95 CDMA systems is relatively straightforward because base stations and mobiles synchronize with GPS time. Given that global system for mobile communication (GSM), time division multiple access (TDMA), or advanced mobile phone service (AMPS) systems do not maintain such stringent synchronization, implementation of sensitivity assistance and AGPS technology in general will require novel approaches to satisfy the timing requirement. The standardized solution for GSM and TDMA adds time calibration receivers in the field—location measurement units— that can monitor both the wireless-system timing and GPS signals used as a timing reference.

Many factors affect the accuracy of geolocation technologies, especially terrain variations such as hilly versus flat and environmental differences such as urban versus suburban versus rural. Other factors, like cell size and interference, have smaller but noticeable effects. Hybrid approaches that use multiple geolocation technologies appear to be the most robust solution to problems of accuracy and coverage.

AGPS provides a natural fit for hybrid solutions because it uses the wireless network to supply assistance data to GPS receivers in vehicles. This feature makes it easy to augment the assistance-data message with low-accuracy distances from receiver to base stations measured by the network equipment. Such hybrid solutions benefit from the high density of base stations in dense urban environments, which are hostile to GPS signals. Conversely, rural environments— where base stations are too scarce for network-based solutions to achieve high accuracy—provide ideal operating conditions for AGPS because GPS works well there.

SAW transponders can also be placed in the license plates 287 (FIG. 26) of all vehicles at nominal cost. An appropriately equipped automobile can then determine the angular location of vehicles in its vicinity. If a third antenna 286 is placed at the center of the vehicle front, then an indication of the distance to a license plate of a preceding vehicle can also be obtained as described above. Thus, once again, a single interrogator coupled with multiple antenna systems can be used for many functions. Alternately, if more than one SAW transponders is placed spaced apart on a vehicle and if two antennas are on the other vehicle, then the direction and position of the SAW vehicle can be determined by the receiving vehicle.

Figure 27:
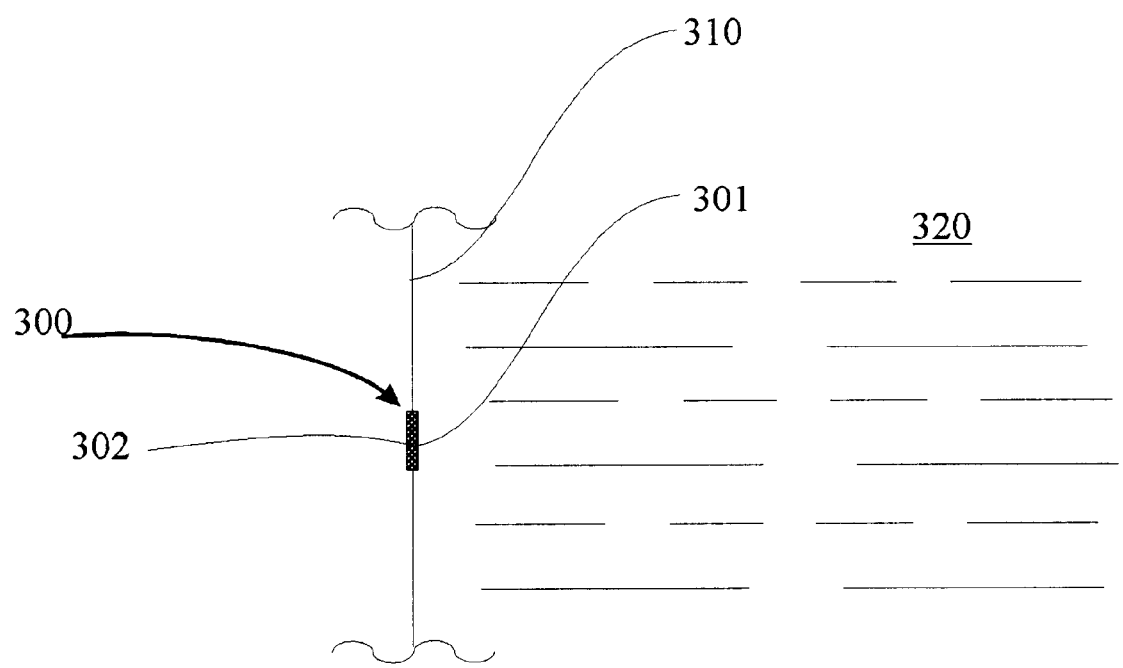
FIG. 27 is a partial cutaway view of a section of a fluid reservoir with a SAW fluid pressure and temperature sensor for monitoring oil, water, or other fluid pressure.

A general SAW temperature and pressure gage which can be wireless and powerless is shown generally at 300 located in the sidewall 310 of a fluid container 320 in FIG. 27. A pressure sensor 301 is located on the inside of the container 320, where it measures deflection of the container wall, and the fluid temperature sensor 302 on the outside. The temperature measuring SAW 300 can be covered with an insulating material to avoid influence from the ambient temperature outside of the container 320.

Figure 28:
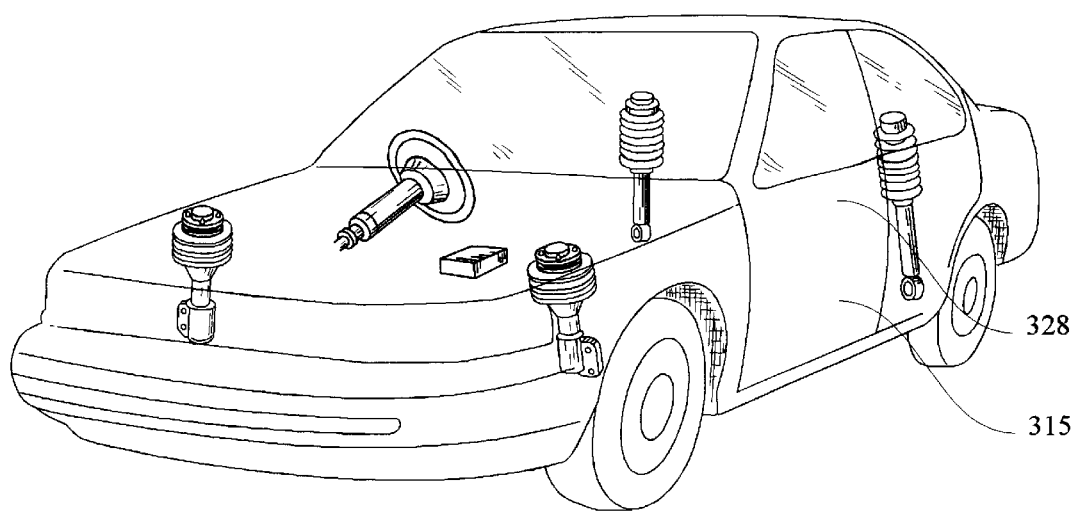
FIG. 28 is a perspective view of a vehicle suspension system with SAW load sensors.
Figures 28A, 28B:
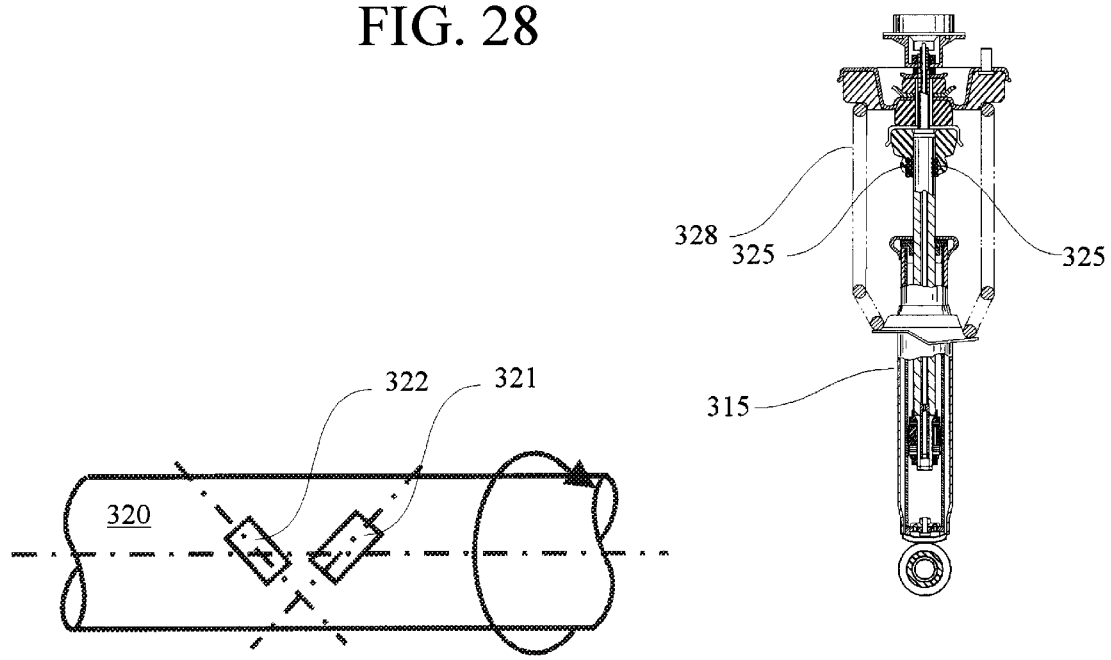
FIG. 28A is a cross section detail view of a vehicle spring and shock absorber system with a SAW torque sensor system mounted for measuring the stress in the vehicle spring of the suspension system of FIG. 28.
FIG. 28B is a detail view of a SAW torque sensor and shaft compression sensor arrangement for use with the arrangement of FIG. 28.

A SAW load sensor can also be used to measure load in the vehicle suspension system powerless and wirelessly as shown in FIG. 28. FIG. 28A illustrates a strut 315 such as either of the rear struts of the vehicle of FIG. 28. A coil spring 320 stresses in torsion as the vehicle encounters disturbances from the road and this torsion can be measured using SAW strain gages as described in U.S. Pat. No. 5,585,571 for measuring the torque in shafts. This concept is also disclosed in U.S. Pat. No. 5,714,695. The disclosures of both patents are incorporated herein by reference. The use of SAW strain gages to measure the torsional stresses in a spring, as shown in FIG. 28B, and in particular in an automobile suspension spring has, to the knowledge of the inventors, not been heretofore disclosed. In FIG. 28B, the strain measured by SAW strain gage 322 is subtracted from the strain measured by SAW strain gage 321 to get the temperature compensated strain in spring 320.

Since a portion of the dynamic load is also carried by the shock absorber, the SAW strain gages 321 and 322 will only measure the steady or average load on the vehicle. However, additional SAW strain gages 325 can be placed on a piston rod 326 of the shock absorber to obtain the dynamic load. These load measurements can then be used for active or passive vehicle damping or other stability control purposes.

Figure 29:
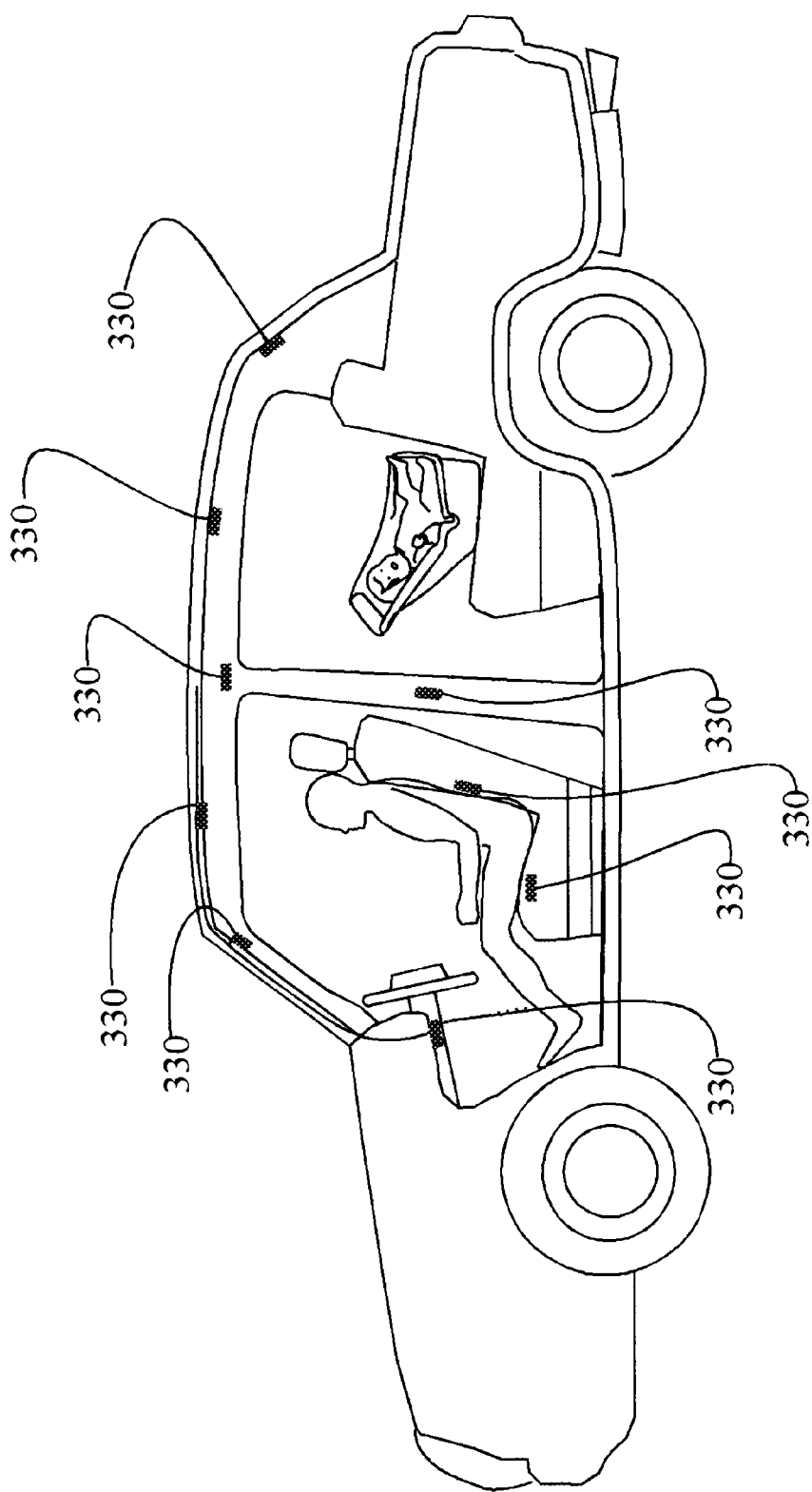
FIG. 29 is a cutaway view of a vehicle showing possible mounting locations for vehicle interior temperature, humidity, carbon dioxide, carbon monoxide, alcohol or other chemical or physical property measuring sensors.

FIG. 29 illustrates a vehicle passenger compartment, and the engine compartment, with multiple SAW temperature sensors 330. SAW temperature sensors are distributed throughout the passenger compartment, such as on the A-pillar, on the B-pillar, on the steering wheel, on the seat, on the ceiling, on the headliner, and on the rear glass and generally in the engine compartment. These sensors, which can be independently coded with different IDs and different delays, can provide an accurate measurement of the temperature distribution within the vehicle interior. Such a system can be used to tailor the heating and air conditioning system based on the temperature at a particular location in the passenger compartment. If this system is augmented with occupant sensors, then the temperature can be controlled based on seat occupancy and the temperature at that location. If the occupant sensor system is based on ultrasonics than the temperature measurement system can be used to correct the ultrasonic occupant sensor system for the speed of sound within the passenger compartment. Without such a correction, the error in the sensing system can be as large as about 20 percent.

In one case, the SAW temperature sensor can be made from PVDF film and incorporated within the ultrasonic transducer assembly. For the 40 kHz ultrasonic transducer case, for example, the SAW temperature sensor would return the several pulses sent to drive the ultrasonic transducer to the control circuitry using the same wires used to transmit the pulses to the transducer after a delay that is proportional to the temperature within the transducer housing. Thus a very economical device can add this temperature sensing function using much of the same hardware that is already present for the occupant sensing system. Since the frequency is low, PVDF could be fabricated into a very low cost temperature sensor for this purpose. Other piezoelectric materials could also be used.

Other sensors can be combined with the temperature sensors 330, or used separately, to measure carbon dioxide, carbon monoxide, alcohol, humidity or other desired chemicals as discussed above.

The SAW temperature sensors 330 provide the temperature at their mounting location to a processor unit 332 via an interrogator with the processor unit including appropriate control algorithms for controlling the heating and air conditioning system based on the detected temperatures. The processor unit can control, e.g., which vents in the vehicle are open and closed, the flow rate through vents and the temperature of air passing through the vents. In general, the processor unit can control whatever adjustable components are present or form part of the heating and air conditioning system.

As shown in FIG. 29, a child seat 334 is present on the rear vehicle seat. The child seat 334 can be fabricated with one or more RFID tags or SAW tags 336. The RFID tag(s) and SAW tag(s) can be constructed to provide information on the occupancy of the child seat, i.e., whether a child is present, based on the weight. Also, the mere transmission of waves from the RFID tag(s) or SAW tag(s) on the child seat would be indicative of the presence of a child seat. The RFID tag(s) and SAW tag(s) can also be constructed to provide information about the orientation of the child seat, i.e., whether it is facing rearward or forward. Such information about the presence and occupancy of the child seat and its orientation can be used in the control of vehicular systems, such as the vehicle airbag system. In this case, a processor would control the airbag system and would receive information from the RFID tag(s) and SAW tag(s) via an interrogator.

Figure 30A:
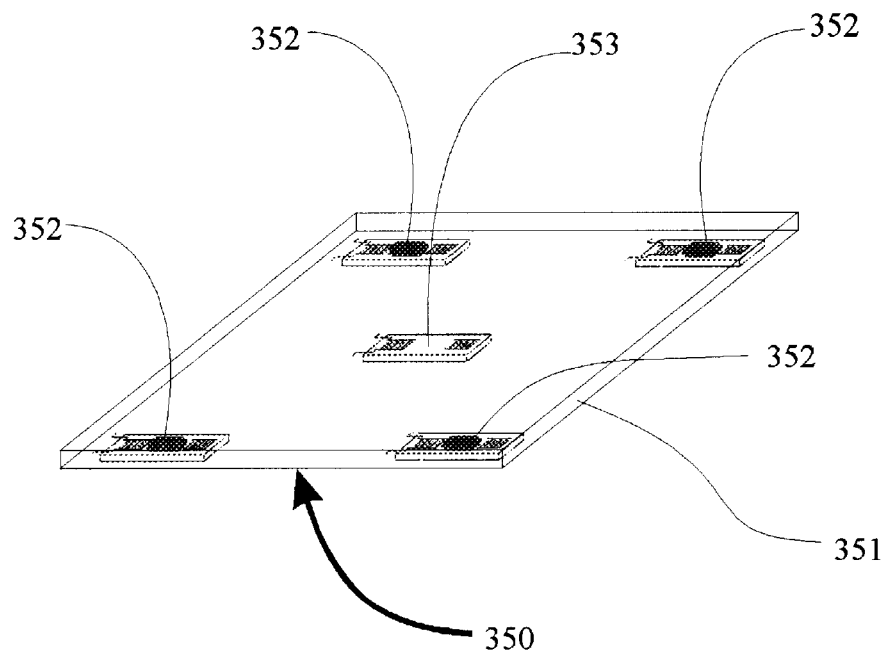
FIG. 30A is a perspective view of a SAW tilt sensor using four SAW assemblies for tilt measurement and one for temperature.
Figure 30B:
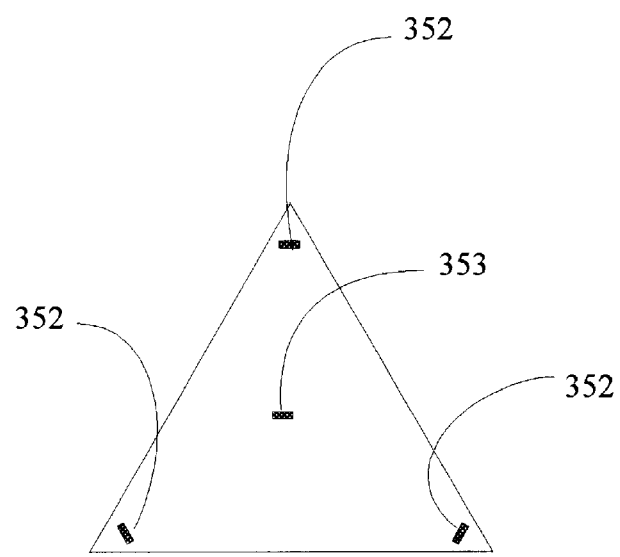
FIG. 30B is a top view of a SAW tilt sensor using three SAW assemblies for tilt measurement each one of which can also measure temperature.

There are many applications for which knowledge of the pitch and/or roll orientation of a vehicle or other object is desired. An accurate tilt sensor can be constructed using SAW devices. Such a sensor is illustrated in FIG. 30A and designated 350. This sensor 350 utilizes a substantially planar and rectangular mass 351 and four supporting SAW devices 352 which are sensitive to gravity. For example, the mass act to deflect a membrane on which the SAW device resides thereby straining the SAW device. Other properties can also be used for a tilt sensor such as the direction of the earth's magnetic field. SAW devices 352 are shown arranged at the corners of the planar mass 351, but it must be understood that this arrangement is a preferred embodiment only and not intended to limit the invention. A fifth SAW device 353 can be provided to measure temperature. By comparing the outputs of the four SAW devices 352, the pitch and roll of the automobile can be measured. This sensor 350 can be used to correct errors in the SAW rate gyros described above. If the vehicle has been stationary for a period of time, the yaw SAW rate gyro can initialized to 0 and the pitch and roll SAW gyros initialized to a value determined by the tilt sensor of FIG. 30A. Many other geometries of tilt sensors utilizing one or more SAW devices can now be envisioned for automotive and other applications. In particular, an alternate preferred configuration is illustrated in FIG. 30B where a triangular geometry is used. In this embodiment, the planar mass is triangular and the SAW devices 352 are arranged at the corners, although as with FIG. 30A, this is a non-limiting, preferred embodiment.

Figure 31:
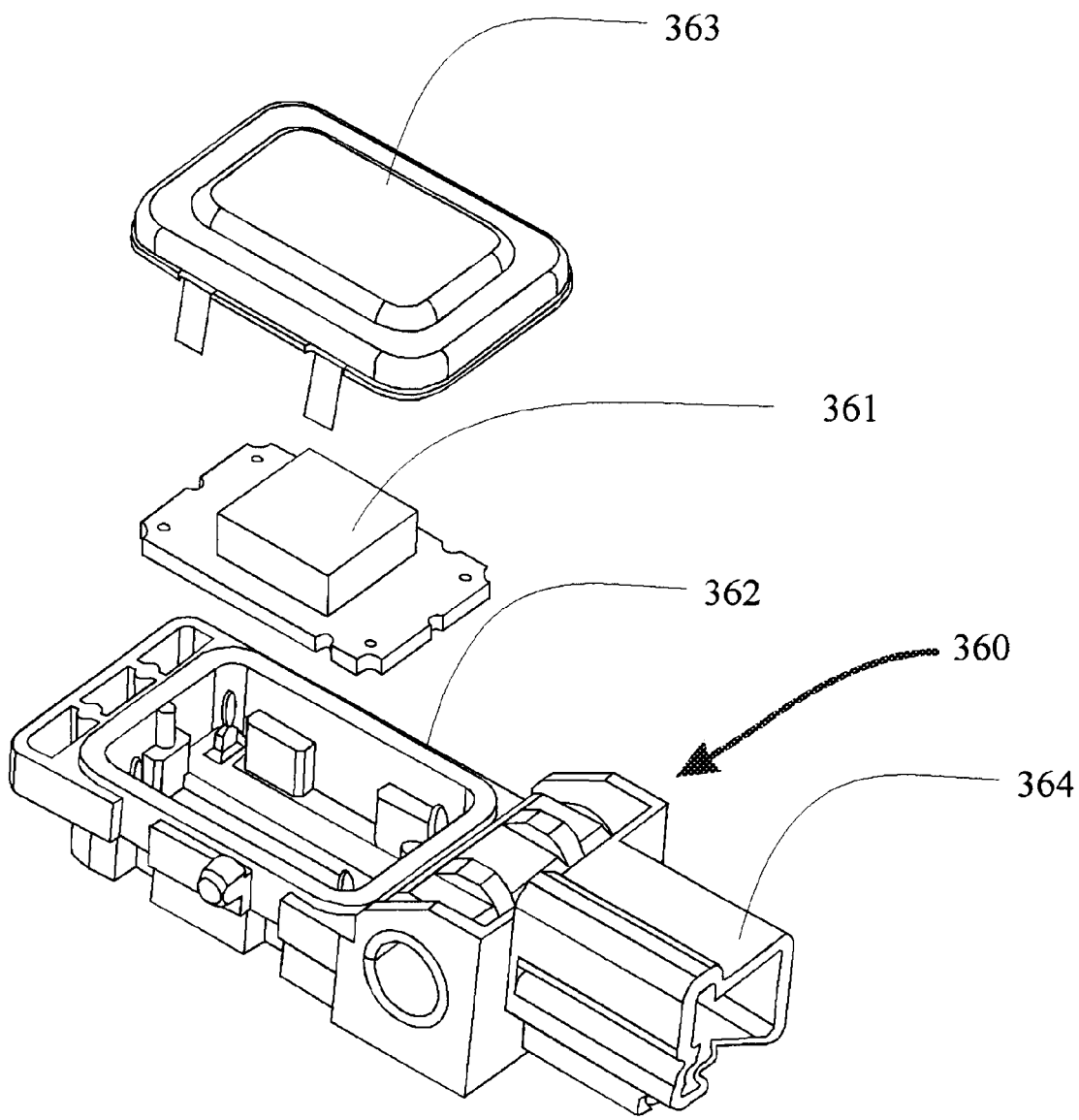
FIG. 31 is a perspective exploded view of a SAW crash sensor for sensing frontal, side or rear crashes.

Either of the SAW accelerometers described above can be utilized for crash sensors as shown in FIG. 31. These accelerometers have a substantially higher dynamic range than competing accelerometers now used for crash sensors such as those based on MEMS silicon springs and masses and others based on MEMS capacitive sensing. As discussed above, this is partially a result of the use of frequency or phase shifts which can be easily measured over a very wide range. Additionally, many conventional accelerometers that are designed for low acceleration ranges are unable to withstand high acceleration shocks without breaking. This places practical limitations on many accelerometer designs so that the stresses in the silicon springs are not excessive. Also for capacitive accelerometers, there is a narrow limit over which distance, and thus acceleration, can be measured.

The SAW accelerometer for this particular crash sensor design is housed in a container 361 which is assembled into a housing 362 and covered with a cover 363. This particular implementation shows a connector 364 indicating that this sensor would require power and the response would be provided through wires. Alternately, as discussed for other devices above, the connector 364 can be eliminated and the information and power to operate the device transmitted wirelessly. Such sensors can be used as frontal, side or rear impact sensors. They can be used in the crush zone, in the passenger compartment or any other appropriate vehicle location. If two such sensors are separated and have appropriate sensitive axes, then the angular acceleration of the vehicle can be also be determined. Thus, for example, forward-facing accelerometers mounted in the vehicle side doors can used to measure the yaw acceleration of the vehicle. Alternately two vertical sensitive axis accelerometers in the side doors can be used to measure the roll acceleration of vehicle, which would be useful for rollover sensing.

Figure 32:
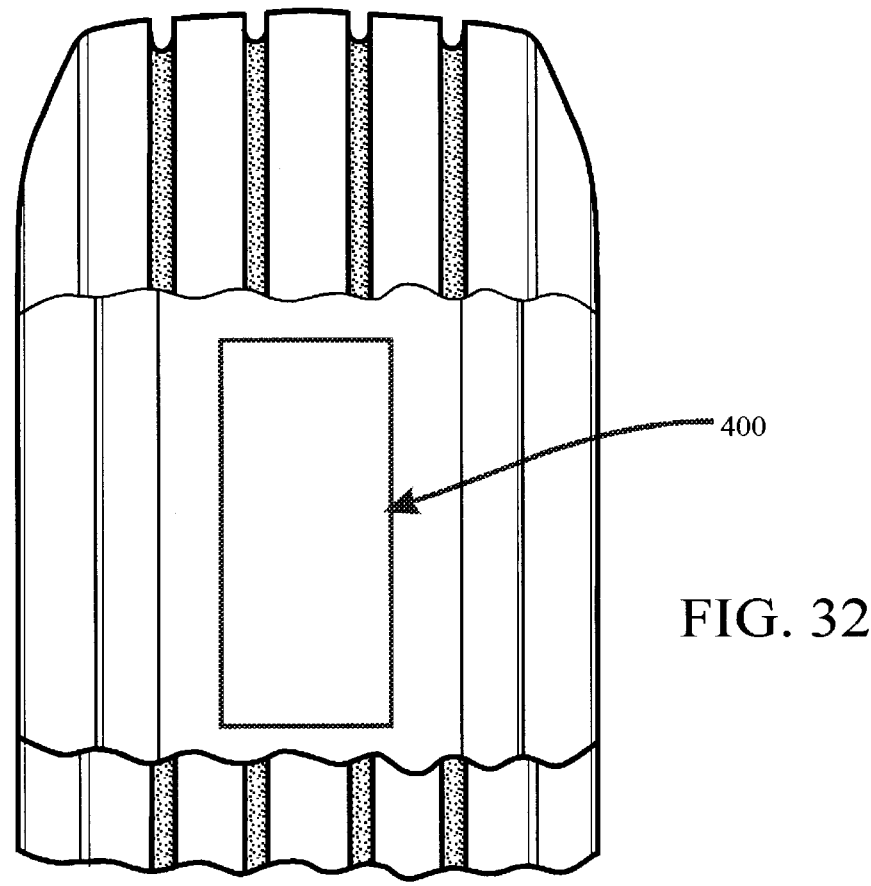
FIG. 32 is a partial cutaway view of a piezoelectric generator and tire monitor using PVDF film.
Figure 32A:
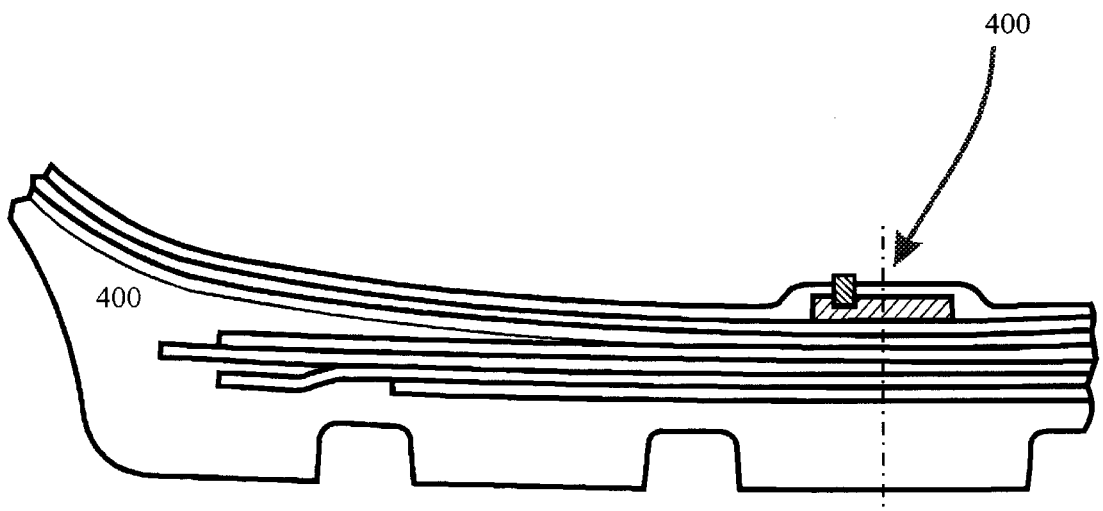
FIG. 32A is a cutaway view of the PVDF sensor of FIG. 32.

Although piezoelectric SAW devices normally use rigid material such as quartz or lithium niobate, it is also possible to utilize polyvinylidene fluoride (PVDF) providing the frequency is low. A piece of PVDF film can also be used as a sensor of tire flexure by itself. Such a sensor is illustrated in FIGS. 32 and 32A at 400. The output of flexure of the PVDF film can be used to supply power to a silicon microcircuit that contains pressure and temperature sensors. The waveform of the output from the PVDF film also provides information as to the flexure of an automobile tire and can be used to diagnose problems with the tire as well as the tire footprint in a manner similar to the device described in FIG. 15. In this case, however, the PVDF film supplies sufficient power to permit significantly more transmission energy to be provided. The frequency and informational content can be made compatible with the SAW interrogator described above such that the same interrogator can be used. The power available for the interrogator, however, can be significantly greater thus increasing the reliability and reading range of the system.

There is a general problem with tire pressure monitors as well as systems that attempt to interrogate passive SAW or electronic RFID type devices in that the FCC severely limits the frequencies and radiating power that can be used. Once it becomes evident that these systems will eventually save many lives, the FCC can be expected to modify their position. In the meantime, various schemes can be used to help alleviate this problem. The lower frequencies that have been opened for automotive radar permit higher power to be used and they could be candidates for the devices discussed above. It is also possible, in some cases, to transmit power on multiple frequencies and combine the received power to boost the available energy. Energy can of course be stored and periodically used to drive circuits and work is ongoing to reduce the voltage required to operate semiconductors. The devices of this invention will make use of some or all of these developments as they take place.

If the vehicle has been at rest for a significant time period, power will leak from the storage capacitors and will not be available for transmission. However, a few tire rotations are sufficient to provide the necessary energy.

Figure 33:
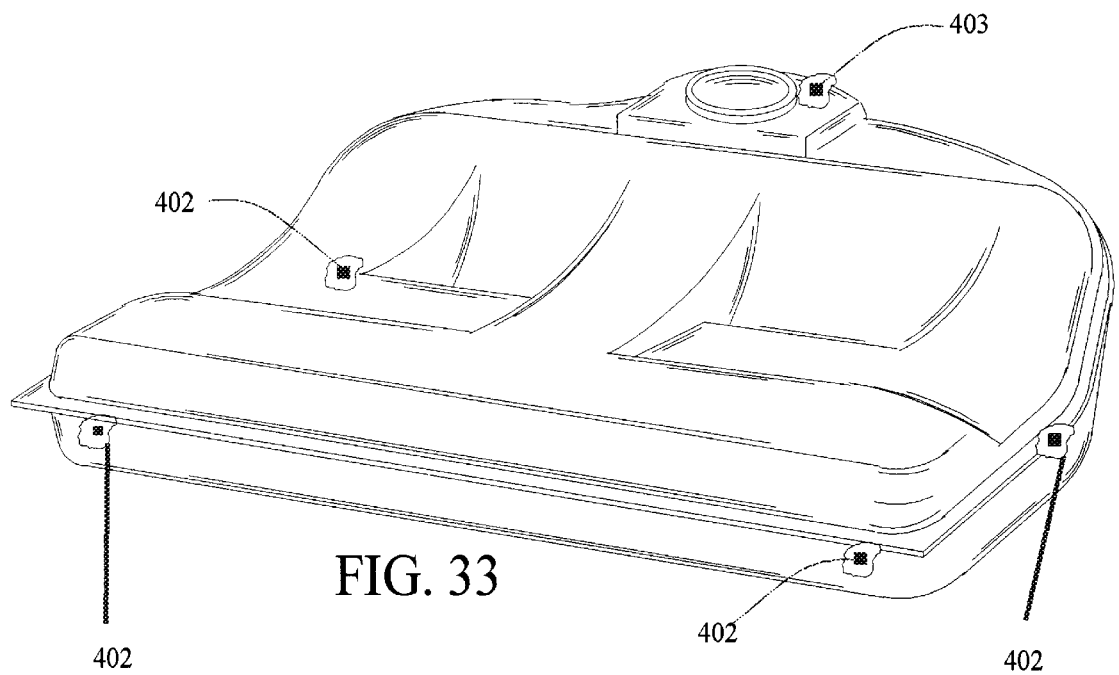
FIG. 33 is a perspective view with portions cutaway of a SAW based vehicle gas gage.
Figure 33A:
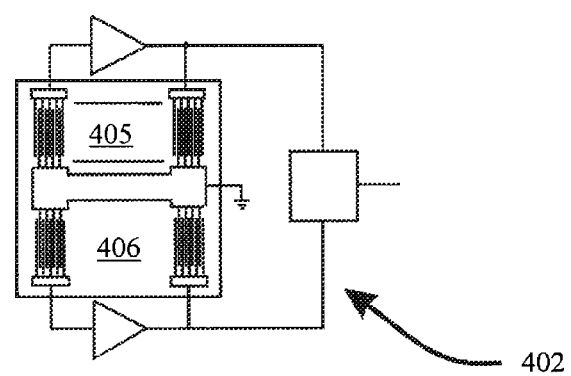
FIG. 33A is a top detailed view of a SAW pressure and temperature monitor for use in the system of FIG. 33.

U.S. patent application Ser. No. 08/819,609, assigned to the current assignee of this invention, provides multiple means for determining the amount of gas in a gas tank. Using the SAW pressure devices of this invention, multiple pressure sensors can be placed at appropriate locations within a fuel tank to measure the fluid pressure and thereby determine the quantity of fuel remaining in the tank. This is illustrated in FIG. 33. In this example, four SAW pressure transducers 402 are placed on the bottom of the fuel tank and one SAW pressure transducer 403 is placed at the top of the fuel tank to eliminate the effects of vapor pressure within tank. Using neural networks, or other pattern recognition techniques, the quantity of fuel in the tank can be accurately determined from these pressure readings in a manner similar that described the '609 patent application. The SAW measuring device illustrated in FIG. 33A combines temperature and pressure measurements in a single unit using parallel paths 405 and 406 in the same manner as described above Occupant weight sensors can give erroneous results if the seatbelt is pulled tight pushing the occupant into the seat. This is particularly a problem when the seatbelt is not attached to the seat. For such cases, it has been proposed to measure the tension in various parts of the seatbelt. Using conventional technology requires that such devices be hardwired into the vehicle complicating the wire harness.

Figure 34:
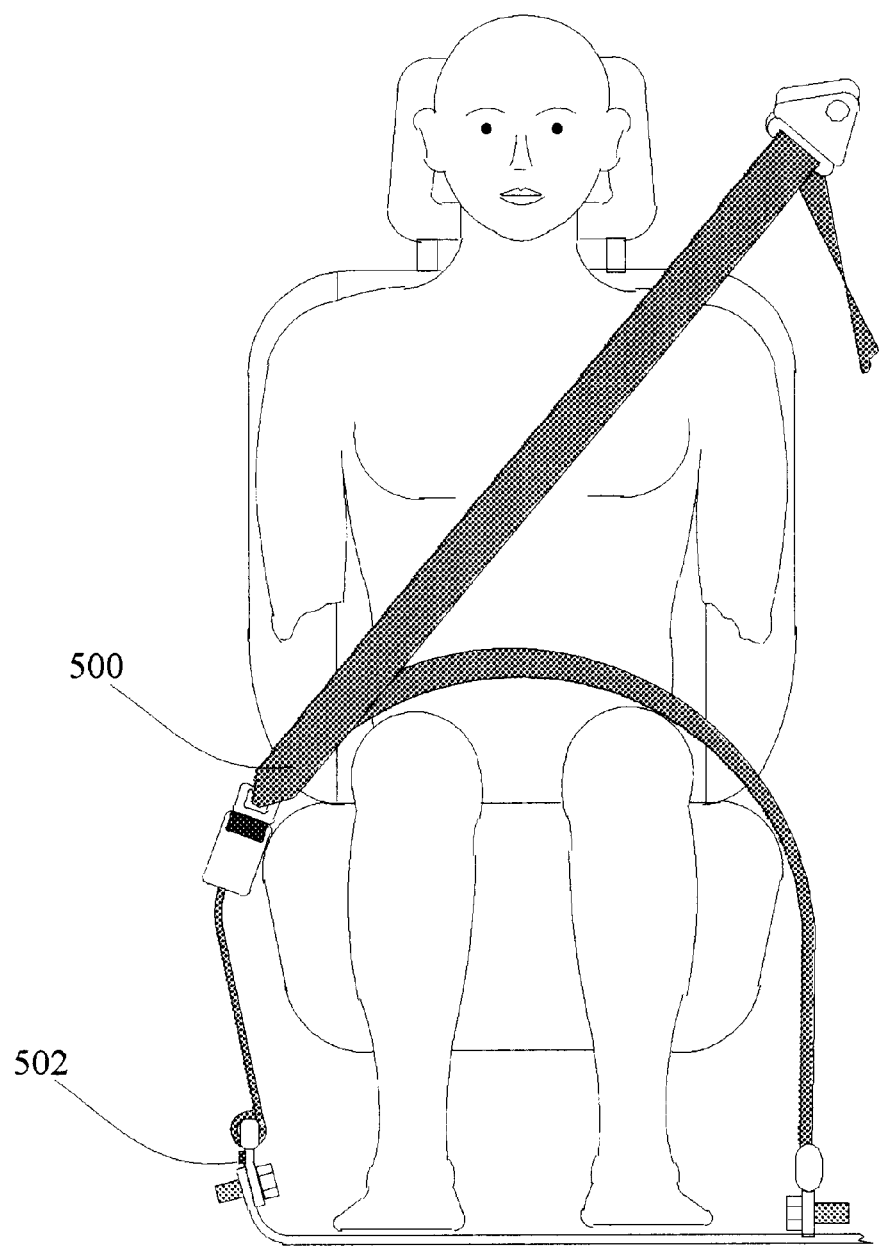
FIG. 34 is a partial cutaway view of a vehicle drives wearing a seatbelt with SAW force sensors.

With reference to FIG. 34, using a SAW strain gage as described above, the tension in the seat belt 500 can be measured without the requirement of power or signal wires. FIG. 34 illustrates a powerless and wireless passive SAW strain gage based device 502 for this purpose. There are many other places that such a device can be mounted to measure the tension in the seatbelt at one or at multiple places.

Figure 35:
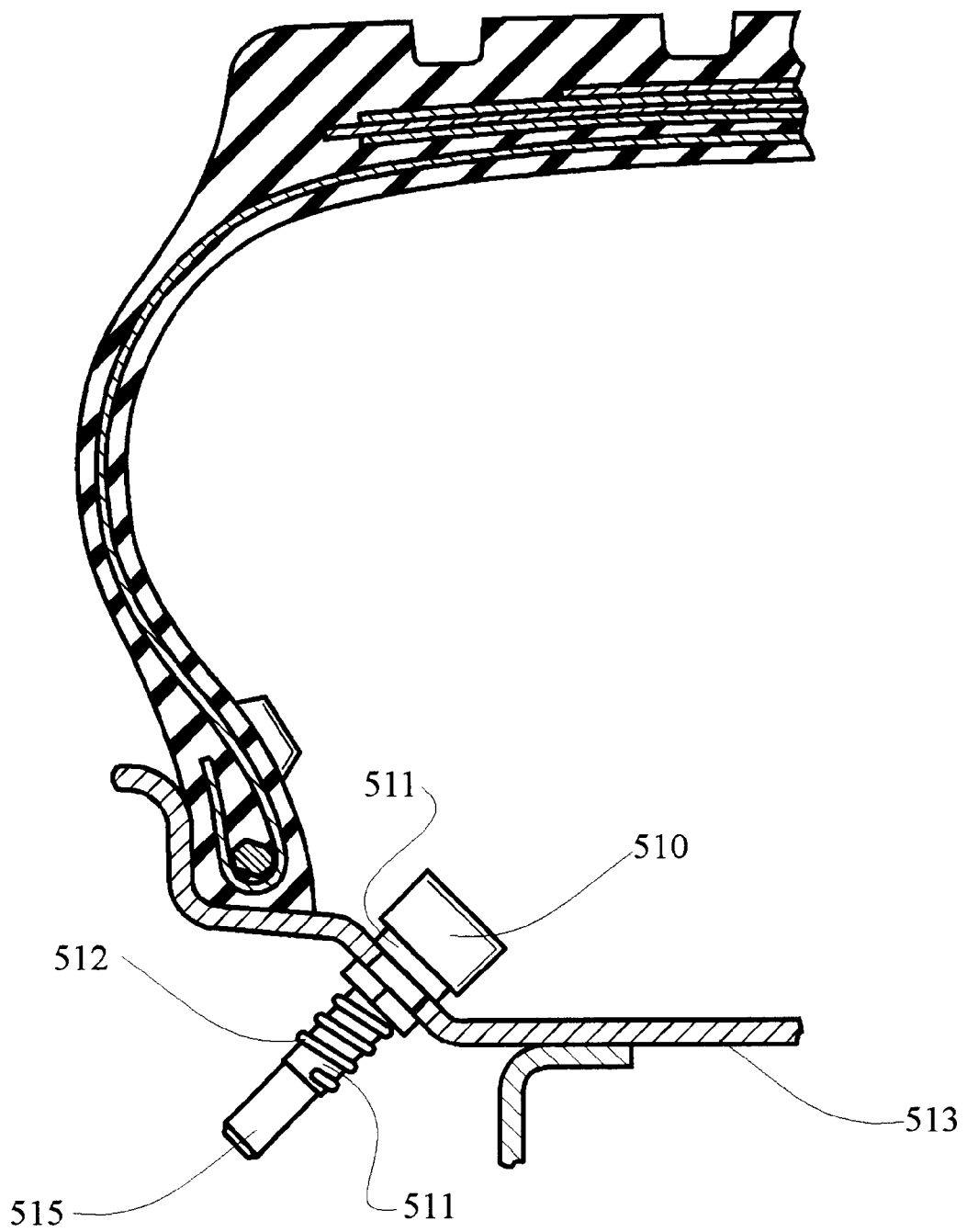
FIG. 35 is an alternate arrangement of a SAW tire pressure and temperature monitor installed in the wheel rim facing inside.

FIG. 35 illustrates another version of a tire temperature and/or pressure monitor 510. Monitor 510 may include at an inward end, any one of the temperature transducers or sensors described above and/or any one of the pressure transducers or sensors described above, or any one of the combination temperature and pressure transducers or sensors described above.

The monitor 510 has an elongate body attached through the wheel rim 513 typically on the inside of the tire so that the under-vehicle mounted antenna(s) have a line of sight view of antenna 515. Monitor 510 is connected to an inductive wire 512, which matches the output of the device with the antenna 515, which is part of the device assembly. Insulating material 511 surrounds the body which provides an air tight seal and prevents electrical contact with the wheel rim 513.

Figure 36A:
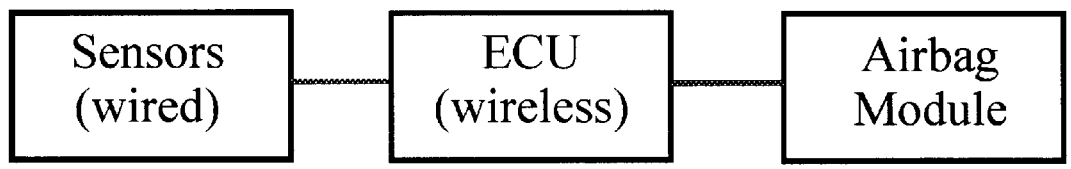
FIG. 36A is a schematic of a prior art deployment scheme for an airbag module.

FIG. 36A shows a schematic of a prior art airbag module deployment scheme in which sensors, which detect data for use in determining whether to deploy an airbag in the airbag module, are wired to an electronic control unit (ECU) and a command to initiate deployment of the airbag in the airbag module is sent wirelessly.

Figure 36B:
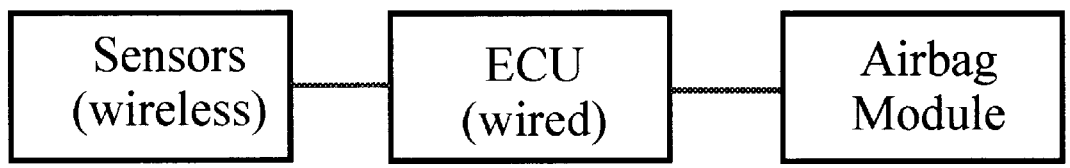
FIG. 36B is a schematic of a deployment scheme for an airbag module in accordance with the invention.

By contrast, as shown in FIG. 36B, in accordance with the invention, the sensors are wireless connected to the electronic control unit and thus transmit data wirelessly. The ECU is however wired to the airbag module.

SAW sensors also have applicability to various other sectors of the vehicle, including the powertrain, chassis, and occupant comfort and convenience. For example, SAW sensors have applicability to sensors for the powertrain area including oxygen sensors, gear-tooth Hall effect sensors, variable reluctance sensors, digital speed and position sensors, oil condition sensors, rotary position sensors, low pressure sensors, manifold absolute pressure/manifold air temperature (MAP/MAT) sensors, medium pressure sensors, turbo pressure sensors, knock sensors, coolant/fluid temperature sensors, and transmission temperature sensors.

SAW sensors for chassis applications include gear-tooth Hall effect sensors, variable reluctance sensors, digital speed and position sensors, rotary position sensors, non-contact steering position sensors, and digital ABS (anti-lock braking system) sensors.

SAW sensors for the occupant comfort and convenience area include low-pressure sensors, IVAC temperature and humidity sensors, air temperature sensors, and oil condition sensors.

SAW sensors also have applicability such areas as controlling evaporative emissions, transmission shifting, mass air flow meters, oxygen, NOx and hydrocarbon sensors. SAW based sensors are particularly useful in high temperature environments where many other technologies fail.

SAW sensors can facilitate compliance with U.S. regulations concerning evaporative system monitoring in vehicles, through a SAW fuel vapor pressure and temperature sensors that measure fuel vapor pressure within the fuel tank as well as temperature. If vapors leak into the atmosphere, the pressure within the tank drops. The sensor notifies the system of a fuel vapor leak, resulting in a warning signal to the driver and/or notification to a repair facility. This application is particularly important since the condition within the furl tank can be ascertained wirelessly reducing the chance of a fuel fire in an accident. The same interrogator that monitors the tire pressure SAW sensors can also monitor the fuel vapor pressure and temperature sensors resulting in significant economies.

A SAW humidity sensor can be used for measuring the relative humidity and the resulting information can be input to the engine management system or the heating, ventilation, and air conditioning (HVAC) system for more efficient operation. The relative humidity of the air entering an automotive engine impacts the engine's combustion efficiency; i.e., the ability of the spark plugs to ignite the fuel/air mixture in the combustion chamber at the proper time. A SAW humidity sensor in this case can measure the humidity level of the incoming engine air, helping to calculate a more precise fuel/air ratio for improved fuel economy and reduced emissions.

Dew point conditions are reached when the air is fully saturated with water. When the cabin dew point temperature matches the windshield glass temperature, water from the air condenses quickly, creating frost or fog. A SAW humidity sensor with a temperature-sensing element and a window glass-temperature-sensing element can prevent the formation of visible fog formation by automatically controlling the HVAC system.

Among the inventions disclosed above is an arrangement for obtaining and conveying information about occupancy of a passenger compartment of a vehicle comprises at least one wave-receiving sensor for receiving waves from the passenger compartment, generating means coupled to the wave-receiving sensor(s) for generating information about the occupancy of the passenger compartment based on the waves received by the wave-receiving sensor(s) and communications means coupled to the generating means for transmitting the information about the occupancy of the passenger compartment. As such, response personnel can receive the information about the occupancy of the passenger compartment and respond appropriately, if necessary. There may be several wave-receiving sensors and they may be, e.g., ultrasonic wave-receiving sensors, electromagnetic wave-receiving sensors, capacitance or electric field sensors, or combinations thereof. The information about the occupancy of the passenger compartment can include the number of occupants in the passenger compartment, as well as whether each occupant is moving non-reflexively and breathing. A transmitter may be provided for transmitting waves into the passenger compartment such that each wave-receiving sensor receives waves transmitted from the transmitter and modified by passing into and at least partially through the passenger compartment. One or more memory units may be coupled to the generating means for storing the information about the occupancy of the passenger compartment and to the communications means. The communications means then can interrogate the memory unit(s) upon a crash of the vehicle to thereby obtain the information about the occupancy of the passenger compartment. In one particularly useful embodiment, means for determining the health state of at least one occupant are provided, e.g., a heartbeat sensor, a motion sensor such as a micropower impulse radar sensor for detecting motion of the at least one occupant and motion sensor for determining whether the occupant(s) is/are breathing, and coupled to the communications means. The communications means can interrogate the health state determining means upon a crash of the vehicle to thereby obtain and transmit the health state of the occupant(s). The health state determining means can also comprise a chemical sensor for analyzing the amount of carbon dioxide in the passenger compartment or around the at least one occupant or for detecting the presence of blood in the passenger compartment. Movement of the occupant can be determined by monitoring the weight distribution of the occupant(s), or an analysis of waves from the space occupied by the occupant(s). Each wave-receiving sensor generates a signal representative of the waves received thereby and the generating means may comprise a processor for receiving and analyzing the signal from the wave-receiving sensor in order to generate the information about the occupancy of the passenger compartment. The processor can comprise pattern recognition means for classifying an occupant of the seat so that the information about the occupancy of the passenger compartment includes the classification of the occupant. The wave-receiving sensor may be a micropower impulse radar sensor adapted to detect motion of an occupant whereby the motion of the occupant or absence of motion of the occupant is indicative of whether the occupant is breathing. As such, the information about the occupancy of the passenger compartment generated by the generating means is an indication of whether the occupant is breathing. Also, the wave-receiving sensor may generate a signal representative of the waves received thereby and the generating means receive this signal over time and determine whether any occupants in the passenger compartment are moving. As such, the information about the occupancy of the passenger compartment generated by the generating means includes the number of moving and non-moving occupants in the passenger compartment.

A related method for obtaining and conveying information about occupancy of a passenger compartment of a vehicle comprises the steps of receiving waves from the passenger compartment, generating information about the occupancy of the passenger compartment based on the received waves, and transmitting the information about the occupancy of the passenger compartment whereby response personnel can receive the information about the occupancy of the passenger compartment. Waves may be transmitted into the passenger compartment whereby the transmitted waves are modified by passing into and at least partially through the passenger compartment and then received. The information about the occupancy of the passenger compartment may be stored in at least one memory unit which is subsequently interrogated upon a crash of the vehicle to thereby obtain the information about the occupancy of the passenger compartment. A signal representative of the received waves can be generated by sensors and analyzed in order to generate the information about the state of health of at least one occupant of the passenger compartment and/or to generate the information about the occupancy of the passenger compartment (i.e., determine non-reflexive movement and/or breathing indicating life). Pattern recognition techniques, e.g., a trained neural network, can be applied to analyze the signal and thereby recognize and identify any occupants of the passenger compartment. In this case, the identification of the occupants of the passenger compartment can be included into the information about the occupancy of the passenger compartment.

All of the above-described methods and apparatus, as well as those further described below, may be used in conjunction with one another and in combination with the methods and apparatus for optimizing the driving conditions for the occupants of the vehicle described herein.

Also described above is an embodiment of a component diagnostic system for diagnosing the component in accordance with the invention which comprises a plurality of sensors not directly associated with the component, i.e., independent therefrom, such that the component does not directly affect the sensors, each sensor detecting a signal containing information as to whether the component is operating normally or abnormally and outputting a corresponding electrical signal, processor means coupled to the sensors for receiving and processing the electrical signals and for determining if the component is operating abnormally based on the electrical signals, and output means coupled to the processor means for affecting another system within the vehicle if the component is operating abnormally. The processor means preferably comprise pattern recognition means such as a trained pattern recognition algorithm, a neural network, modular neural networks, an ensemble of neural networks, a cellular neural network, or a support vector machine. In some cases, fuzzy logic will be used which can be combined with a neural network to form a neural fuzzy algorithm. The another system may be a display for indicating the abnormal state of operation of the component arranged in a position in the vehicle to enable a driver of the vehicle to view the display and thus the indicated abnormal operation of the component. At least one source of additional information, e.g., the time and date, may be provided and input means coupled to the vehicle for inputting the additional information into the processor means. The another system may also be a warning device including transmission means for transmitting information related to the component abnormal operating state to a site remote from the vehicle, e.g., a vehicle repair facility.

In another embodiment of the component diagnostic system discussed above, at least one sensor detects a signal containing information as to whether the component is operating normally or abnormally and outputs a corresponding electrical signal. A processor or other computing device is coupled to the sensor(s) for receiving and processing the electrical signal(s) and for determining if the component is operating abnormally based thereon. The processor preferably comprises or embodies a pattern recognition algorithm for analyzing a pattern within the signal detected by each sensor. An output device (or multiple output devices) is coupled to the processor for affecting another system within the vehicle if the component is operating abnormally. The other system may be a display as mentioned above or a warning device.

A method for automatically monitoring one or more components of a vehicle during operation of the vehicle on a roadway entails, as discussed above, the steps of monitoring operation of the component in order to detect abnormal operation of the component, e.g., in one or the ways described above, and if abnormal operation of the component is detected, automatically directing the vehicle off of the restricted roadway. For example, in order to automatically direct the vehicle off of the restricted roadway, a signal representative of the abnormal operation of the component may be generated and directed to a guidance system of the vehicle that guides the movement of the vehicle. Possibly the directing the vehicle off of the restricted roadway may entail applying satellite positioning techniques or ground-based positioning techniques to enable the current position of the vehicle to be determined and a location off of the restricted highway to be determined and thus a path for the movement of the vehicle. Re-entry of the vehicle onto the restricted roadway may be prevented until the abnormal operation of the component is satisfactorily addressed.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. Also, any of the apparatus and methods disclosed herein may be used for diagnosing the state of operation or a plurality of discrete components.

In other embodiments disclosed above, the state of the entire vehicle is diagnosed whereby two or more sensors, preferably acceleration sensors and gyroscopes, detect the state of the vehicle and if the state is abnormal, output means are coupled to the processor means for affecting another system in the vehicle. The another system may be the steering control system, the brake system, the accelerator or the frontal or side occupant protection system. An exemplifying control system for controlling a part of the vehicle in accordance with the invention thus comprises a plurality of sensor systems mounted at different locations on the vehicle, each sensor system providing a measurement related to a state of the sensor system or a measurement related to a state of the mounting location, and a processor coupled to the sensor systems and arranged to diagnose the state of the vehicle based on the measurements of the sensor system, e.g., by the application of a pattern recognition technique. The processor controls the part based at least in part on the diagnosed state of the vehicle. At least one of the sensor systems may be a high dynamic range accelerometer or a sensor selected from a group consisting of a single axis acceleration sensor, a double axis acceleration sensor, a triaxial acceleration sensor and a gyroscope, and may optionally include an RFID response unit. The gyroscope may be a MEMS-IDT gyroscope including a surface acoustic wave resonator which applies standing waves on a piezoelectric substrate. If an RFID response unit is present, the control system would then comprise an RFID interrogator device which causes the RFID response unit(s) to transmit a signal representative of the measurement of the sensor system associated therewith to the processor.

The state of the vehicle diagnosed by the processor may be the vehicle's angular motion, angular acceleration and/or angular velocity. As such, the steering system, braking system or throttle system may be controlled by the processor in order to maintain the stability of the vehicle. The processor can also be arranged to control an occupant restraint or protection device in an attempt to minimize injury to an occupant.

The state of the vehicle diagnosed by the processor may also be a determination of a location of an impact between the vehicle and another object. In this case, the processor can forecast the severity of the impact using the force/crush properties of the vehicle at the impact location and control an occupant restraint or protection device based at least in part on the severity of the impact.

The system can also include a weight sensing system coupled to a seat in the vehicle for sensing the weight of an occupying item of the seat. The weight sensing system is coupled to the processor whereby the processor controls deployment or actuation of the occupant restraint or protection device based on the state of the vehicle and the weight of the occupying item of the seat sensed by the weight sensing system.

A display may be coupled to the processor for displaying an indication of the state of the vehicle as diagnosed by the processor. A warning device may be coupled to the processor for relaying a warning to an occupant of the vehicle relating to the state of the vehicle as diagnosed by the processor. Further, a transmission device may be coupled to the processor for transmitting a signal to a remote site relating to the state of the vehicle as diagnosed by the processor.

The state of the vehicle diagnosed by the processor may include angular acceleration of the vehicle whereby angular velocity and angular position or orientation are derivable from the angular acceleration. The processor can then be arranged to control the vehicle's navigation system based on the angular acceleration of the vehicle.

A method for controlling a part of the vehicle in accordance with the invention comprises the step of mounting a plurality of sensor systems at different locations on the vehicle, measuring a state of the sensor system or a state of the respective mounting location of the sensor system, diagnosing the state of the vehicle based on the measurements of the state of the sensor systems or the state of the mounting locations of the sensor systems, and controlling the part based at least in part on the diagnosed state of the vehicle. The state of the sensor system may be any one or more of the acceleration, angular acceleration, angular velocity or angular orientation of the sensor system. Diagnosis of the state of the vehicle may entail determining whether the vehicle is stable or is about to rollover or skid and/or determining a location of an impact between the vehicle and another object. Diagnosis of the state of the vehicle may also entail determining angular acceleration of the vehicle based on the acceleration measured by accelerometers if multiple accelerometers are present as the sensor systems.

Another control system for controlling a part of the vehicle in accordance with the invention comprises a plurality of sensor systems mounted on the vehicle, each providing a measurement of a state of the sensor system or a state of the mounting location of the sensor system and generating a signal representative of the measurement, and a pattern recognition system for receiving the signals from the sensor systems and diagnosing the state of the vehicle based on the measurements of the sensor systems. The pattern recognition system generates a control signal for controlling the part based at least in part on the diagnosed state of the vehicle. The pattern recognition system may comprise one or more neural networks. The features of the control system described above may also be incorporated into this control system to the extent feasible.

The state of the vehicle diagnosed by the pattern recognition system may include a state of an abnormally operating component whereby the pattern recognition system is designed to identify a potentially malfunctioning component based on the state of the component measured by the sensor systems and determine whether the identified component is operating abnormally based on the state of the component measured by the sensor systems.

In one preferred embodiment, the pattern recognition system may comprise a neural network system and the state of the vehicle diagnosed by the neural network system includes a state of an abnormally operating component. The neural network system includes a first neural network for identifying a potentially malfunctioning component based on the state of the component measured by the sensor systems and a second neural network for determining whether the identified component is operating abnormally based on the state of the component measured by the sensor systems.

Modular neural networks can also be used whereby the neural network system includes a first neural network arranged to identify a potentially malfunctioning component based on the state of the component measured by the sensor systems and a plurality of additional neural networks. Each of the additional neural networks is trained to determine whether a specific component is operating abnormally so that the measurements of the state of the component from the sensor systems are input into that one of the additional neural networks trained on a component which is substantially identical to the identified component.

Another method for controlling a part of the vehicle comprises the steps of mounting a plurality of sensor systems on the vehicle, measuring a state of the sensor system or a state of the respective mounting location of the sensor system, generating signals representative of the measurements of the sensor systems, inputting the signals into a pattern recognition system to obtain a diagnosis of the state of the vehicle and controlling the part based at least in part on the diagnosis of the state of the vehicle.

In one notable embodiment, a potentially malfunctioning component is identified by the pattern recognition system based on the states measured by the sensor systems and the pattern recognition system determine whether the identified component is operating abnormally based on the states measured by the sensor systems. If the pattern recognition system comprises a neural network system, identification of the component entails inputting the states measured by the sensor systems into a first neural network of the neural network system and the determination of whether the identified component is operating abnormally entails inputting the states measured by the sensor systems into a second neural network of the neural network system. A modular neural network system can also be applied in which the states measured by the sensor systems are input into a first neural network and a plurality of additional neural networks are provided, each being trained to determine whether a specific component is operating abnormally, whereby the states measured by the sensor systems are input into that one of the additional neural networks trained on a component which is substantially identical to the identified component.

Another control system for controlling a part of the vehicle based on occupancy of the seat in accordance with the invention comprises a plurality of strain gages mounted in connection with the seat, each measuring strain of a respective mounting location caused by occupancy of the seat, and a processor coupled to the strain gages and arranged to determine the weight of an occupying item based on the strain measurements from the strain gages over a period of time, i.e., dynamic measurements. The processor controls the part based at least in part on the determined weight of the occupying item of the seat. The processor can also determine motion of the occupying item of the seat based on the strain measurements from the strain gages over the period of time. One or more accelerometers may be mounted on the vehicle for measuring acceleration in which case, the processor may control the part based at least in part on the determined weight of the occupying item of the seat and the acceleration measured by the accelerometer(s). By comparing the output of various sensors in the vehicle, it is possible to determine activities that are affecting parts of the vehicle while not affecting other parts. For example, by monitoring the vertical accelerations of various parts of the vehicle and comparing these accelerations with the output of strain gage load cells placed on the seat support structure, a characterization can be made of the occupancy of the seat. Not only can the weight of an object occupying the seat be determined, but also the gross motion of such an object can be ascertained and thereby an assessment can be made as to whether the object is a life form such as a human being.

Strain gage weight sensors are disclosed in U.S. patent application Ser. No. 09/193,209 filed Nov. 17, 1998 (corresponding to International Publication No. WO 00/29257), which is incorporated herein by reference its entirety as if the entire application were set forth herein. In particular, the inventors contemplate the combination of all of the ideas expressed in this patent application with those expressed in the current invention.

Although several preferred embodiments are illustrated and described above, there are possible combinations using other geometries, sensors, materials and different dimensions for the components that perform the same functions. This invention is not limited to the above embodiments and should be determined by the following claims.

I claim:

1. A vehicle, comprising:
   a diagnostic system arranged on the vehicle to diagnose the state of the vehicle or the state of a component of the vehicle and generate an output indicative or representative thereof; and
   a communications device coupled to said diagnostic system and arranged to automatically establish a communications channel between the vehicle and a remote facility without manual intervention and wirelessly transmit the output of said diagnostic system to the remote facility.

2. The vehicle of claim 1, wherein said diagnostic system comprises a plurality of vehicle sensors mounted on the vehicle, each of said sensors providing a measurement related to a state of said sensor or a measurement related to a state of the mounting location and a processor coupled to said sensors and arranged to receive data from said sensors and process the data to generate the output indicative or representative of the state of the vehicle or the state of a component of the vehicle.

3. The vehicle of claim 2, wherein said sensors are wirelessly coupled to said processor.

4. The vehicle of claim 2, wherein said processor embodies a pattern recognition algorithm trained to generate the output from the data received from said sensors.

5. The vehicle of claim 1, further comprising a display arranged in the vehicle in a position to be visible from the passenger compartment, said display being coupled to said diagnostic system and arranged to display the diagnosis of the state of the vehicle or the state of a component of the vehicle.

6. The vehicle of claim 1, wherein said communications device comprises a cellular telephone system including an antenna.

7. The vehicle of claim 1, further comprising an occupant sensing system arranged to determine at least one property or characteristic of occupancy of the vehicle, said communications device being coupled to said occupant sensing system and arranged to transmit the determined property or characteristic of occupancy of the vehicle to the remote facility.

8. The vehicle of claim 1, further comprising at least one environment sensor each sensing a state of the environment around the vehicle, said communications device being coupled to said at least one environment sensor and being arranged to transmit the sensed state of the environment around the vehicle to the remote facility.

9. The vehicle of claim 1, further comprising a memory unit coupled to said diagnostic system and said communications device, said memory unit being arranged to receive the diagnosis of the state of the vehicle or the state of a component of the vehicle from said diagnostic system and store the diagnosis, said communications device being arranged to interrogate said memory unit to obtain the stored diagnosis to enable transmission thereof.

10. The vehicle of claim 1, wherein said diagnostic system comprises a plurality of sensors mounted at different locations on the vehicle, each of said sensors providing a measurement related to a state of said sensor or a measurement related to a state of the mounting location and a processor coupled to said sensor systems and arranged to diagnose the state of the vehicle or the state of the component of the vehicle based on the measurements of said sensors.

11. The vehicle of claim 10, wherein at least one of said sensors is a sensor selected from a group consisting of a single axis acceleration sensor, a double axis acceleration sensor, a triaxial acceleration sensor and a gyroscope.

12. The vehicle of claim 10, wherein at least one of said sensors includes an RFID response unit, further comprising at least one RFID interrogator device, said at least one interrogator device causing said RFID response unit of said at least one sensor to transmit a signal representative of the measurement of said at least one sensor to said processor.

13. The vehicle of claim 10, wherein at least one of said sensors includes a SAW sensor arranged to receive a signal and return a signal modified by virtue of the state of said SAW sensor or the state of the mounting location of said SAW sensor.

14. The vehicle of claim 13, wherein said SAW sensor is arranged to measure at least one of temperature and pressure.

15. The vehicle of claim 13, wherein said SAW sensor is arranged to measure at least one of the presence and concentration of a chemical.

16. The vehicle of claim 1, wherein the state of the vehicle diagnosed by said diagnostic system includes angular motion of the vehicle.

17. The vehicle of claim 2, wherein said processor is arranged to control at least one part of the vehicle based on the output indicative or representative of the state of the vehicle or the state of a component of the vehicle.

18. The vehicle of claim 1, further comprising a warning device coupled to said diagnostic system for relaying a warning to an occupant of the vehicle relating to the state of the vehicle or the state of the component of the vehicle as diagnosed by said diagnostic system.

19. The vehicle of claim 1, further comprising a location determining system for determining the location of the vehicle, said communications device being coupled to said location determining system and arranged to transmit the determined location of the vehicle to the remote facility.

20. The vehicle of claim 19, wherein said location determining system uses GPS technology.

21. A method for monitoring a vehicle, comprising the steps of:
    diagnosing the state of the vehicle or the state of a component of the vehicle by means of a diagnostic system arranged on the vehicle;
    generating an output indicative or representative of the diagnosed state of the vehicle or the diagnosed state of the component of the vehicle; and
    transmitting the output indicative or representative of the diagnosed state of the vehicle or the diagnosed state of the component of the vehicle from the vehicle to a remote location.

22. The vehicle of claim 21, wherein the step of transmitting the output to a remote location comprises the step of arranging a communications device comprising a cellular telephone system including an antenna on the vehicle.

23. The method of claim 21, wherein the state of the vehicle or the state of the component of the vehicle is diagnosed by a processor embodying a pattern recognition algorithm.

24. The method of claim 21, wherein the step of diagnosing the state of the vehicle comprises the step of determining whether the vehicle is stable or is about to rollover or skid.

25. The method of claim 21, wherein the step of diagnosing the state of the vehicle comprises the step of determining a location of an impact between the vehicle and another object.

26. The method of claim 21, further comprising the steps of:
arranging a display in the vehicle in a position to be visible from the passenger compartment; and
displaying the state of the vehicle or the state of a component of the vehicle on the display.

27. The method of claim 21, further comprising the step of relaying a warning to an occupant of the vehicle relating to the state of the vehicle.

28. The method of claim 21, further comprising the steps of:
determining at least one property or characteristic of occupancy of the vehicle; and
transmitting the determined property or characteristic of occupancy of the vehicle to a remote location.

29. The method of claim 28, wherein the step of determining at least one property or characteristic of occupancy of the vehicle comprises the step of determining the number of occupants in the passenger compartment.

30. The method of claim 21, further comprising the steps of:
sensing a state of the environment around the vehicle; and
transmitting information about the environment of the vehicle to a remote location.

31. The method of claim 21, further comprising the steps of:
providing a memory unit in the vehicle to receive the diagnosis of the state of the vehicle or the state of the component of the vehicle and store the diagnosis; and
interrogating the memory unit to obtain the stored diagnosis to enable transmission thereof.

32. The method of claim 21, wherein the step of diagnosing the state of the vehicle or the state of the component of the vehicle comprises the steps of mounting a plurality of sensors on the vehicle, measuring a state of each sensor or a state of the mounting location of each sensor and diagnosing the state of the vehicle or the state of a component of the vehicle based on the measurements of the state of the sensors or the state of the mounting locations of the sensors.

33. The method of claim 32, wherein the state of the vehicle or the state of the component of the vehicle is diagnosed by a processor, further comprising the step of wirelessly coupling the sensors to the processor.

34. The method of claim 21, wherein the state of the vehicle is diagnosed by a processor, further comprising the steps of:
providing at least one of the sensors with an RFID response unit;
mounting at least one RFID interrogator device on the vehicle; and
transmitting signals via the at least one RFID interrogator device to cause the RFID response units of the at least one sensor to transmit a signal representative of the measurements of the at least one sensor to the processor.

35. The method of claim 21, wherein the state of the vehicle is diagnosed by a processor, further comprising the step of providing at least one of the sensors as a SAW sensor capable of receiving a signal and returning a signal modified by virtue of the state of the SAW sensor or the state of the mounting location of the SAW sensor.

36. The method of claim 35, wherein the SAW sensor is arranged to measure at least one of temperature and pressure.

37. The method of claim 35, wherein the SAW sensor is arranged to measure at least one of concentration and presence of a chemical.

38. The method of claim 21, wherein the step of transmitting the output to a remote location comprises the step of transmitting the output to a satellite for transmission from the satellite to the remote location.

39. The method of claim 21, wherein the step of transmitting the output to a remote location comprises the step of transmitting the output via the Internet to a web site or host computer associated with the remote location.

40. The method of claim 21, further comprising the steps of:
determining the location of the vehicle; and
transmitting the determined location of the vehicle to the remote location in conjunction with the output.

41. A vehicle, comprising:
a diagnostic system arranged on the vehicle to diagnose the state of the vehicle or the state of a component of the vehicle and generate an output indicative or representative thereof; and
a communications device coupled to said diagnostic system and arranged to transmit the output of said diagnostic system,
said communications device including a transmitter for transmitting a signal representative of the output of said diagnostic system to a satellite for transmission from the satellite to a remote site.

42. The vehicle of claim 41, wherein said diagnostic system comprises a plurality of vehicle sensors mounted on the vehicle, each of said sensors providing a measurement related to a state of said sensor or a measurement related to a state of the mounting location and a processor coupled to said sensors and arranged to receive data from said sensors and process the data to generate the output indicative or representative of the state of the vehicle or the state of a component of the vehicle.

43. The vehicle of claim 42, wherein said sensors are wirelessly coupled to said processor.

44. The vehicle of claim 42, wherein said processor embodies a pattern recognition algorithm trained to generate the output from the data received from said sensors.

45. The vehicle of claim 41, further comprising a display arranged in the vehicle in a position to be visible from the passenger compartment, said display being coupled to said diagnostic system and arranged to display the diagnosis of the state of the vehicle or the state of a component of the vehicle.

46. The vehicle of claim 41, further comprising an occupant sensing system arranged to determine at least one property or characteristic of occupancy of the vehicle, said communications device being coupled to said occupant sensing system and arranged to transmit the determined property or characteristic of occupancy of the vehicle.

47. The vehicle of claim 41, further comprising at least one environment sensor each sensing a state of the environment around the vehicle, said communications device being coupled to said at least one environment sensor and being arranged to transmit the sensed state of the environment around the vehicle.

48. The vehicle of claim 41, further comprising a memory unit coupled to said diagnostic system and said communications device, said memory unit being arranged to receive the diagnosis of the state of the vehicle or the state of a component of the vehicle from said diagnostic system and store the diagnosis, said communications device being arranged to interrogate said memory unit to obtain the stored diagnosis to enable transmission thereof.

49. The vehicle of claim 41, wherein said diagnostic system comprises a plurality of sensors mounted at different locations on the vehicle, each of said sensors providing a measurement related to a state of said sensor or a measurement related to a state of the mounting location and a processor coupled to said sensor systems and arranged to diagnose the state of the vehicle or the state of the component of the vehicle based on the measurements of said sensors.

50. The vehicle of claim 49, wherein at least one of said sensors is a sensor selected from a group consisting of a single axis acceleration sensor, a double axis acceleration sensor, a triaxial acceleration sensor and a gyroscope.

51. The vehicle of claim 49, wherein at least one of said sensors includes an RFID response unit, further comprising at least one RFID interrogator device, said at least one interrogator device causing said RFID response units of said at least one sensor to transmit a signal representative of the measurement of said at least one sensor to said processor.

52. The vehicle of claim 49, wherein at least one of said sensors includes a SAW sensor arranged to receive a signal and return a signal modified by virtue of the state of said SAW sensor or the state of the mounting location of said SAW sensor.

53. The vehicle of claim 41, wherein the state of the vehicle diagnosed by said diagnostic system includes angular motion of the vehicle.

54. The vehicle of claim 49, wherein said processor is arranged to control at least one part of the vehicle based on the output indicative or representative of the state of the vehicle or the state of a component of the vehicle.

55. The vehicle of claim 41, further comprising a warning device coupled to said diagnostic system for relaying a warning to an occupant of the vehicle relating to the state of the vehicle or the state of the component of the vehicle as diagnosed by said diagnostic system.

56. The vehicle of claim 41, further comprising a location determining system for determining the location of the vehicle, said communications device being coupled to said location determining system and arranged to transmit the determined location of the vehicle.

57. A vehicle, comprising:
a diagnostic system arranged to diagnose the state of the vehicle or the state of a component of the vehicle and generate an output indicative or representative thereof, said diagnostic system comprising a plurality of sensors mounted at different locations on the vehicle, each of said sensors providing a measurement related to a state of said sensor or a measurement related to a state of the mounting location and a processor coupled to said sensor systems and arranged to diagnose the state of the vehicle or the state of the component of the vehicle based on the measurements of said sensors, at least one of said sensors including an RFID response unit;
a communications device coupled to said diagnostic system and arranged to transmit the output of said diagnostic system; and
at least one RFID interrogator device, said at least one interrogator device causing said RFID response unit of said at least one sensor to transmit a signal representative of the measurement of said at least one sensor to said processor.

58. A vehicle, comprising:
a diagnostic system arranged to diagnose the state of the vehicle or the state of a component of the vehicle and generate an output indicative or representative thereof, said diagnostic system comprising a plurality of sensors mounted at different locations on the vehicle, each of said sensors providing a measurement related to a state of said sensor or a measurement related to a state of the mounting location and a processor coupled to said sensor systems and arranged to diagnose the state of the vehicle or the state of the component of the vehicle based on the measurements of said sensors, at least one of said sensors including a SAW sensor arranged to receive a signal and return a signal modified by virtue of the state of said SAW sensor or the state of the mounting location of said SAW sensor; and
a communications device coupled to said diagnostic system and arranged to transmit the output of said diagnostic system.

59. The vehicle of claim 58, wherein said SAW sensor is arranged to measure at least one of temperature and pressure.

60. The vehicle of claim 58, wherein said SAW sensor is arranged to measure at least one of the presence and concentration of a chemical.

61. The method of claim 21, wherein the step of transmitting the output to the emote facility comprises the step of automatically establishing a communications channel between the vehicle and the remote facility without manual intervention to thereby enable the output to be transmitted from the vehicle to the remote facility.

62. The vehicle of claim 41, wherein said communications device is arranged to automatically establish a communications channel between the vehicle and the remote site without manual intervention and transmit the output of said diagnostic system to the remote site.

* * * * *